(12) United States Patent
Kodama

(10) Patent No.: US 12,445,743 B2
(45) Date of Patent: Oct. 14, 2025

(54) SOLID-STATE IMAGING ELEMENT, ELECTRONIC DEVICE, AND IMAGING METHOD

(71) Applicant: Sony Semiconductor Solutions Corporation, Kanagawa (JP)

(72) Inventor: Kazutoshi Kodama, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 281 days.

(21) Appl. No.: 18/036,294

(22) PCT Filed: Nov. 9, 2021

(86) PCT No.: PCT/JP2021/041132
§ 371 (c)(1),
(2) Date: May 10, 2023

(87) PCT Pub. No.: WO2022/107641
PCT Pub. Date: May 27, 2022

(65) Prior Publication Data
US 2023/0412936 A1   Dec. 21, 2023

(30) Foreign Application Priority Data
Nov. 17, 2020   (JP) ................. 2020-191072

(51) Int. Cl.
*H04N 25/47*   (2023.01)
*H04N 25/50*   (2023.01)
(Continued)

(52) U.S. Cl.
CPC ............ *H04N 25/47* (2023.01); *H04N 25/50* (2023.01); *H04N 25/77* (2023.01); *H04N 25/78* (2023.01)

(58) Field of Classification Search
CPC ........ H04N 25/47; H04N 25/50; H04N 25/77; H04N 25/78; H04N 25/79; H04N 25/75
See application file for complete search history.

(56) References Cited

U.S. PATENT DOCUMENTS 12,003,875 B2 *   6/2024   Kobayashi ............. H04N 25/78
2021/0375975 A1 *  12/2021  Kobayashi ........... H04N 25/133
(Continued)

FOREIGN PATENT DOCUMENTS

| JP | 2006243974 A | 9/2006 |
| JP | 2012257193 A | 12/2012 |
| JP | 2020088724 A | 6/2020 |

OTHER PUBLICATIONS

International Search Report (PCT/ISA/210), International Application No. PCT/JP2021/041132, dated Jan. 25, 2022.

*Primary Examiner* — Hung H Lam
(74) *Attorney, Agent, or Firm* — Michael Best & Friedrich LLP

(57) ABSTRACT

Imaging capable of obtaining information regarding an object regardless of a motion state of the object is disclosed. In one example, a solid-state imaging element includes photoelectric conversion elements that perform photoelectric conversion to generate a photoelectric conversion signal; and a generation unit that generates a first signal in a case where an amount of change of a photoelectric conversion signal output from a single one of the photoelectric conversion elements exceeds a predetermined value, and generates a second signal in a case where a difference value between photoelectric conversion signals output from two of the photoelectric conversion elements exceeds a predetermined value.

17 Claims, 35 Drawing Sheets

(51) Int. Cl.
*H04N 25/77* (2023.01)
*H04N 25/78* (2023.01)

(56) References Cited

U.S. PATENT DOCUMENTS

2021/0409625 A1* 12/2021 Zhu ........................ H04N 25/79
2022/0021837 A1* 1/2022 Zhu ........................ H04N 25/47

* cited by examiner (a)

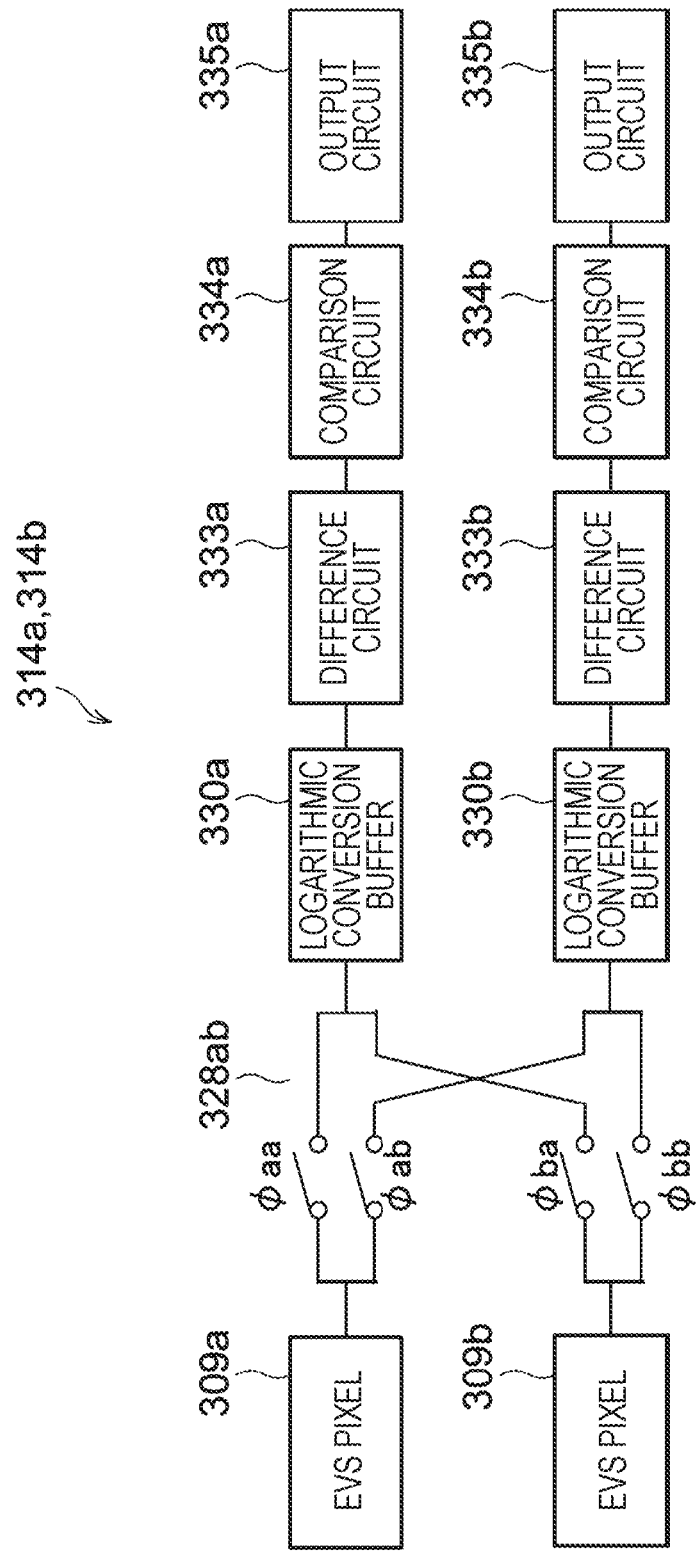

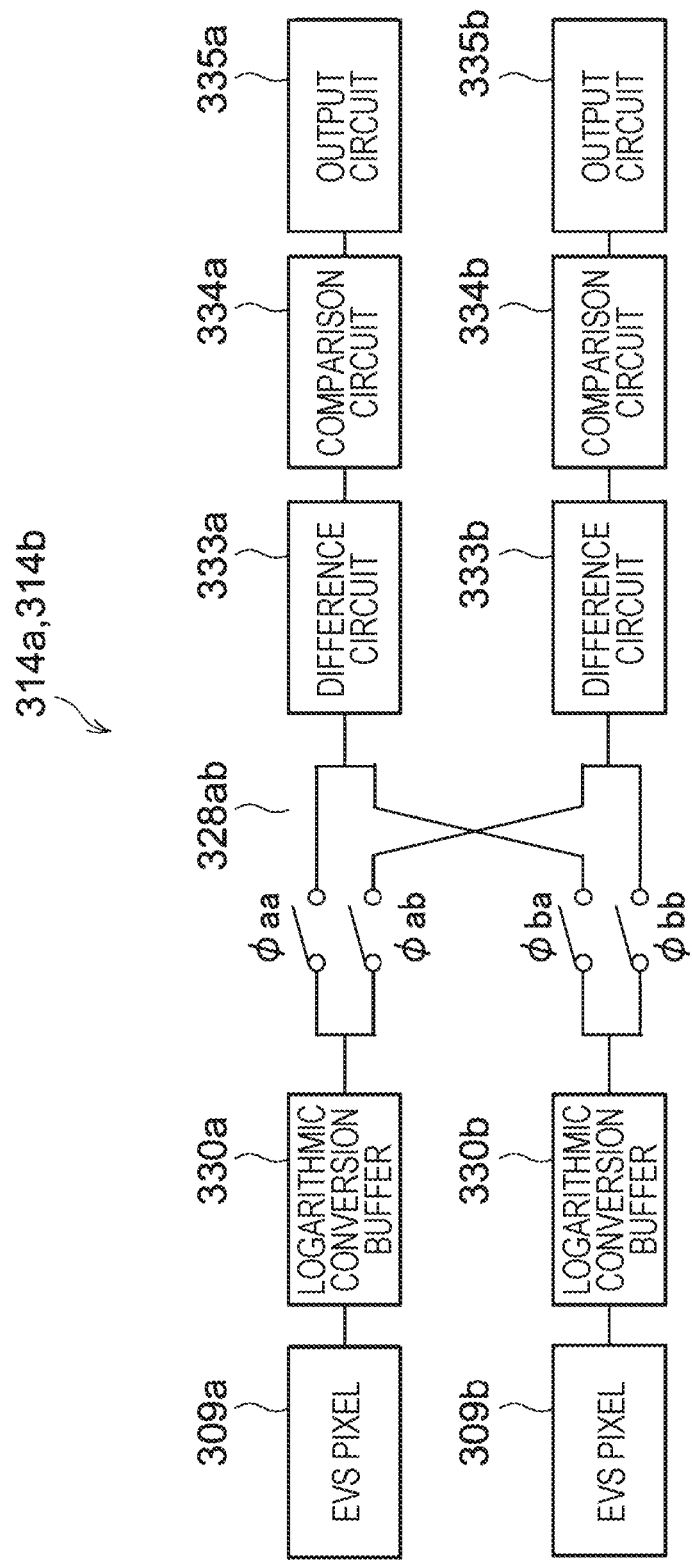

FIG. 37

F16: EVS DRIVING

G16: NEIGHBORING PIXEL DIFFERENCE DETECTION DRIVING

IMAGING TARGET IS STOPPED

FIG. 38

DRIVING IN F5

| EVS DRIVING | NEIGHBORING PIXEL DIFFERENCE DETECTION DRIVING | NEIGHBORING PIXEL DIFFERENCE DETECTION DRIVING | NEIGHBORING PIXEL DIFFERENCE DETECTION DRIVING |
|---|---|---|---|
| EVS DRIVING | EVS DRIVING | NEIGHBORING PIXEL DIFFERENCE DETECTION DRIVING | NEIGHBORING PIXEL DIFFERENCE DETECTION DRIVING |
| EVS DRIVING | EVS DRIVING | NEIGHBORING PIXEL DIFFERENCE DETECTION DRIVING | NEIGHBORING PIXEL DIFFERENCE DETECTION DRIVING |
| NEIGHBORING PIXEL DIFFERENCE DETECTION DRIVING | NEIGHBORING PIXEL DIFFERENCE DETECTION DRIVING | NEIGHBORING PIXEL DIFFERENCE DETECTION DRIVING | NEIGHBORING PIXEL DIFFERENCE DETECTION DRIVING |

DRIVING IN F6

| NEIGHBORING PIXEL DIFFERENCE DETECTION DRIVING | NEIGHBORING PIXEL DIFFERENCE DETECTION DRIVING | NEIGHBORING PIXEL DIFFERENCE DETECTION DRIVING | NEIGHBORING PIXEL DIFFERENCE DETECTION DRIVING |
|---|---|---|---|
| EVS DRIVING | EVS DRIVING | NEIGHBORING PIXEL DIFFERENCE DETECTION DRIVING | NEIGHBORING PIXEL DIFFERENCE DETECTION DRIVING |
| NEIGHBORING PIXEL DIFFERENCE DETECTION DRIVING | EVS DRIVING | EVS DRIVING | NEIGHBORING PIXEL DIFFERENCE DETECTION DRIVING |
| NEIGHBORING PIXEL DIFFERENCE DETECTION DRIVING | NEIGHBORING PIXEL DIFFERENCE DETECTION DRIVING | NEIGHBORING PIXEL DIFFERENCE DETECTION DRIVING | NEIGHBORING PIXEL DIFFERENCE DETECTION DRIVING |

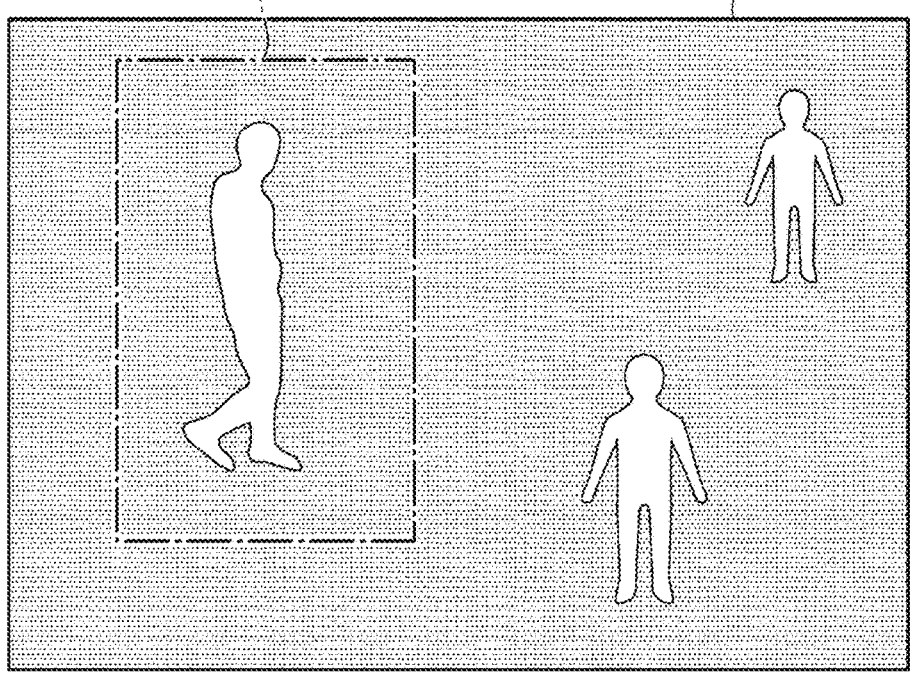

FIG. 43

| 12 | 2 | 2 | 2 |
|---|---|---|---|
| 13 | 8 | 2 | 2 |
| 10 | 5 | 5 | 2 |
| 2 | 2 | 2 | 2 |

A300

30

SOLID-STATE IMAGING ELEMENT, ELECTRONIC DEVICE, AND IMAGING METHOD

TECHNICAL FIELD

The present disclosure relates to a solid-state imaging element, an electronic device, and an imaging method.

BACKGROUND ART

Synchronous solid-state imaging elements that capture image data (frames) in synchronization with a synchronization signal such as a vertical synchronization signal are used in electronic devices and the like. With these general synchronous solid-state imaging elements, image data may be obtained only at every synchronization signal cycle (for example, 1/60 second), so that it is difficult to cope with a case where higher-speed processing is required in a field regarding traffic, robot, and the like. In view of this, an asynchronous solid-state imaging element having a detection circuit for each pixel has been proposed, the detection circuit detecting, for each pixel address, that an amount of light of the pixel exceeds a threshold value as an address event in real time. The solid-state imaging element that detects an address event for each asynchronous pixel in this manner is called an event base vision sensor (EVS).

In addition, an EVS image based on a detection signal of an EVS pixel includes edge information of a moving object, and may be used for recognition processing. However, when the motion of the object approaches the stationary state, the edge information in the EVS image is reduced, and the recognition accuracy may be deteriorated.

CITATION LIST

Patent Document

Patent Document 1: Japanese Patent Application Laid-Open No. 2012-257193

SUMMARY OF THE INVENTION

Problems to be Solved by the Invention

Therefore, the present disclosure provides a solid-state imaging element, an electronic device, and an imaging method capable of obtaining information regarding an object regardless of a motion state of the object.

Solutions to Problems

In order to solve the above problems, according to the present disclosure, provided is a solid-state imaging element including:
  a plurality of photoelectric conversion elements that performs photoelectric conversion to generate a photoelectric conversion signal; and
  a generation unit that generates a first signal in a case where an amount of change of a photoelectric conversion signal output from a single photoelectric conversion element among the plurality of photoelectric conversion elements exceeds a predetermined value, and generates a second signal in a case where a difference value between photoelectric conversion signals output from two photoelectric conversion elements among the plurality of photoelectric conversion elements exceeds a predetermined value.

The generation unit may include: a first difference circuit that generates a difference value between two signals; and
  a switching circuit that switches between a first photoelectric signal based on a first photoelectric conversion signal output from one first photoelectric conversion element of two photoelectric conversion elements and a second photoelectric signal based on a second photoelectric conversion signal output from another second photoelectric conversion element to output to the first difference circuit, and
  one of the first signal and the second signal may be generated on the basis of the difference value.

The second signal may be generated in a case where the switching circuit inputs the second photoelectric signal to the first difference circuit after inputting the first photoelectric signal to the first difference circuit.

The generation unit may further include a first logarithmic conversion circuit that logarithmically converts the first photoelectric conversion signal or the second photoelectric conversion signal, and
  the switching circuit may output the first photoelectric signal or the second photoelectric signal to the first difference circuit via the first logarithmic conversion circuit.

The generation unit may further include:
  a first logarithmic conversion circuit that logarithmically converts the first photoelectric conversion signal;
  a first holding circuit that holds the first photoelectric signal output from the first logarithmic conversion circuit;
  a second logarithmic conversion circuit that logarithmically converts the second photoelectric conversion signal; and
  a second holding circuit that holds the second photoelectric signal output from the second logarithmic conversion circuit, and
  the switching circuit may switch between the first photoelectric signal output from the first holding circuit and the second photoelectric signal output from the second holding circuit to output to the first difference circuit.

The generation unit may further include
  a second difference circuit that generates a difference value between two signals, and
  the switching circuit may include: a first switching element connected between the first holding circuit and the first difference circuit; a second switching element connected between the first holding circuit and the second difference circuit; a third switching element connected between the second holding circuit and the second difference circuit; and a fourth switching element connected between the second holding circuit and the first difference circuit.

The generation unit may further include:
  a first comparison circuit that compares an output signal of the first difference circuit with a predetermined first threshold value and generates one of the first signal and the second signal; and
  a second comparison circuit that compares an output signal of the second difference circuit with a predetermined second threshold value and generates one of the first signal and the second signal.

The first switching element and the second switching element may be brought into a connected state, the third switching element and the fourth switching element may be brought into a disconnected state, and the first threshold value and the second threshold value may be made different from each other.

There may be further provided:
a selection circuit that selects an output signal of the first difference circuit and an output signal of the second difference circuit, and a comparison circuit that compares a signal output from the selection circuit with a predetermined threshold value and generates one of the first signal and the second signal.

The generation unit may include: a first difference circuit that generates a difference value between two signals; and
a switching circuit that switches photoelectric conversion signals output from three or more photoelectric conversion elements to output to the first difference circuit, and
one of the first signal and the second signal may be generated on the basis of the difference value.

The state processing unit may cause the display unit to display an action proposal to the user according to the estimation result of the state analysis unit.

The solid-state imaging element according to claim 1, in which a gradation image is formed on the basis of a photoelectric conversion signal output from at least one of the plurality of photoelectric conversion elements.

According to the present disclosure, there may be provided:
a light receiving unit in which a plurality of photoelectric conversion elements is arranged in a two-dimensional lattice pattern;
a detection unit including a plurality of generation units that generates one of a first signal and a second signal for each of combinations of corresponding two photoelectric conversion elements in the plurality of photoelectric conversion elements, the detection unit generating the first signal in a case where an amount of change of a photoelectric conversion signal output from a single photoelectric conversion element in the two photoelectric conversion elements exceeds a predetermined value, and generating the second signal in a case where a difference value between photoelectric conversion signals output from the two photoelectric conversion elements exceeds a predetermined value; and
a control circuit that causes the plurality of generation units to generate either the first signal or the second signal.

The control circuit may perform frame reading control to cause a generation unit of the plurality of generation units corresponding to the plurality of photoelectric conversion elements arranged for each row of the light receiving unit to sequentially output the first signal or the second signal in association with the row.

There may be further provided an analysis unit that counts the number of the plurality of generation units that outputs the first signal per unit time,
in which the control circuit may change a speed of frame reading control according to the number of counts.

The control circuit may perform control to cause the generation unit to output the second signal in a case where the number of counts becomes equal to or less than a predetermined value.

There may be further provided:
a signal processing unit that generates at least one of a first image based on the first signal, a second image based on the second signal, or a third image based on the first signal and the second signal; and
an analysis unit that recognizes an imaging target using any one of the first image based on the first signal, the second image based on the second signal, and the third image based on the first signal and the second signal.

The analysis unit may generate a difference value between the second images generated in time series, and
the control circuit may perform control to cause the generation unit to output the first signal in a case where the difference value is greater than or equal to a predetermined value.

The light receiving unit may be divided into a plurality of regions, and
the control circuit may perform control to cause the generation unit corresponding to each of the plurality of regions to generate one of the first signal and the second signal.

The analysis unit may generate the difference value or the number of counts for each of the plurality of regions, and
the control circuit may perform control to cause the generation unit corresponding to each of the plurality of regions to generate one of the first signal and the second signal according to the difference value or the number of counts for each of the plurality of regions.

Each of the plurality of generation units may include: a difference circuit that generates a difference value between two signals based on a photoelectric conversion signal output from each of combinations of the two photoelectric conversion elements; and
a comparison circuit that compares a difference value output from the difference circuit with a predetermined threshold value, and
the control circuit may change a threshold value according to the number of counts.

There may be further provided:
an imaging lens that condenses incident light and guides the incident light to the light receiving unit;
a recording unit that records data from the detection unit; and
a control unit that controls the detection unit to capture an image.

According to the present disclosure, provided is an imaging method including:
generating a first signal in a case where an amount of change of a photoelectric conversion signal output from a single photoelectric conversion element among a plurality of photoelectric conversion elements exceeds a predetermined value; and
generating a second signal in a case where a difference value between photoelectric conversion signals output from two photoelectric conversion elements among the plurality of photoelectric conversion elements exceeds a predetermined value.

BRIEF DESCRIPTION OF DRAWINGS

FIG. 16A is a diagram illustrating a configuration example of an EVS AFE including a configuration example of a switching circuit.

FIG. 19 is a diagram illustrating a configuration example of an EVS AFE according to a first modification of the first embodiment.

FIG. 37 is a diagram illustrating a trajectory of an imaging target.

FIG. 38 is a diagram illustrating a method for driving an EVS AFE for each region 0 in a frame F5.

FIG. 39 is a diagram illustrating a method for driving an EVS AFE for each region 0 in a frame F6.

FIG. 40 is a diagram schematically illustrating an optical image projected on a pixel array unit.

FIG. 43 is a diagram schematically illustrating a threshold value set for each region.

MODE FOR CARRYING OUT THE INVENTION

Hereinafter, embodiments of an electronic device and a method for controlling the electronic device will be described with reference to the drawings. Although principal components of the electronic device are mainly described hereinafter, the electronic device may have components and functions that are not illustrated or described. The following description does not exclude components and functions that are not illustrated or described.

First Embodiment

[Configuration Example of Electronic Device]

Figure 1:
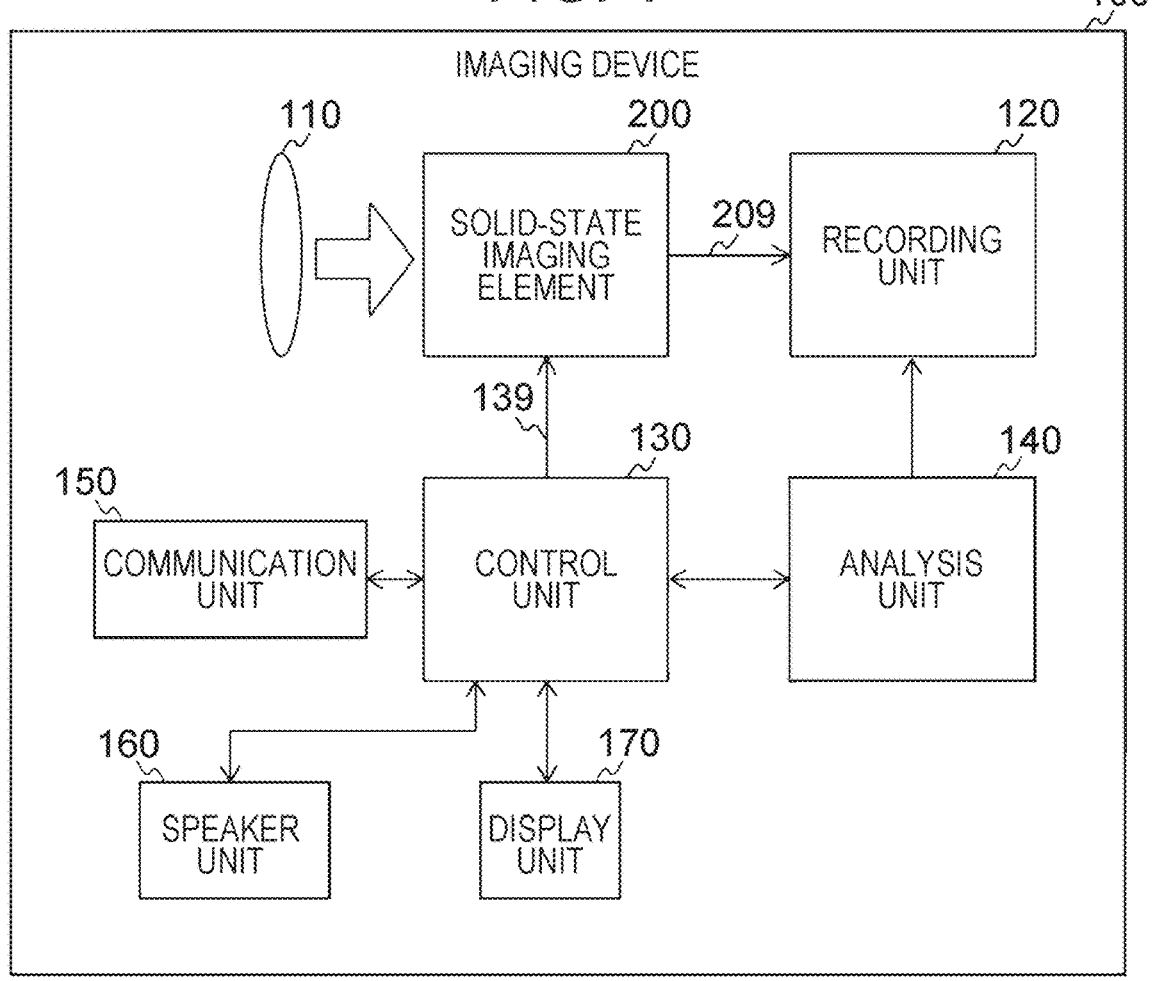
FIG. 1 is a block diagram illustrating a configuration example of an electronic device according to an embodiment of the present technology.

FIG. 1 is a block diagram illustrating a configuration example of an electronic device 100 according to an embodiment of the present technology. The electronic device 100 includes an imaging lens 110, a solid-state imaging element 200, a recording unit 120, a control unit 130, an analysis unit 140, a communication unit 150, a speaker unit 160, and a display unit 170. The electronic device 100 is, for example, a smartphone, a mobile phone, a personal computer (PC), a monitoring camera, or the like.

The imaging lens 110 condenses incident light and guides the light to the solid-state imaging element 200. The solid-state imaging element 200 includes, for example, an EVS pixel and a gradation pixel. The EVS pixel can be used to detect, as an address event, that the absolute value of an amount of change in luminance has exceeded the threshold value. The address event includes, for example, an address-on event indicating that the amount of increase in luminance exceeds the upper limit threshold value and an address-off event indicating that the amount of decrease in luminance falls below the lower limit threshold value less than the upper limit threshold value. Then, the solid-state imaging element 200 generates an address event detection signal indicating the detection result of the address event for each EVS pixel. Each of the address event detection signals includes an address-on event detection signal VCH indicating the presence or absence of an address-on event and an address-off event detection signal VCL indicating the presence or absence of an address-off event. Note that although the solid-state imaging element 200 detects the presence or absence of both the address-on event and the address-off event, it is also possible to detect only one of the address-on event and the address-off event.

Furthermore, in addition to the address event detection signal, the EVS pixel according to the present embodiment can be used to detect, as an edge event, that the absolute value of the difference value between two adjacent EVS pixels exceeds the threshold value. The vicinity of an EVS pixel includes adjacent EVS pixels. The edge event includes, for example, an edge-on event indicating that the amount of increase in the difference value exceeds the upper limit threshold value and an edge-off event indicating that the amount of decrease in the difference value falls below the lower limit threshold value less than the upper limit threshold value. Then, the solid-state imaging element 200 can generate an edge event detection signal indicating the detection result of the edge event for each EVS pixel. Each of the edge event detection signals includes an edge-on event detection signal EVCH indicating the presence or absence of an edge-on event and an edge-off event detection signal EVCL indicating the presence or absence of an edge-off event. Note that although the solid-state imaging element 200 detects the presence or absence of both the edge-on event and the edge-off event, it is also possible to detect only one of the edge-on event and the edge-off event.

Furthermore, the EVS pixel according to the present embodiment can also output a luminance signal. As a result, in the solid-state imaging element 200 according to the present embodiment, it is possible to configure an EVS image based on the address event detection signal of the EVS pixel, an EVS difference image based on the edge event detection signal between two pixels of the EVS pixel, and an EVS luminance image based on the luminance signal of the EVS pixel.

Meanwhile, the gradation pixel outputs a gradation luminance signal. A gradation image is formed on the basis of the gradation luminance signal output from the gradation pixel. The present embodiment has a first mode in which both the gradation pixel and the EVS pixel are driven, a second mode in which only the EVS pixel is driven, and a third mode. The second mode is a mode in which an EVS image based on the address event detection signal of the EVS pixel, an EVS difference image based on the edge event detection signal of the EVS pixel, and an EVS luminance image based on the luminance signal of the EVS pixel are configured. On the other hand, the third mode is a mode in which the EVS image and the EVS difference image are configured. Since the gradation pixel and the EVS pixel can be driven independently, the gradation pixel can be imaged at an imaging rate of, for example, 60 fps, whereas the second mode can be imaged at a rate of, for example, 200 fps or the like. Further, in the third mode, since the luminance signal is not read from the EVS pixel, imaging can be performed at a higher frame rate.

Power consumption is lowest in the third mode, followed by the second mode. Therefore, the EVS pixel is always driven in the third mode, and it is possible to monitor the state or the like based on the EVS image and the EVS difference image.

The solid-state imaging element 200 executes predetermined signal processing such as image processing on the EVS image, the EVS difference image, the EVS luminance image, and the gradation image, and outputs the processed data to the recording unit 120 via a signal line 209.

The recording unit 120 records data and the like from the solid-state imaging element 200. The control unit 130 controls the entire electronic device 100. For example, the control unit 130 controls the solid-state imaging element 200 to capture an EVS image, an EVS difference image, an EVS luminance image, and a gradation image.

The analysis unit 140 performs predetermined analysis processing using at least one of the EVS image, the EVS difference image, the EVS luminance image, or the gradation image. This analysis processing includes recognition processing such as object recognition.

The communication unit 150 performs wireless communication with an external device. As a result, content or the like is received from an external server and recorded in the recording unit 120 via the control unit 130. For example, the control unit 130 causes the display unit 170 to display an image based on the content.

The speaker unit 160 includes, for example, a speaker, and can transmit audio information. Note that, in a case where the electronic device 100 is a monitoring camera or the like, the communication unit 150 and the speaker unit 160 may not be included.

[Configuration Example of Solid-State Imaging Element]

Figure 2:
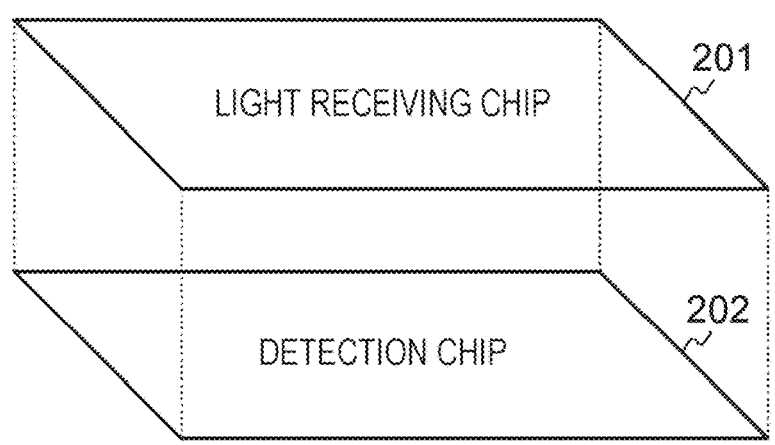
FIG. 2 is a diagram illustrating an example of a stacked structure of a solid-state imaging element according to an embodiment of the technology.

FIG. 2 is a diagram illustrating an example of a stacked structure of the solid-state imaging element 200 according to an embodiment of the present technology. The solid-state imaging element 200 includes a detection chip 202 and a light receiving chip 201 stacked on the detection chip 202. These substrates are electrically connected via a connection portion such as a via. Note that they can be connected using Cu—Cu bonding or a bump instead of via.

Figure 3:
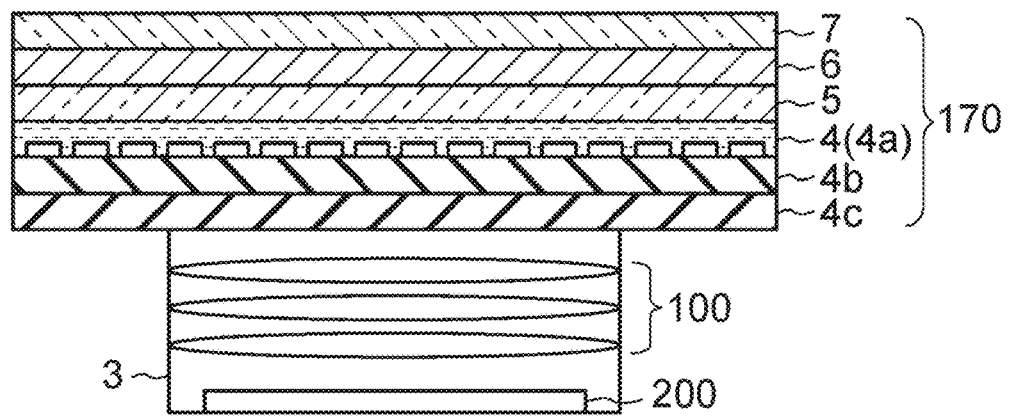
FIG. 3 is a schematic cross-sectional view of an electronic device according to a first embodiment.
Figure 4:
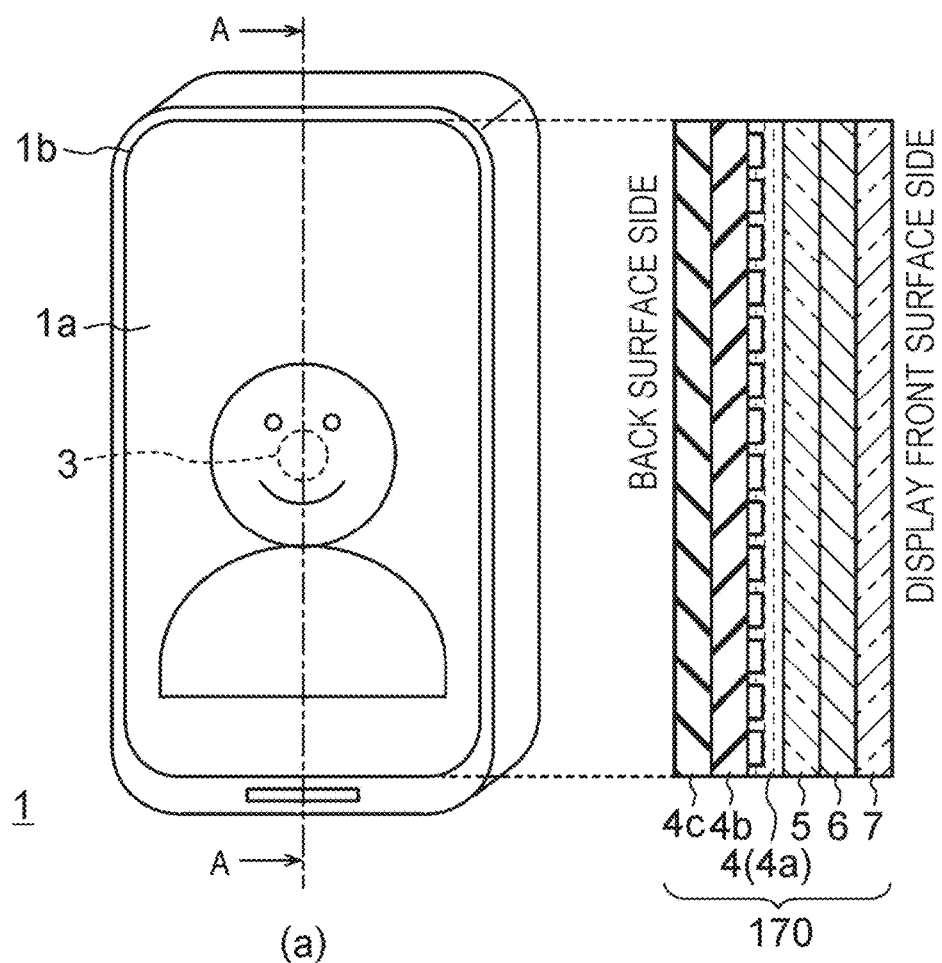
FIG. 4 is a schematic external view of the electronic device of FIG. 1.

Here, a configuration example of the electronic device 100 according to a first embodiment will be described with reference to FIGS. 3 and 4. FIG. 3 is a schematic cross-sectional view of the electronic device 100 according to the first embodiment. FIG. 4 is a schematic external view of the electronic device 100 of FIG. 1, the left diagram is an external view on the display unit 170 side, and the right diagram is a cross-sectional view of the display unit 170 in the A-A direction. In the example of FIG. 4, a display screen 1a is illustrated to spread to the vicinity of the outer size of the electronic device 100, but a front camera and a depth sensor (not illustrated) are mounted on a bezel 1b. As illustrated in FIGS. 3 and 4, the electronic device 100 is an example of the electronic device 100 including the imaging lens 110, and is any electronic device having both a display function and an imaging function, such as a smartphone, a mobile phone, a tablet, a bar code reader, or a PC.

A camera module 3 disposed on the side opposite to the display surface of the display unit 170 is provided. That is, the imaging lens 110 and the solid-state imaging element 200 are arranged in the camera module 3. As described above, in the electronic device 1 of FIG. 1, the camera module 3 is provided on the back side of the display surface of the display unit 170. Therefore, the camera module 3 performs imaging through the display unit 170. As described above, since the camera module 3 can be installed near the center of the electronic device 100, occlusion can be reduced. Furthermore, it is also possible to increase the sensitivity by using the light emission of the display unit 170 itself. In addition, since the camera module 3 is provided on the back side of the display surface of the display unit 170, there is a spatial margin for providing a thickness to the imaging lens 110. As a result, a fisheye lens or the like can be used for the imaging lens 110, and a wide range of images can be acquired.

As illustrated in FIG. 4, the display unit 170 has a structure in which a polarizing plate 4c, a ¼ wave plate 4b, a display panel 4 (4a), a touch panel 5, a circularly polarizing plate 6, and a cover glass 7 (which may include a touch panel) are stacked in this order. In addition, the circularly polarizing plate 6 includes a polarizing plate 6a and a ¼ wave plate 6b as described later.

The polarizing plate 4c and the ¼ wave plate 4b suppress incidence of internal reflected light on the camera module 3.

In the display panel 4, display elements are arranged in an array. The display panel 4 may be, for example, an organic light emitting device (OLED), a liquid crystal display unit, a MicroLED, or a display panel based on other display principles.

The display panel 4 such as the OLED unit includes a plurality of layers. The display panel 4 is often provided with a member having low transmittance such as a color filter layer. A through hole may be formed on the member having a low transmittance in the display panel 4 according to a place in which the camera module 3 is arranged. If it is designed in such a manner that subject light passing through the through hole is incident on the camera module 3, the image quality of an image captured by the camera module 3 can be improved.

The circularly polarizing plate 6 is provided to reduce glare and enhance visibility of the display screen 1a even in a bright environment. A touch sensor is incorporated in the touch panel 5. There are various types of touch sensors such as a capacitive type and a resistive film type, but any type may be used. Furthermore, the touch panel 5 and the display panel 4 may be integrated with each other. The cover glass 7 is provided to protect the display panel 4 and the like.

Note that, in FIG. 4, the camera module 3 is arranged on the back surface side of the substantially central portion of the display screen 1a, but in the present embodiment, the camera module 3 is only required to be arranged on the back surface side of the display screen 1a. In this manner, the camera module 3 in the present embodiment is arranged in any position on the back surface side overlapping the display screen 1a.

Figure 5:
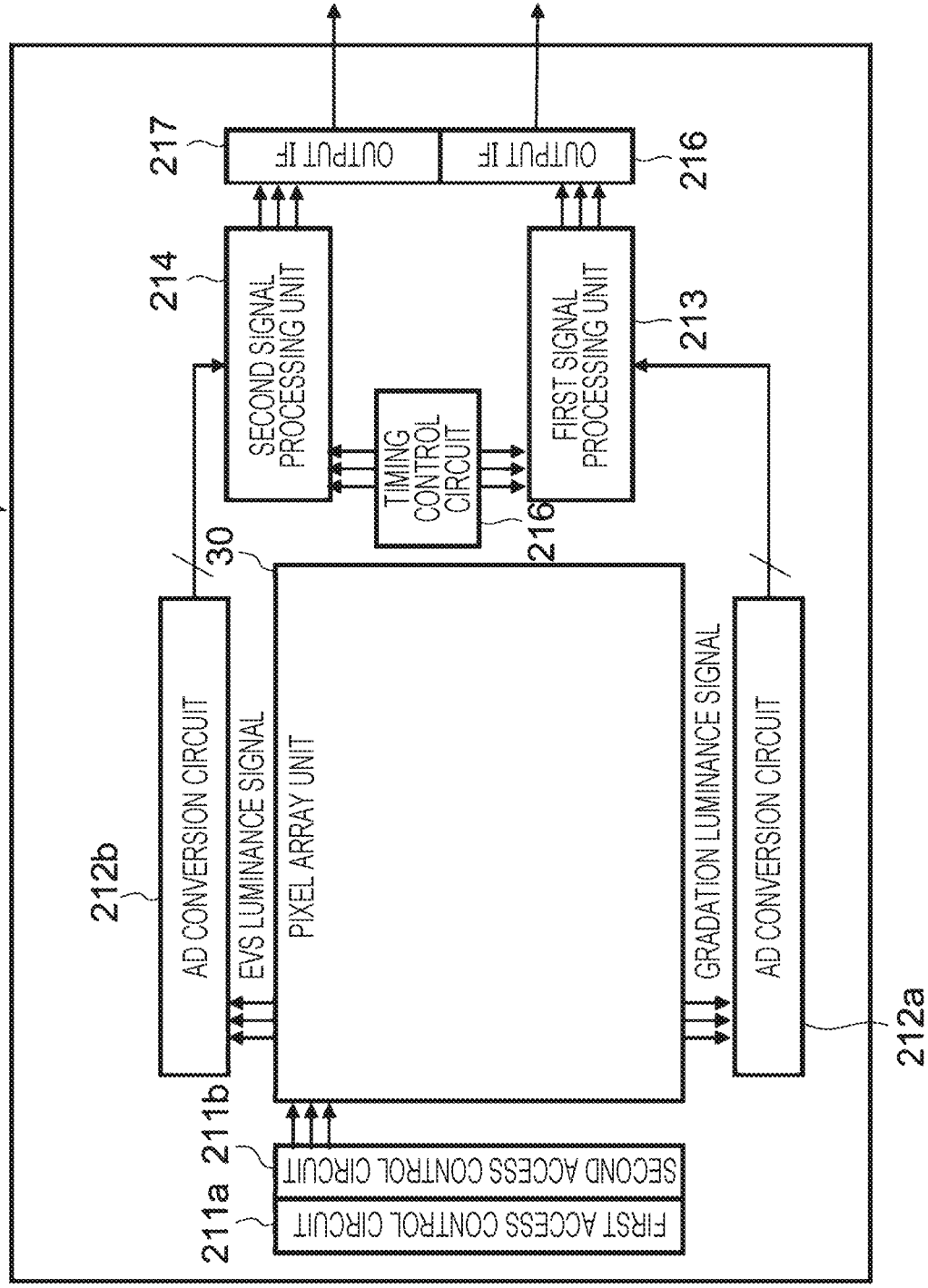
FIG. 5 is a block diagram illustrating a configuration example of a solid-state imaging element.

FIG. 5 is a block diagram illustrating a configuration example of the solid-state imaging element 200. As illustrated in FIG. 5, a solid-state imaging element 200 according to the present disclosure is a device capable of performing asynchronous imaging called EVS and synchronous imaging for a gradation image in parallel. The solid-state imaging element 200 includes a pixel array unit 30, a first access control circuit 211a, a second access control circuit 211b, an AD conversion circuit 212a, an AD conversion circuit 212b, a first signal processing unit 213, a second signal processing unit 214, a timing control circuit 215, and output interfaces 216 and 217.

Figure 6:
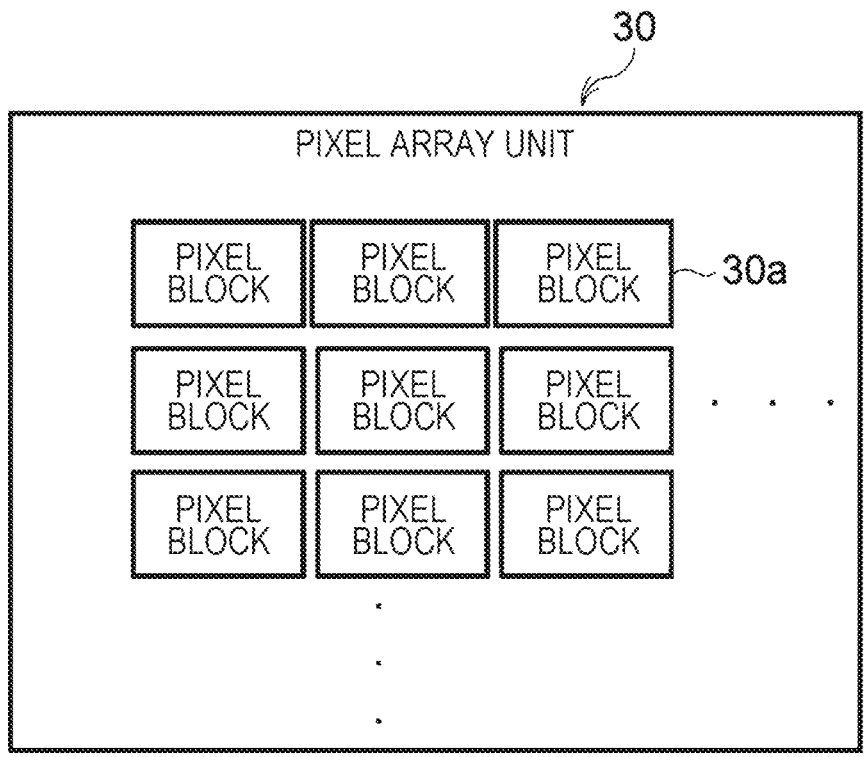
FIG. 6 is a diagram schematically illustrating pixel blocks arranged in a matrix in a pixel array unit.
Figure 7A:
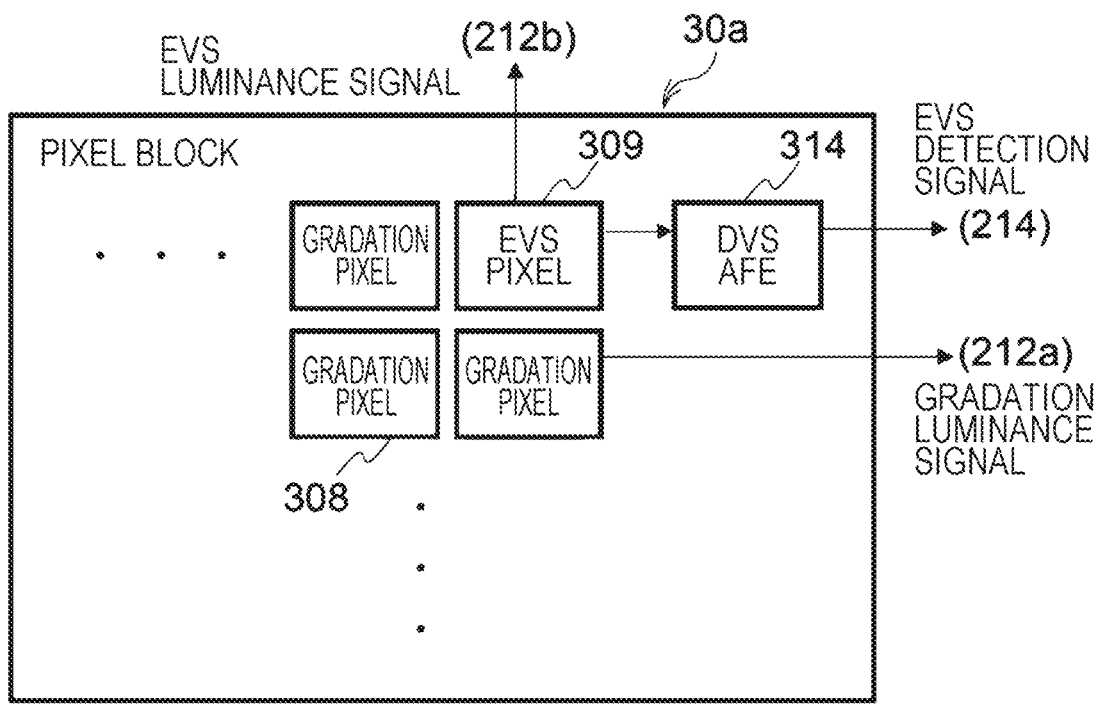
FIG. 7A is a diagram schematically illustrating a configuration of a pixel block.

Here, the configuration of the pixel array unit 30 will be described with reference to FIGS. 6 and 7A. FIG. 6 is a diagram schematically illustrating pixel blocks 30a arranged in a matrix in the pixel array unit 30. As illustrated in FIG. 6, in the pixel array unit 30, a plurality of pixel blocks 30a is two-dimensionally arranged in a matrix (array).

The configuration of the pixel block 30a will be described with reference to FIG. 7A. FIG. 7A is a diagram schematically illustrating a configuration of a pixel block 30a. As illustrated in FIG. 7A, the pixel block 30a includes a plurality of gradation pixels 308, a plurality of EVS pixels 309, and an EVS analog front end (AFE) 314 corresponding to each of the EVS pixels 309. In the pixel block 30a, the plurality of gradation pixels 308 and the plurality of EVS pixels 309 are arranged in a matrix. In this pixel array, a vertical signal line VSL1 to be described later is wired for each pixel column of the gradation pixels 308. Furthermore, a vertical signal line VSL2 independent of the vertical signal line VSL1 is wired for each pixel column of the EVS pixels 309. Each of the plurality of gradation pixels 308 generates an analog signal of a voltage corresponding to the photocurrent as a gradation luminance signal (second luminance signal) and outputs the signal to the AD conversion circuit 212a (see FIG. 5). Note that, in FIG. 7A, the plurality of gradation pixels 308, the plurality of EVS pixels 309, and the EVS AFEs 314 are illustrated on the same plane in order to simplify the description, but the plurality of gradation pixels 308 and the plurality of EVS pixels 309 are configured in the light receiving chip 201, and the plurality of EVS AFEs 314 is configured in the detection chip 202. Note that the EVS AFE 314 according to the present embodiment corresponds to a generation unit.

In the first mode and the second mode, the EVS pixel 309 outputs a photoelectric conversion signal corresponding to a photocurrent to the EVS AFE 314. Furthermore, the EVS pixel 309 generates a photoelectric conversion signal according to the photocurrent as an EVS luminance signal (first luminance signal), and outputs the signal to the AD conversion circuit 212b (see FIG. 5) in a case where an address event or an edge event occurs.

On the other hand, in the third mode, the EVS pixel 309 does not output the EVS luminance signal to the AD conversion circuit 212b (see FIG. 5), and outputs the EVS luminance signal only to the EVS AFE 314.

Figure 7B:
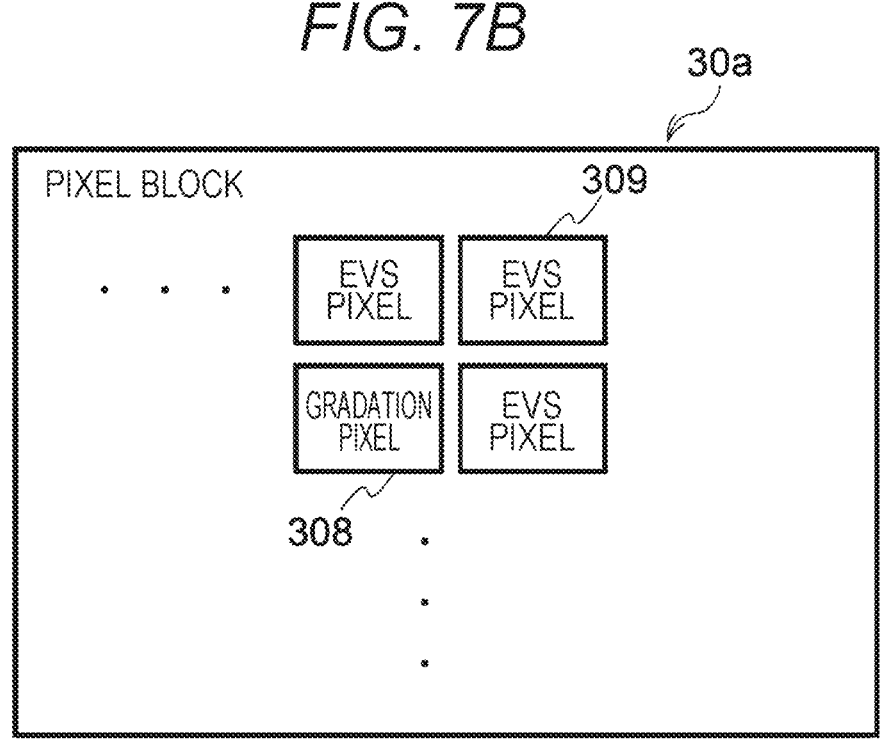
FIG. 7B is a diagram illustrating another configuration example of the pixel block.

FIG. 7B is a diagram illustrating another configuration example of the pixel block 30a. In FIG. 7A, the number of gradation pixels 308 in the pixel block 30a is larger than the number of EVS pixels 309, whereas in FIG. 7B, the number of gradation pixels 308 in the pixel block 30a is smaller than the number of EVS pixels 309. Note that, in FIG. 7B, the description of the plurality of EVS AFEs 314 corresponding to the EVS pixels 309 is omitted, but the EVS AFE 314 is configured in the detection chip 202.

Figure 7C:
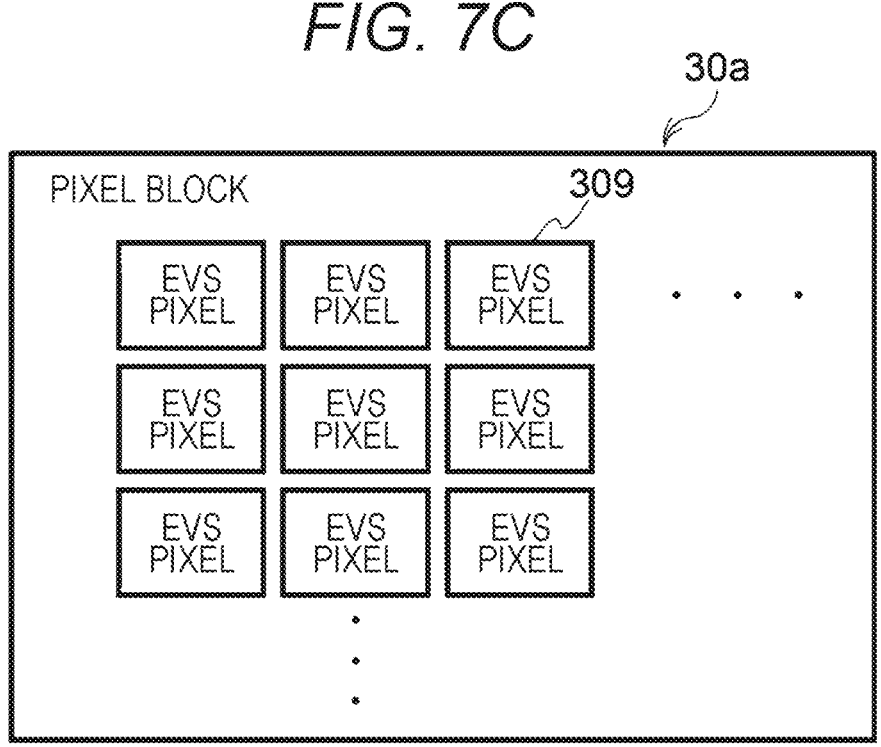
FIG. 7C is a diagram illustrating an example in which all pixels in a pixel block are configured by EVS pixels.

FIG. 7C is a diagram illustrating an example in which all the pixels in the pixel block 30a are configured as the EVS pixels 309. In this case, a pixel block including only the gradation pixels 308 may be configured outside the pixel block 30a. Note that, in FIG. 7C, the description of the plurality of EVS AFEs 314 corresponding to the EVS pixels 309 is omitted, but the EVS AFE 314 is configured in the detection chip 202. In this manner, the ratio between the number of gradation pixels 308 and the number of EVS pixels 309 in the pixel block 30a may be changed according to the purpose of imaging. As the number of EVS pixels 309 increases, the pitch between two pixels used to generate the difference signal can be further shortened.

The EVS analog front end (AFE) 314 generates an address event detection signal V or an edge event detection signal E from a signal based on the output of the EVS pixel 309 and outputs the signal to the second signal processing unit 214 (see FIG. 3). More specifically, the EVS AFE 314 detects the presence or absence of an address event on the basis of whether or not the amount of change in photocurrent in the EVS pixel 309 exceeds a predetermined threshold value. Then, the EVS AFE 314 outputs the address event detection signal V to the second signal processing unit 214. For example, the EVS AFE 314 outputs, as the address event detection signal V, for example, a signal (Xa, Ya, T, VC=1, or, −1)) including address information (Xa, Ya), time stamp information T, and information of an address event signal VC to the second signal processing unit 214. The address event signal VC=−1 indicates an address-off event, and the address event signal VC=1 indicates an address-on event. That is, the address event signal VC=−1 corresponds to the address-off event detection signal VCL, and the address event signal VC=1 corresponds to the address-on event detection signal VCH. Note that the address event signal VC according to the present embodiment corresponds to the first signal.

Furthermore, the EVS AFE 314 detects the presence or absence of an edge event on the basis of whether or not the difference value of the photocurrent between the corresponding two pixels of the EVS pixel 309 exceeds a predetermined threshold value. The corresponding two pixels are neighboring pixels. Then, the EVS AFE 314 outputs the edge event detection signal E to the second signal processing unit 214. For example, the EVS AFE 314 outputs, as the edge event detection signal E, a signal ((Xa, Ya), (Xb, Yb), T, EVC=1, or, −1) including address information (Xa, Ya), (Xb, Yb) of the corresponding two pixels, time stamp information T, and information of the edge event signal EVC) to the second signal processing unit 214. The edge event signal EVC=−1 indicates an edge-off event and the edge event signal EVC=1 indicates an edge-on event. That is, the edge event signal EVC=−1 corresponds to the edge-off event detection signal EVCL, and the edge event signal EVC=1 corresponds to the edge-on event detection signal EVCH. Note that the detailed configurations of the gradation pixel 308, the EVS pixel 309, and the EVS AFE 314 will be described later. In addition, the edge event signal EVC according to the present embodiment corresponds to the second signal.

Returning to FIG. 5 again, the first access control circuit 211a controls the plurality of gradation pixels 308. The first access control circuit 211a controls resetting of accumulated electric charges of each of the plurality of gradation pixels 308, generation of a gradation luminance signal according to an accumulation amount of a photoelectric conversion current, output of a gradation luminance signal, and the like. For example, the first access control circuit 211a causes the AD conversion circuit 212a to sequentially output the photoelectric conversion current accumulated in each of the plurality of gradation pixels 308 as a gradation luminance signal for each row. Note that details of the control operation of the gradation pixel 308 will be described later.

The second access control circuit 211b controls the plurality of EVS pixels 309 and the plurality of EVS AFEs 314. The second access control circuit 211b according to the present embodiment causes the plurality of EVS AFEs 314 to sequentially detect an address event or an edge event for each row, and causes the second signal processing unit 214 to sequentially output a detection signal for each row. In the present embodiment, reading for each row of the plurality of EVS AFEs 314 from one end row to the other end row of the pixel array unit 30 is referred to as frame reading control. In this case, reading from one end row to the other end row is defined as one frame. Furthermore, the number of frames read from the pixel array unit 30 per unit time is referred to as a frame rate. For example, in the case of 200 fps, reading from one end row to the other end row of the pixel array unit 30 is performed 200 times per second. Note that the second access control circuit 211b according to the present embodiment corresponds to a control circuit.

In addition, the second access control circuit 211b controls the switching operation for the plurality of EVS AFEs 314. As a result, the second access control circuit 211b can switch the detection of the address event or the edge event for each of the plurality of EVS AFEs 314. In addition, the second access control circuit 211b can change and set the upper limit threshold value and the lower limit threshold value for each of the plurality of EVS AFEs 314.

In addition, in the first mode and the second mode, the second access control circuit 211b causes the AD conversion circuit 212b to output the EVS luminance signal from the EVS pixel 309 corresponding to the EVS AFE 314 that has output the address event detection signal or the edge event detection signal. That is, the second access control circuit 211b sequentially outputs the luminance signals of the plurality of EVS pixels 309 in which the address event or the edge event detection signal is detected to the AD conversion circuit 212b for each row.

Figure 8:
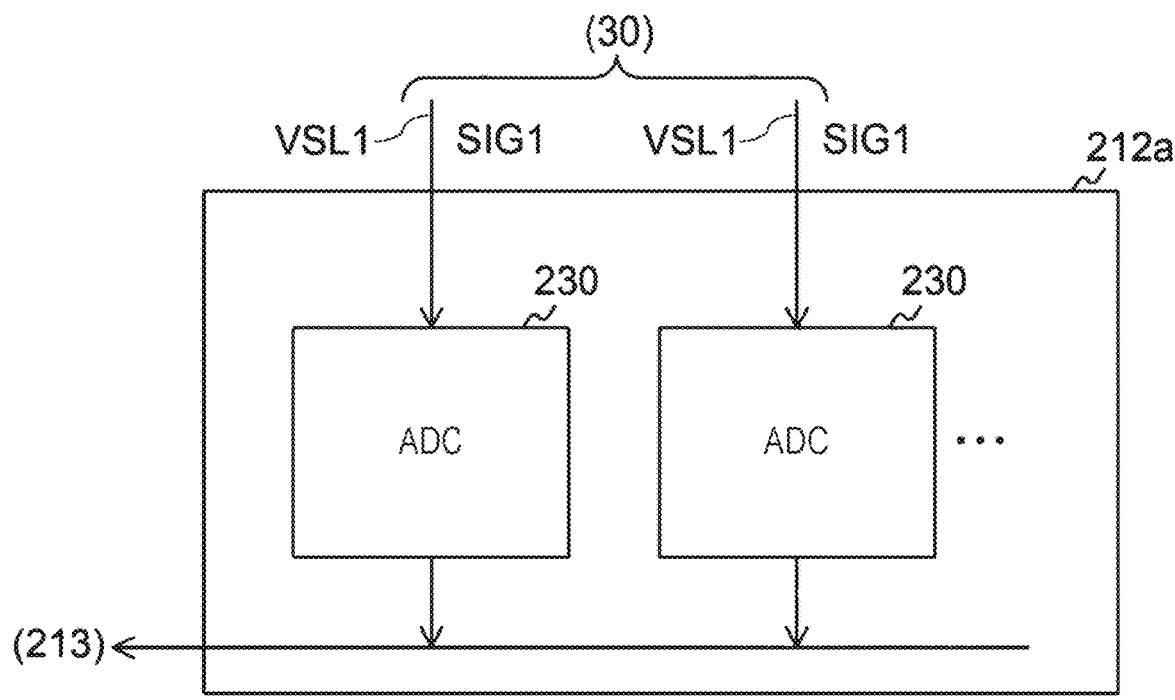
FIG. 8 is a block diagram illustrating a configuration example of an AD conversion circuit.

A configuration example of the AD conversion circuit 212a will be described with reference to FIG. 8. FIG. 8 is a block diagram illustrating a configuration example of the AD conversion circuit 212a. The AD conversion circuit 212a includes an ADC 230 for each column of the gradation pixels 308 arranged for each pixel block 30a. The ADC 230 converts the analog gradation luminance signal SIG supplied via the vertical signal line VSL1 into a digital signal. This digital signal is converted into a digital pixel signal having a bit depth larger than that of the gradation luminance signal SIG1. For example, when the gradation luminance signal SIG1 has two bits, the pixel signal is converted into a digital signal of three bits or more (16 bits or the like). The ADC 230 supplies the generated digital signal to the first signal processing unit 213. Note that the region of the plurality of gradation pixels 308 in the pixel array unit 30 may be divided into a plurality of regions, and the AD conversion circuit 212a may read the gradation luminance signal SIG1 for each of the plurality of regions. As a result, the gradation luminance signal SIG1 can be read at a higher speed.

Figure 9:
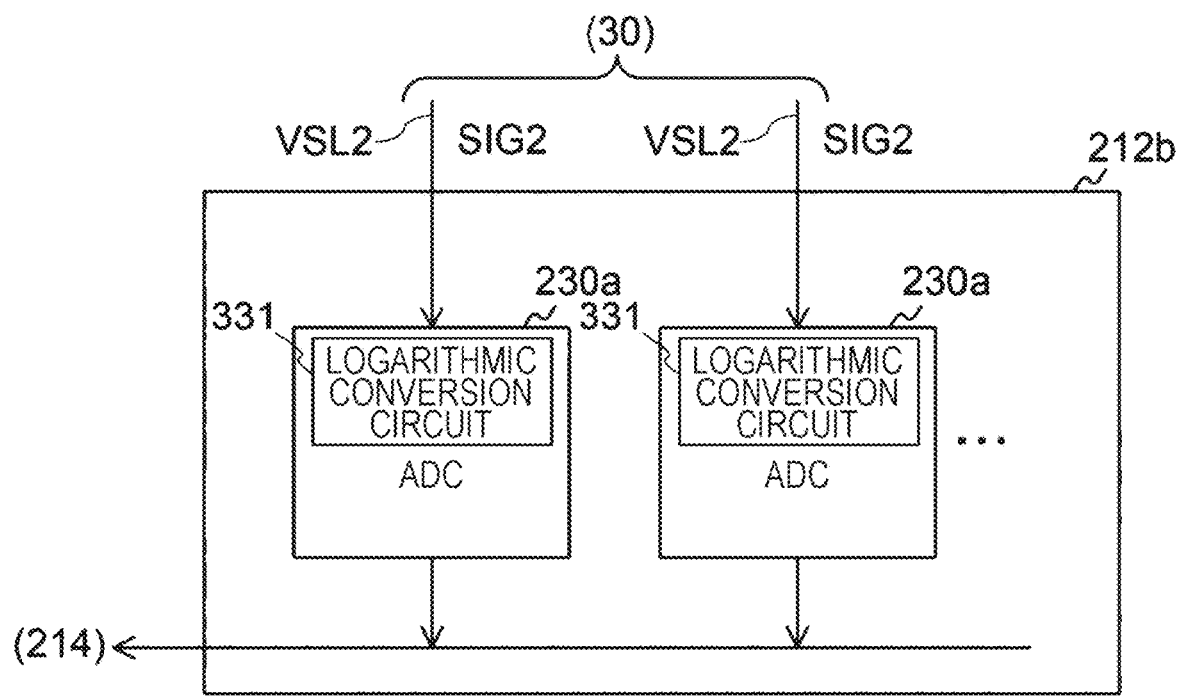
FIG. 9 is a block diagram illustrating a configuration example of an AD conversion circuit for EVS.

A configuration example of the AD conversion circuit 212b for EVS will be described with reference to FIG. 9. FIG. 9 is a block diagram illustrating a configuration example of the AD conversion circuit 212b for EVS. The AD conversion circuit 212b for EVS includes an ADC 230a for each column of the EVS pixels 309 arranged for each pixel block 30a.

The ADC 230a logarithmically converts the analog EVS luminance signal SIG2 supplied via the vertical signal line VSL2 by the logarithmic conversion circuit 331, and further converts the analog EVS luminance signal SIG2 into a digital signal. This digital signal is converted into a digital pixel signal having a bit depth larger than that of the EVS luminance signal SIG2. For example, when the EVS luminance signal SIG2 has two bits, the pixel signal is converted into a digital signal of three bits or more (16 bits or the like). The ADC 230 supplies the generated digital signal to the second signal processing unit 214. Note that details of logarithmic conversion circuit 331 will be described later with reference to FIG. 12. That is, the logarithmic conversion circuit 331 is a circuit equivalent to the logarithmic conversion circuit 331 in the EVS AFE 314 described later.

As illustrated in FIG. 5 again, the first signal processing unit 213 performs predetermined signal processing such as correlated double sampling (CDS) processing on the digital signal from the AD conversion circuit 212a. The signal processing unit 212 supplies data indicating a processing result and a detection signal to the recording unit 120 via the signal line 209. In addition, the first signal processing unit 213 generates image data in a predetermined data format from the digital signal from the AD conversion circuit 212a.

The timing control circuit 215 controls the timing of each component of the solid-state imaging element 200 on the basis of the time stamp information. For example, the timing control circuit 212d controls timings of the first access control circuit 211a and the second access control circuit 211b. As a result, it is also possible to synchronize the luminance signal of the gradation pixel 308 read by the AD conversion circuit 212a with the EVS luminance signal of the EVS pixel 309 read by the AD conversion circuit 212b.

The second signal processing unit 214 performs predetermined signal processing on the detection signals from the plurality of EVS AFEs 314. For example, the second signal processing unit 214 arranges the EVS pixel values based on the address event signal VC in a two-dimensional lattice pattern and generates an EVS image. Similarly, for example, the second signal processing unit 214 arranges the EVS difference pixel values based on the edge event signal EVC in a two-dimensional lattice pattern and generates an EVS difference image.

Furthermore, in a case where any of the address event signal VC and the edge event signal EVC is output for each of the plurality of EVS AFEs 314, the EVS pixel values or the EVS difference pixel values are arranged in a two-dimensional lattice pattern to generate an EVS mixed image. That is, the pixel value for each pixel in the EVS mixed image is a value based on the address event signal VC or the edge event signal EVC.

As illustrated in FIG. 5, the output interface 216 outputs the image data and the like supplied from the first signal processing unit 213 to the recording unit 120. Similarly, the output interface 217 outputs the image data and the like supplied from the second signal processing unit 214 to the recording unit 120.

Figure 10:
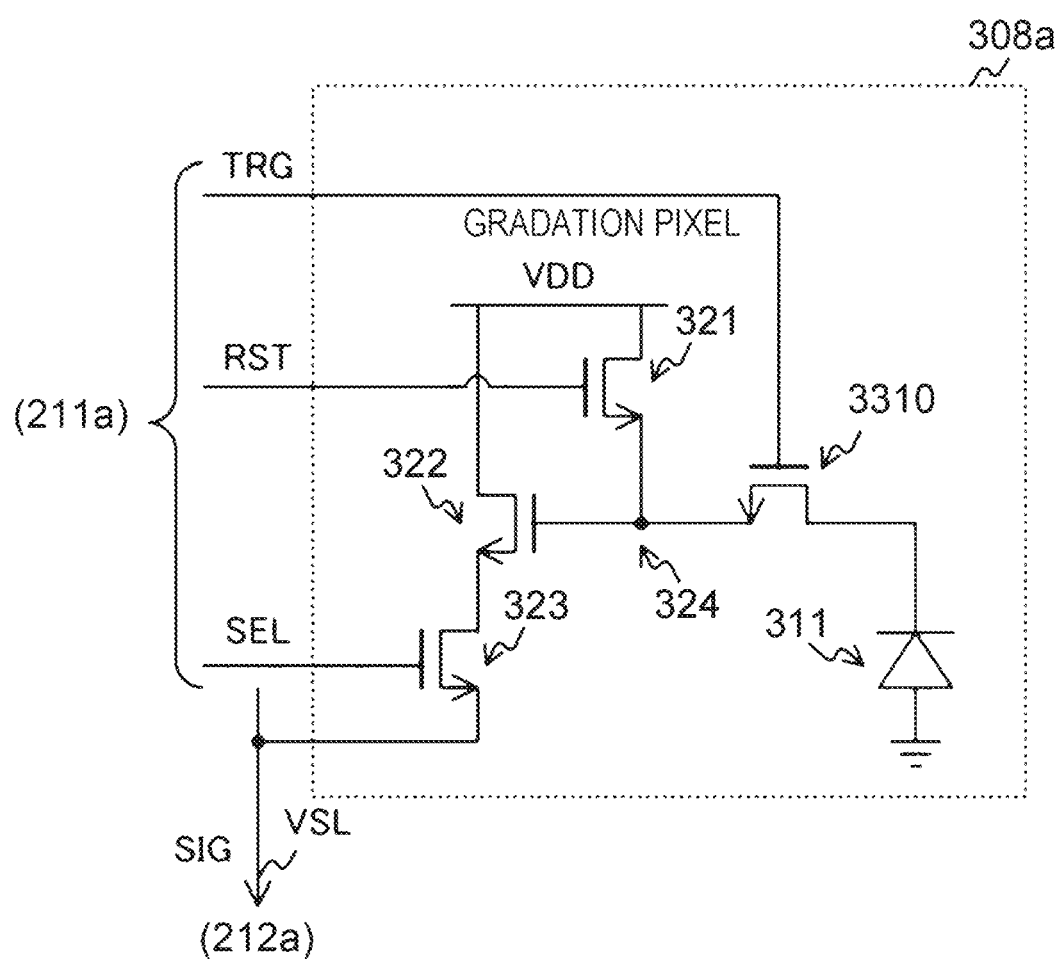
FIG. 10 is a diagram illustrating a configuration example of a gradation pixel.

Here, a detailed configuration example and a control operation example of the gradation pixel 308 will be described with reference to FIG. 10. FIG. 10 is a diagram illustrating a configuration example of the gradation pixel 308. As illustrated in FIG. 10, the gradation pixel 308 includes a photoelectric conversion element 311, a reset transistor 321, an amplification transistor 322, a selection transistor 323, a floating diffusion layer 324, and a transfer transistor 3310.

For example, an N-type metal-oxide-semiconductor (MOS) transistor is used as the reset transistor 321, the amplification transistor 322, the selection transistor 323, and the transfer transistor 3310. In addition, a photoelectric conversion element 311 is disposed on the light receiving chip 201. All the elements other than the photoelectric conversion element 311 are arranged on the detection chip 202.

The photoelectric conversion element 311 photoelectrically converts incident light to generate electric charge.

A selection signal TRG is supplied from the first access control circuit 211a (see FIG. 5) to the gate electrode of the transfer transistor 3310. The transfer transistor 3310 supplies the electric charge photoelectrically converted by the photoelectric conversion element 311 to the floating diffusion layer 324 in response to the selection signal TRG.

The electric charge supplied from the photoelectric conversion element 311 is accumulated in the floating diffusion layer 324. The floating diffusion layer 324 generates a voltage signal having a voltage value corresponding to the amount of accumulated electric charges.

The reset transistor 321 is connected between the power supply line of the power supply voltage $V_{DD}$ and the floating diffusion layer 324. A reset signal RST is supplied from the first access control circuit 211a (see FIG. 5) to a gate electrode of the reset transistor 321. The reset transistor 321 initializes (resets) the amount of electric charges in the floating diffusion layer 324 in response to the reset signal RST.

The amplification transistor 322 is connected in series with the selection transistor 323 between the power supply line of the power supply voltage VDD and the vertical signal line VSL1. The amplification transistor 322 amplifies the voltage signal subjected to charge-voltage conversion by the floating diffusion layer 324.

A selection signal SEL is supplied from the first access control circuit 211a to a gate electrode of the selection transistor 323. In response to the selection signal SEL, the selection transistor 323 outputs the voltage signal amplified by the amplification transistor 322 to the AD conversion circuit 212a (see FIG. 5) via the vertical signal line VSL1 as the pixel signal SIG.

(Circuit Configuration Example of EVS Pixel and EVS AFE)

Figure 11:
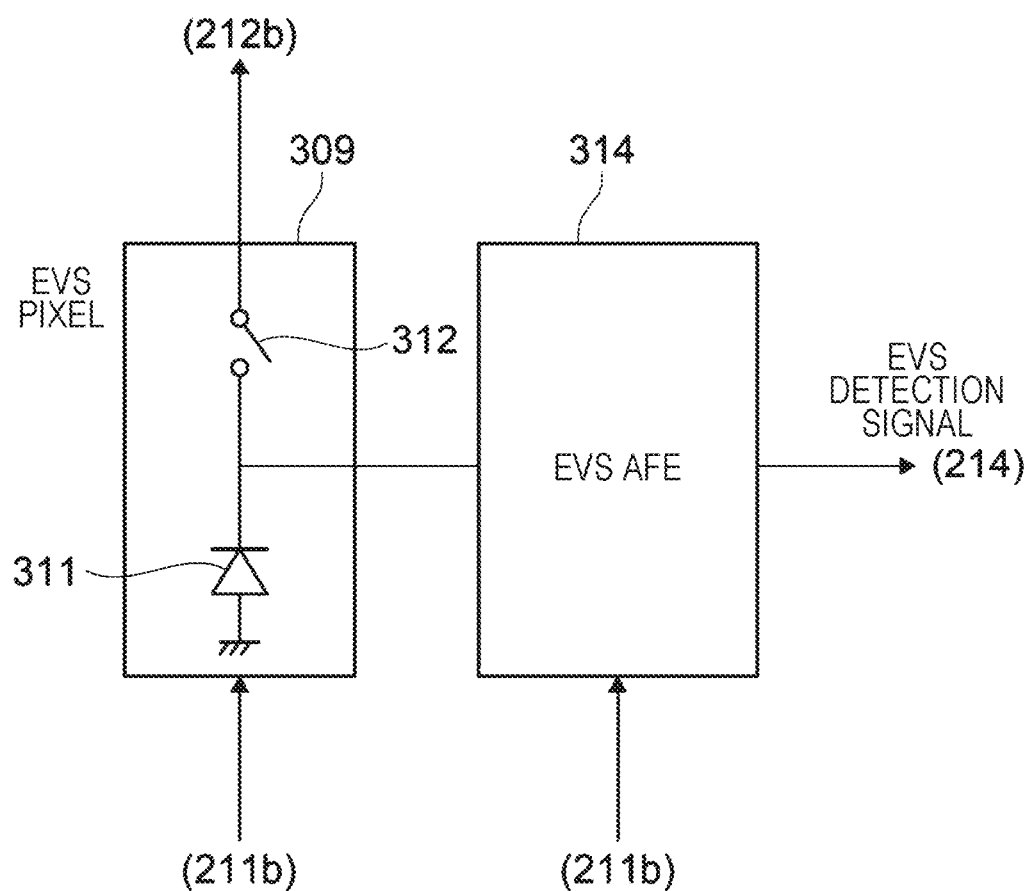
FIG. 11 is a block diagram illustrating a schematic configuration example of an EVS pixel and an EVS AFE.

Here, a detailed configuration example of the EVS pixel 309 will be described with reference to FIGS. 11 to 15. FIG. 11 is a block diagram illustrating a schematic configuration example of the EVS pixel 309 and the EVS AFE 314. As illustrated in FIG. 11, the EVS pixel 309 includes a light receiving element (photoelectric conversion element) 311 and a switching element 312. The analog photoelectric conversion signal photoelectrically converted by the photoelectric conversion element 311 is supplied to the AD conversion circuit 212b (see FIG. 9) via the switching element 312. In addition, the photoelectric conversion signal photoelectrically converted by the photoelectric conversion element 311 is supplied to the EVS AFE 314. As the switching element 312, for example, an N-type MOS transistor is used. In the case of the mode 1 and the mode 2, the switching element 312 is sequentially switched between the connected state and the disconnected state for each row by the switching signal of the second access control circuit 211b. More specifically, the connected state and the disconnected state of the EVS luminance signal of the EVS pixel 309 in which the address event or the edge event has occurred are sequentially switched for each row by the switching signal of the second access control circuit 211b. As a result, since only the EVS luminance signal of the EVS pixel 309 in which the address event or the edge event has occurred is output, the EVS luminance image is configured at a higher speed in units of frames. On the other hand, in the case of the third mode, the non-connection of the switching element 312 is always maintained.

Figure 12:
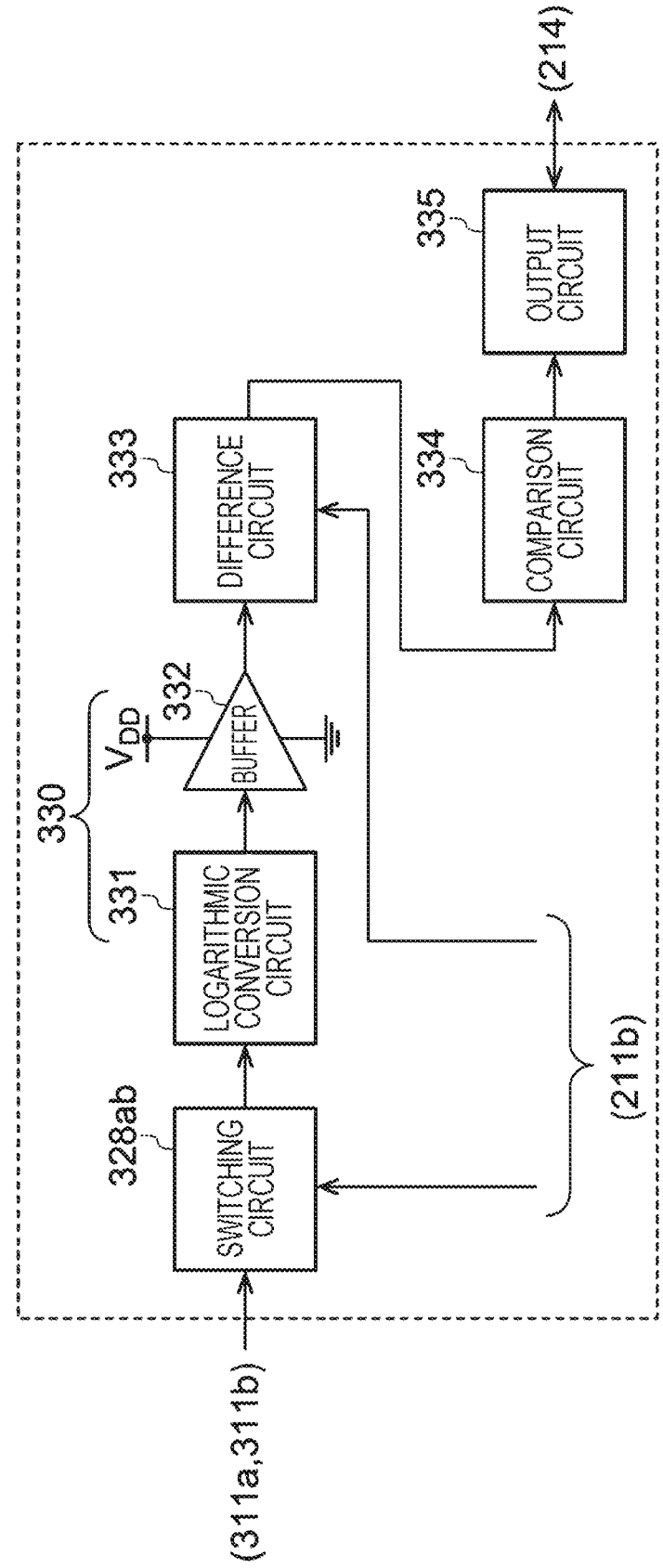
FIG. 12 is a diagram illustrating a configuration example of an EVS AFE.
Figure 13:
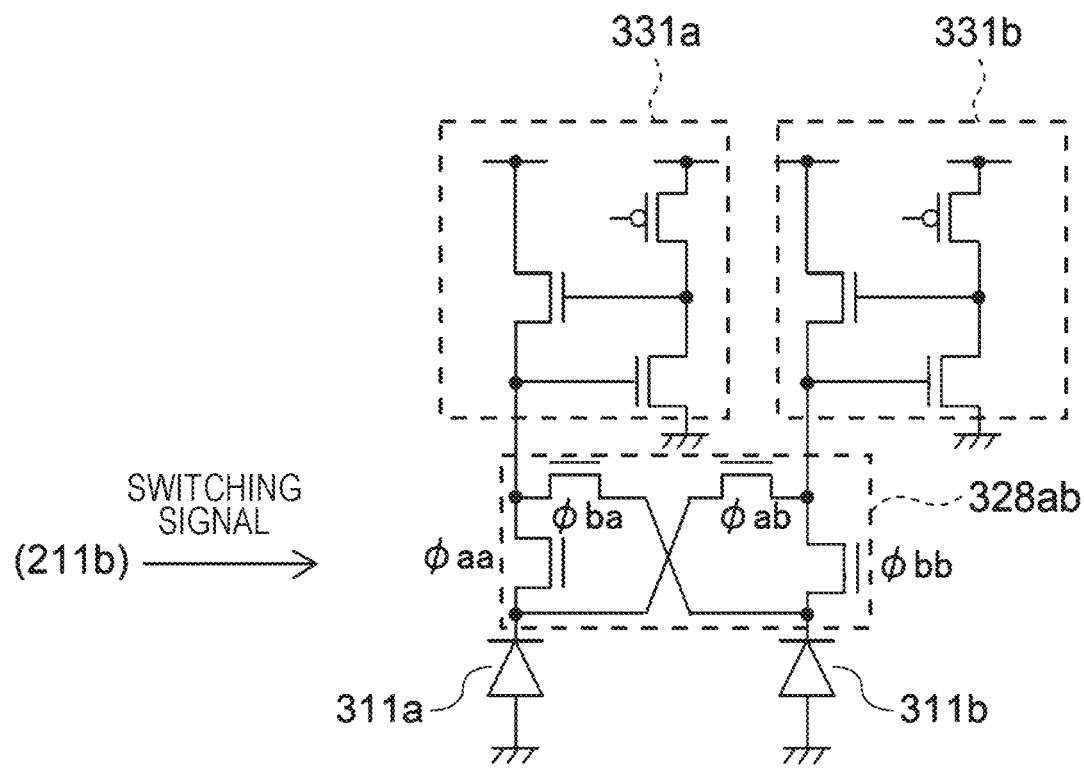
FIG. 13 is a diagram illustrating a configuration example of a switching circuit.

FIG. 12 is a diagram illustrating a configuration example of the EVS AFE 314. FIG. 13 is a diagram illustrating a configuration example of a switching circuit 328ab. Here, the photoelectric conversion element 311 included in the two EVS pixels 309 used to generate the difference value is indicated by a photoelectric conversion element 311a and a photoelectric conversion element 311b. In addition, in FIG. 13, a logarithmic conversion circuit 331 that outputs the photoelectric conversion signal photoelectrically converted by the photoelectric conversion element 311a is illustrated by a logarithmic conversion circuit 331a, and a logarithmic conversion circuit 331 that outputs the photoelectric conversion signal photoelectrically converted by the photoelectric conversion element 311b is illustrated by a logarithmic conversion circuit 331b. As illustrated in FIG. 12, each of the plurality of EVS pixels 309 includes a switching circuit 328ab, a logarithmic conversion buffer circuit 330, a difference circuit 333, a comparison circuit 334, and an output circuit 335. The logarithmic conversion buffer circuit 330 includes a logarithmic conversion circuit 331 and a buffer 332. Note that the buffer 332 according to the present embodiment corresponds to a holding circuit.

As illustrated in FIG. 13, the switching circuit 328ab switches connection between the photoelectric conversion elements 311a and b of the corresponding EVS pixels 309a and b and the logarithmic conversion circuits 331a and b. That is, the switching circuit 328ab includes a plurality of switching elements Φaa, Φab, Φbb, and Φba. The switching element Φaa is connected between the photoelectric conversion element 311a and the logarithmic conversion circuit 331a. The switching element Φab is connected between the photoelectric conversion element 311a and the logarithmic conversion circuit 331b. Similarly, the switching element Φbb is connected between the photoelectric conversion element 311b and the logarithmic conversion circuit 331b. The switching element Φba is connected between the photoelectric conversion element 311b and the logarithmic conversion circuit 331a. A conduction state (ON) and a non-conduction state (OFF) of the switching elements Φaa, Φab, Φbb, and Φba are controlled by a switching signal of the second access control circuit 211b. As the switching elements Φaa, Φab, Φbb, and Φba, for example, N-type MOS transistors are used.

The logarithmic conversion circuit 331 converts the photoelectric conversion signals from the photoelectric conversion elements 311a and b of the EVS pixels 309a and b into voltage signals of the logarithm. The logarithmic conversion circuit 331 supplies the converted voltage signal to the buffer 332. The buffer 332 buffers the voltage signal supplied from the logarithmic conversion circuit 331 and supplies the voltage signal to the difference circuit 333. By arranging the switching circuit 328ab before the logarithmic conversion circuit 331, it is possible to reduce the influence of the variation in offset of the logarithmic conversion circuit 331.

A row drive signal is supplied from the second access control circuit 211b to the difference circuit 333. The difference circuit 333 lowers the level of the voltage signal supplied from the buffer 332 according to the row drive signal. Then, the difference circuit 333 supplies the voltage signal after the level reduction to the comparison circuit 334. The comparison circuit 334 quantizes the voltage signal supplied from the difference circuit 333 into a digital signal and outputs the digital signal to the output circuit 335 as an address event VC signal or an edge event signal EVC.

The output circuit 335 transfers the address event detection signal V including the address event VC signal supplied from the comparison circuit 334 or the edge event detection signal E including the edge event signal EVC to the second signal processing unit 214 or the like. When an address event or an edge event is detected, the output circuit 335 supplies an address event detection signal V or an edge event detection signal E to the second signal processing unit 214 and the second access control circuit 211b.

(Configuration Example of Logarithmic Conversion Circuit)

Figure 14:
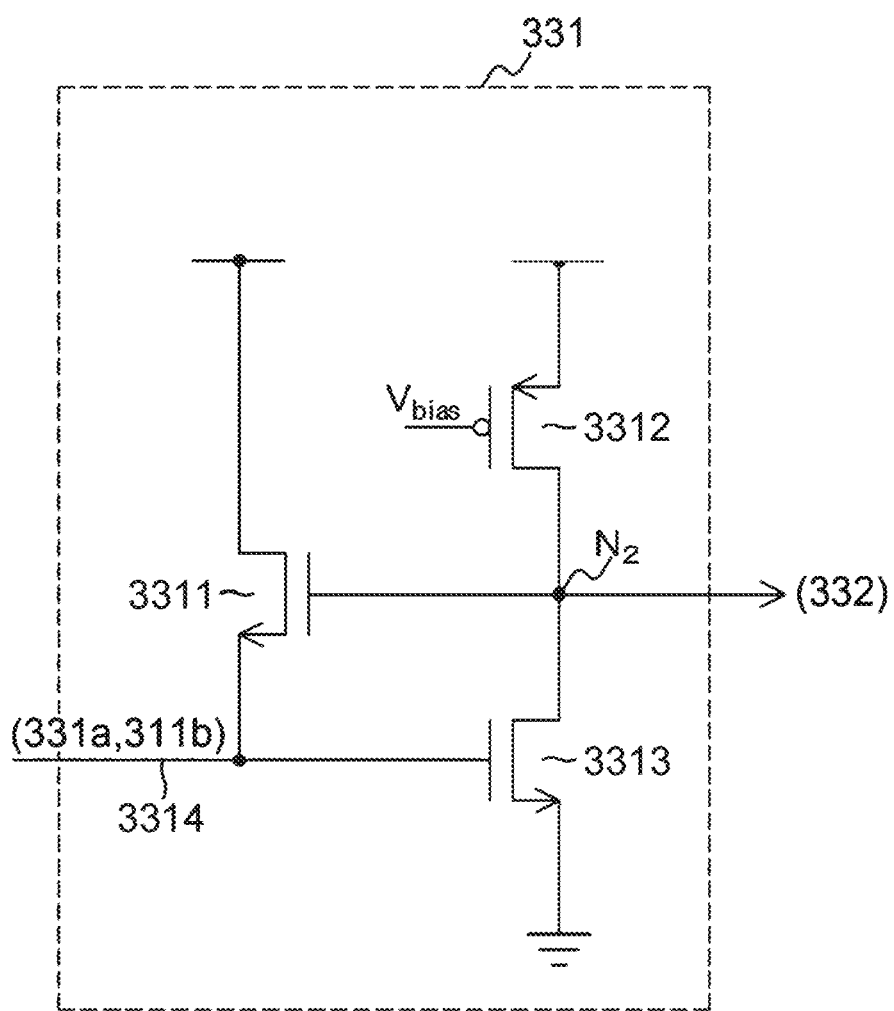
FIG. 14 is a circuit diagram illustrating an example of a configuration of a logarithmic conversion circuit in an EVS AFE.

FIG. 14 is a circuit diagram illustrating an example of a configuration of the logarithmic conversion circuit 331 in the EVS AFE 314. As illustrated in FIG. 13, the logarithmic conversion circuit 331 according to the present example has a circuit configuration including an N-type transistor 3311, a P-type transistor 3312, and an N-type transistor 3313. For example, MOS transistors are used as these transistors 3311 to 3313.

The N-type transistor 3311 is connected between the power supply line of the power supply voltage VDD and a signal input line 3314. The P-type transistor 3312 and the N-type transistor 3313 are connected in series between the power supply line of the power supply voltage VDD and the ground. Then, a common connection node N2 of the P-type transistor 3312 and the N-type transistor 3313 is connected to the gate electrode of the N-type transistor 3311 and the input terminal of the buffer 332 illustrated in FIG. 12.

A predetermined bias voltage Vbias is applied to the gate electrode of the P-type transistor 3312. As a result, the P-type transistor 3312 supplies a constant current to the N-type transistor 3313. A photocurrent is input from the photoelectric conversion element 311a or the photoelectric conversion element 311b to the gate electrode of the N-type transistor 3313 through the signal input line 3314.

Drain electrodes of the N-type transistor 3311 and the N-type transistor 3313 are connected to a power supply side, and such a circuit is called a source follower. The photocurrent from the light receiving unit 31 is converted into a logarithmic voltage signal by the two source followers connected in a loop.

(Configuration Examples of Difference Circuit and Comparison Circuit)

Figure 15:
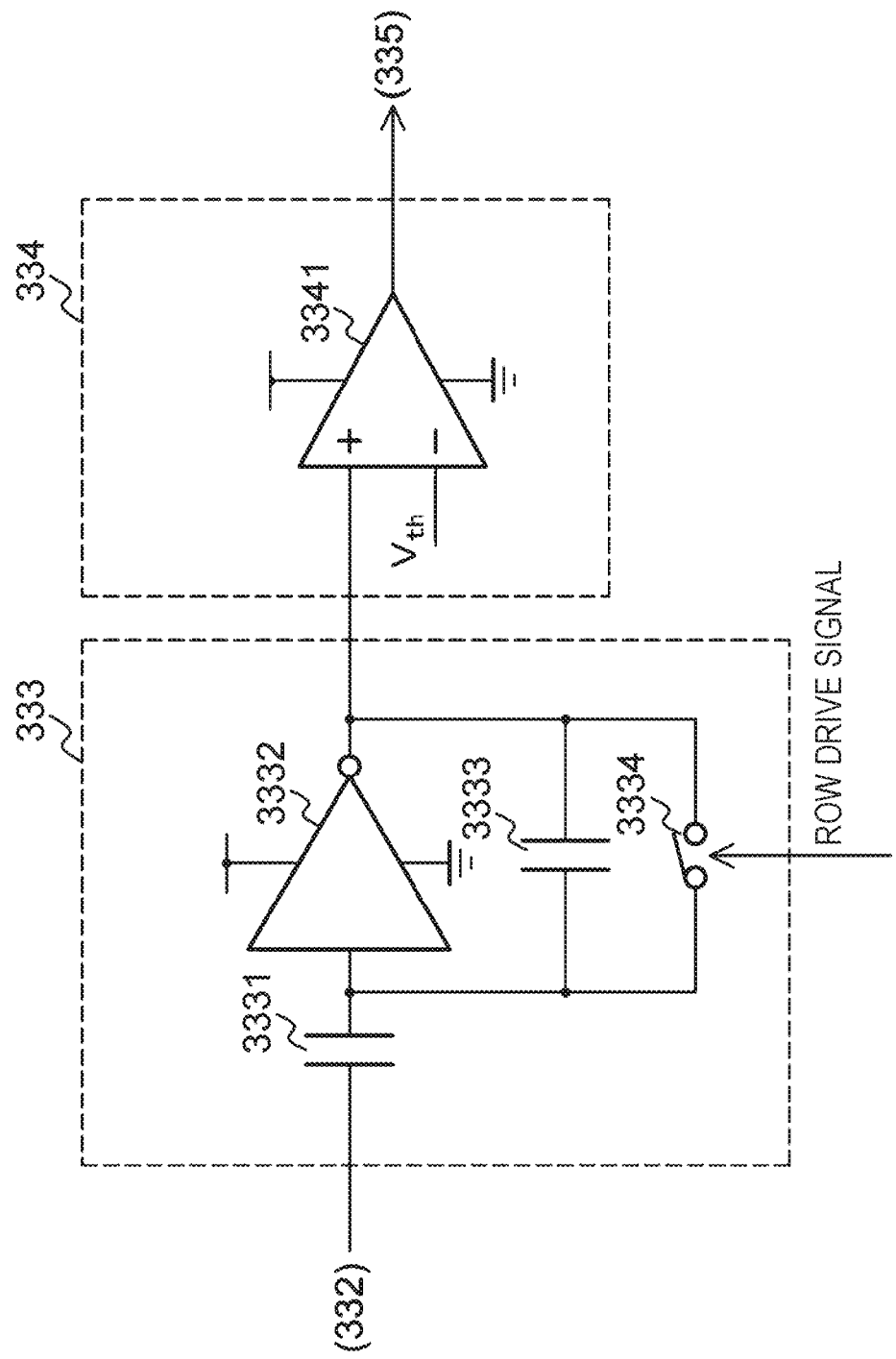
FIG. 15 is a circuit diagram illustrating an example of configurations of a difference circuit and a comparison circuit in an EVS AFE.

FIG. 15 is a circuit diagram illustrating an example of the configurations of the difference circuit 333 and the comparison circuit 334 in the EVS AFE 314.

The difference circuit 333 according to the present example includes a capacitive element 3331, an inverter circuit 3332, a capacitive element 3333, and a switch element 3334.

One end of the capacitive element 3331 is connected to the output terminal of the buffer 332 illustrated in FIG. 12, and the other end thereof is connected to the input terminal of the inverter circuit 3332. The capacitive element 3333 is connected in parallel to the inverter circuit 3332. The switch element 3334 is connected between both ends of the capacitive element 3333. The row drive signal is supplied from the second access control circuit 211b to the switch element 3334 as an on/off control signal. The switch element 3334 turns on or off a path connecting both ends of the capacitive element 3333 according to the row drive signal. The inverter circuit 3332 inverts the polarity of the voltage signal input via the capacitive element 3331.

In the difference circuit 333 having the configuration described above, when the switch element 3334 is turned on (closed), the voltage signal Vinit is input to the terminal of the capacitive element 3331 on the buffer 332 side, and the terminal on the opposite side becomes a virtual ground terminal. The potential of the virtual ground terminal is set to zero for convenience. At this time, when the capacitance value of the capacitive element 3331 is C1, electric charge Qinit accumulated in the capacitive element 3331 is expressed by the following Expression (1). On the other hand, since both ends of the capacitive element 3333 are short-circuited, the capacitive element 3333 has no accumulated electric charges.

$$Q\text{init} = C1 \times V\text{init} \quad (1)$$

Next, considering a case where the switch element 3334 is turned off (open) and the voltage of the terminal of the capacitive element 3331 on the buffer 332 side changes to Vafter, electric charge Qafter accumulated in the capacitive element 3331 is expressed by the following Expression (2).

$$Q\text{after} = C1 \times V\text{after} \quad (2)$$

On the other hand, when the capacitance value of the capacitive element 3333 is C2 and the output voltage is Vout, the electric charge Q2 accumulated in the capacitive element 3333 is expressed by the following Expression (3).

$$Q2 = -C2 \times V\text{out} \quad (3)$$

At this time, since the total amount of electric charge of the capacitive element 3331 and the capacitive element 3333 does not change, the following Expression (4) is established.

$$Q\text{init} = Q\text{after} + Q2 \quad (4)$$

When Expressions (1) to (3) are substituted into Expression (4) and rearranged, the following Expression (5) is obtained.

$$V\text{out} = -(C1/C2) \times (V\text{after} - V\text{init}) \quad (5)$$

Expression (5) represents difference operation of the voltage signal, and the gain of the difference result is C1/C2. Since it is generally desired to maximize the gain, it is preferable to design C1 larger and C2 smaller. On the other hand, when C2 is too small, kTC noise increases, and noise characteristics may deteriorate, so the decrease in capacitance C2 is limited to a range in which noise can be tolerated. In addition, since the EVS AFE 314 including the difference circuit 333 is mounted for each EVS pixel 309, the capacitive element 3331 and the capacitive element 3333 have area restrictions. The capacitance values C1 and C2 of the capacitive elements 3331 and 3333 are determined in consideration of these factors.

In FIG. 15, the comparison circuit 334 includes a comparator 3341. The comparator 3341 receives the output signal of the inverter circuit 3332, that is, the voltage signal from the difference circuit 333 as a non-inverting (+) input, and receives the predetermined threshold value voltage Vth as an inverting (−) input. Then, the comparator 3341 compares the voltage signal from the difference circuit 333 with a predetermined threshold value voltage Vth, and outputs a signal indicating a comparison result to the output circuit 335 as an address event signal VC or an edge event signal EVC.

Note that the comparison circuit 334 may include an absolute value circuit, and may compare the absolute value of the signal output from the difference circuit 333 with the threshold value voltage Vth. In this case, when the output of the difference circuit 333 is positive, for example, the output circuit 335 outputs the signal as the address-on event signal VCH or the edge-on event signal EVCH. On the other hand, when the output of the difference circuit 333 is negative, for example, the output circuit 335 outputs the signal as the address-off event signal VCL or the edge-off event signal EVCL.

(EVS Driving and Neighboring Pixel Difference Driving)

Here, the EVS driving and the neighboring pixel difference driving will be described with reference to FIGS. 16A to 17C.

FIG. 16A is a diagram illustrating a configuration example of the EVS AFEs 314a and 314b including a configuration example of the switching circuit 328ab. Note that the neighboring pixel difference driving is driving for performing signal value difference processing between the two EVS pixels 309a and 309b. As described above, the two EVS pixels 309a and 309b include neighboring pixels in addition to the adjacent pixels. The neighboring pixels include, for example, pixels in four adjacent pixels, pixels in eight adjacent pixels, and the like.

Figure 16B:
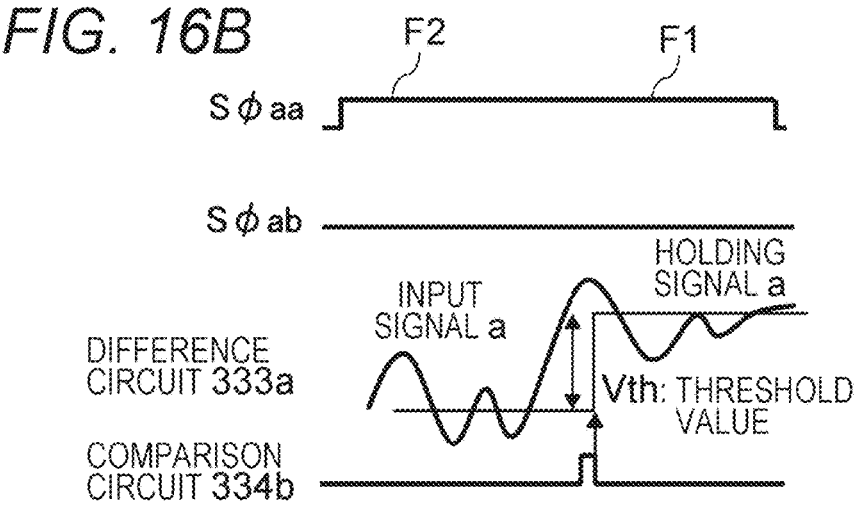
FIG. 16B is a diagram illustrating an example of generating an address-off event detection signal at the time of EVS driving.

FIG. 16B is a diagram illustrating an example of generating the address-off event detection signal VCL at the time of EVS driving. Here, the horizontal axis represents time, and the control signal SΦaa of the switching element Φaa, the control signal SΦab of the switching element Φab, the output signal of the difference circuit 333a, and the output signal of the comparison circuit 334a are illustrated from the top. Each of the frame time F1 and the frame time F2 corresponds to, for example, a time for sequentially reading all the pixel blocks 30a (see FIG. 6) from the top to the bottom row. The switching element Φaa is in a connected state when the control signal SΦaa is at a high level, and is in a disconnected state when the control signal SΦaa is at a low level. Similarly, the switching element Φab enters a connected state when the control signal SΦab is at a high level, and enters a disconnected state when the control signal SΦab is at a low level.

As a result, as illustrated in FIG. 16B, the signal from the EVS pixel 309a is supplied to the difference circuit 333a at the frame times F1 and F2 during which the control signal SΦaa is at the high level. The difference circuit 333a calculates a difference between the holding signal a read from the logarithmic conversion buffer circuit 330a at the frame time F1 and held in the logarithmic conversion buffer circuit 330a, and the input signal a newly read from the logarithmic conversion buffer circuit 330a at the frame time F2, and outputs a difference signal. The value of the difference signal is negative and its absolute value exceeds the threshold value Vth. As a result, the comparison circuit 334a outputs the event signal as a high level when the frame time F1 is switched to the frame time F2. Since the output of the difference circuit 333a is negative, the output circuit 335a outputs, as the address event detection signal V, a signal (Xa, Ya, T, VC=−1) including the address information (Xa, Ya), the time stamp information T, and the address-off event signal VCL to the second signal processing unit 214. As described above, the address event signal VC=−1 corresponds to the address-off event signal VCL, and the address event signal VC=1 corresponds to the address-on event signal VCH. Note that the output circuit 335a is configured not to output a signal in a case where the value of the difference signal does not exceed the threshold value Vth.

Figure 16C:
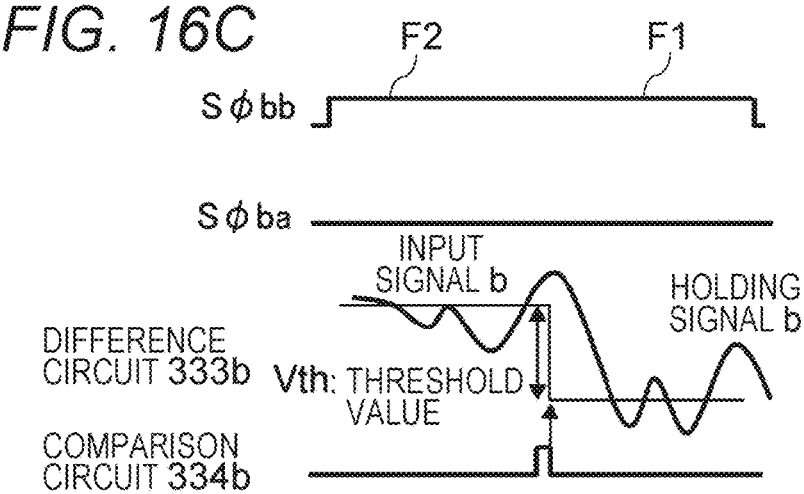
FIG. 16C is a diagram illustrating an example of generating an address-on event detection signal at the time of EVS driving.

FIG. 16C is a diagram illustrating an example of generating the address-on event detection signal VCH at the time of EVS driving. Similarly to FIG. 16B, the horizontal axis represents time, and the control signal SΦbb of the switching element Φbb, the control signal SΦba of the switching element Φba, the output signal of the difference circuit 333b, and the output signal of the comparison circuit 334b are illustrated from the top. The switching element Φbb enters a connected state when the control signal SΦbb is at a high level, and enters a disconnected state when the control signal SΦbb is at a low level. Similarly, the switching element Φba enters a connected state when the control signal SΦba is at a high level, and enters a disconnected state when the control signal SΦba is at a low level.

As a result, as illustrated in FIG. 16C, the signal from the EVS pixel 309b is supplied to the difference circuit 333b at the frame times F1 and F2 during which the control signal SΦbb is at the high level. The difference circuit 333b calculates a difference between the holding signal b read from the logarithmic conversion buffer circuit 330b at the frame time F1 and held in the logarithmic conversion buffer circuit 330b, and the input signal b newly read from the logarithmic conversion buffer circuit 330b at the frame time F2, and outputs a difference signal. The value of the difference signal is positive and its absolute value exceeds the threshold value Vth. As a result, the comparison circuit 334b outputs the event detection signal as a high level when the frame time F1 is switched to the frame time F2. Since the output of the difference circuit 333b is positive, the output circuit 335a outputs, as the address event detection signal V, a signal (Xb, Yb, T, VC=1) including the address information (Xb, Yb), the time stamp information T, and the address-on event detection signal VCH) to the second signal processing unit 214. As described above, at the time of the EVS driving, the address event detection signal V is output to the second signal processing unit 214.

Figure 17A:
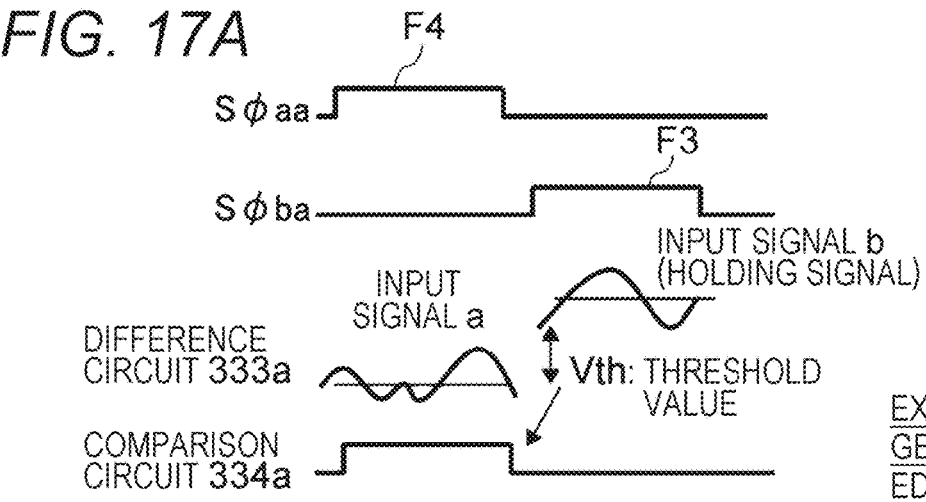
FIG. 17A is a diagram illustrating an example of generating an edge-off event detection signal at the time of neighboring pixel difference driving.

FIG. 17A is a diagram illustrating an example of generating the edge-off event detection signal EVCL at the time of the neighboring pixel difference driving. Similarly to FIG. 16B, the horizontal axis represents time, and the control signal SΦaa of the switching element Φaa, the control signal SΦab of the switching element Φab, the output signal of the difference circuit 333a, and the output signal of the comparison circuit 334a are illustrated from the top.

As illustrated in FIG. 17A, the signal from the EVS pixel 309b is supplied to the difference circuit 333a at the frame time F3 in which the control signal SΦba is at the high level and the control signal SΦaa is at the low level. Conversely, the signal from the EVS pixel 309a is supplied to the difference circuit 333a at the frame time F4 in which the control signal SΦba is at the low level and the control signal SΦaa is at the high level.

As a result, the difference circuit 333a calculates a difference between the holding signal b read from the logarithmic conversion buffer circuit 330b at the frame time F3 and held in the logarithmic conversion buffer circuit 330b and the input signal a newly read from the logarithmic conversion buffer circuit 330a at the frame time F4, and outputs the difference signal. The value of the difference signal is negative and its absolute value exceeds the threshold value Vth. As a result, the output circuit 335a outputs, as the edge event detection signal E, a signal ((Xa, Ya), (Xb, Yb), T, EVC=−1) including the address information (Xa, Ya), (Xb, Yb), the time stamp information T, and the edge-off event detection signal EVCL to the second signal processing unit 214. As described above, the edge event signal EVC=−1 corresponds to the edge-off event signal EVCL, and the edge event detection signal EVC=1 corresponds to the edge-on event detection signal EVCH.

Figure 17B:
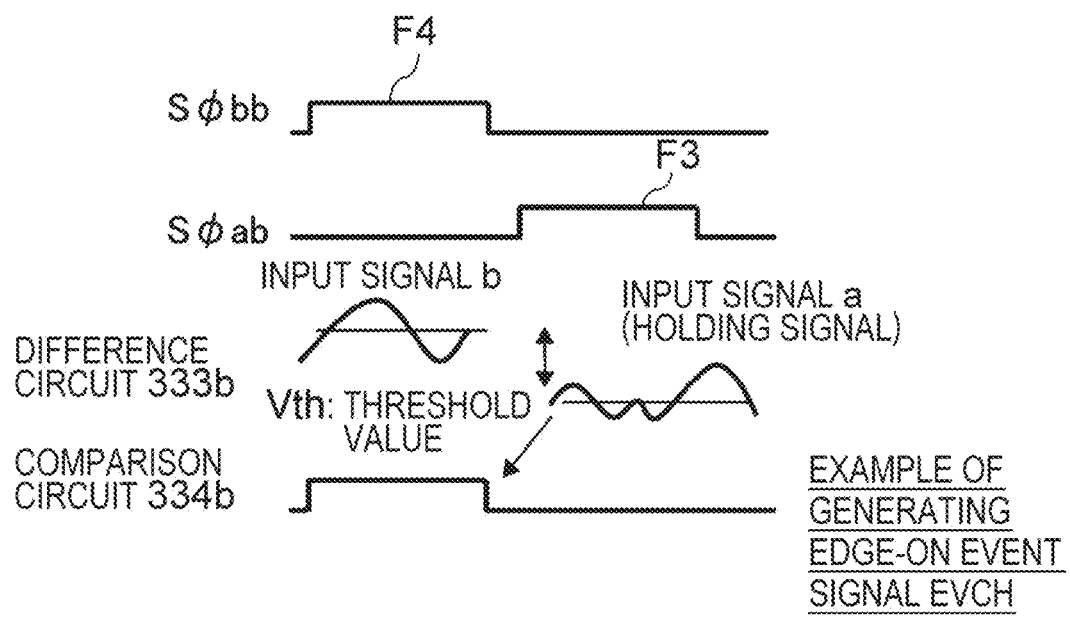
FIG. 17B is a diagram illustrating an example of generating an edge-on event detection signal E at the time of neighboring pixel difference driving.

FIG. 17B is a diagram illustrating an example of generating the edge-on event detection signal EVCH at the time of the neighboring pixel difference driving. Similarly to FIG. 17A, the horizontal axis represents time, and the control signal SΦbb of the switching element Φbb, the control signal SΦab of the switching element Φab, the output signal of the difference circuit 333b, and the output signal of the comparison circuit 334b are illustrated from the top. The switching element Φbb enters a connected state when the control signal SΦbb is at a high level, and enters a disconnected state when the control signal SΦbb is at a low level. Similarly, the switching element Φab enters a connected state when the control signal SΦab is at a high level, and enters a disconnected state when the control signal SΦab is at a low level.

As a result, as illustrated in FIG. 17B, the signal from the EVS pixel 309a is supplied to the difference circuit 333b at the frame time F3 in which the control signal SΦab is at the high level and the control signal SΦbb is at the low level. Conversely, the signal from the EVS pixel 309b is supplied to the difference circuit 333b at the frame time F4 in which the control signal SΦab is at the low level and the control signal SΦbb is at the high level.

The difference circuit 333b calculates a difference between the holding signal a read from the logarithmic conversion buffer circuit 330a at the frame time F3 and held in the logarithmic conversion buffer circuit 330a, and the input signal b newly read from the logarithmic conversion buffer circuit 330b at the frame time F4, and outputs a difference signal. The value of the difference signal is positive and its absolute value exceeds the threshold value Vth. As a result, the comparison circuit 334b outputs the event detection signal as a high level when the frame time F3 is switched to the frame time F4. Since the difference signal of the difference circuit 333b is positive, the output circuit 335b outputs, as the edge event detection signal E, a signal ((Xa, Ya), (Xb, Yb), T, EVC=1) including the address information (Xa, Ya), (Xb, Yb) of the EVS pixels 309a and 309b, the time stamp information T, and the edge-off event detection signal EVCH) to the second signal processing unit 214. As described above, at the time of the neighboring pixel difference driving, the signal input is switched between the corresponding EVS pixels according to the frame times F3 and F4, and the edge event detection signal E is output to the second signal processing unit 214.

Figure 18A:
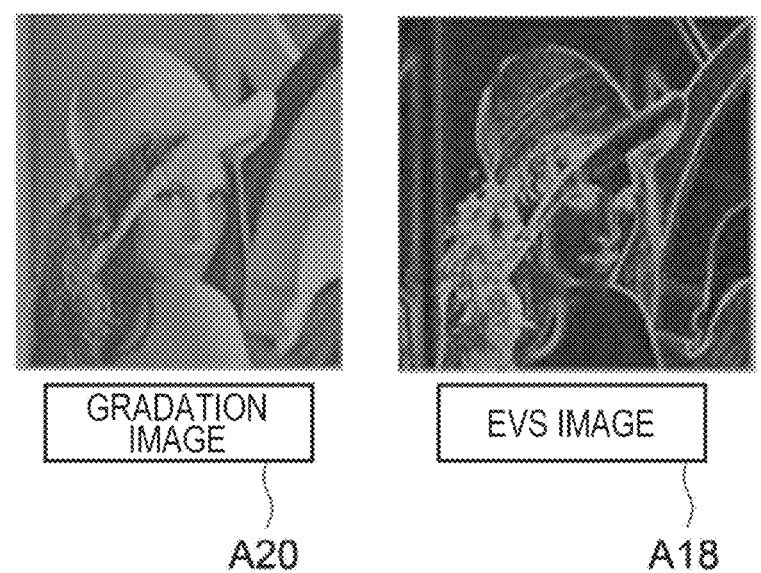
FIG. 18A is a diagram illustrating a gradation image and an EVS image based on an address event detection signal.
Figure 18B:
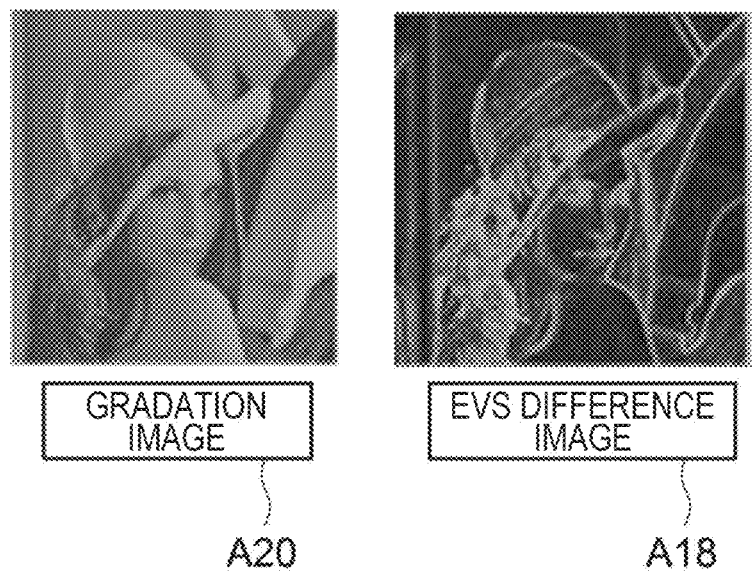
FIG. 18B is a diagram illustrating a gradation image and an EVS difference image based on an edge event detection signal.

FIG. 18A is a diagram illustrating a gradation image based on the output of the gradation pixels 308 displayed on the display unit 170 and an EVS image based on the address event detection signal VC. FIG. 18B is a diagram illustrating a gradation image based on the output of the gradation pixels 308 and an EVS difference image based on the edge event detection signal EVC. As illustrated in FIG. 18A, the first signal processing unit 213 arranges gradation signals based on outputs of the gradation pixels 308 as pixel signals in a two-dimensional lattice pattern to generate a gradation image. In addition, the second signal processing unit 214 arranges the address event signals VC as pixel signals in a two-dimensional lattice pattern to generate an EVS image. In this case, for example, the value of the address event signal VC is multiplied by 1000 and added by 1000. As a result, for example, in the pixel values of the EVS image, the pixel value of the region where the address-on event has occurred is 2000, the pixel value of the region where the address-off event has occurred is 0, and the pixel value of the region where the address event has not occurred is 1000. Then, the display unit 170 displays, for example, the gradation image and the EVS image side by side. In the present embodiment, the pixel values are 2000, 1000, and 0, but it is not limited thereto. For example, three values such as 150,100 and 50 may be used.

The second signal processing unit 214 may generate the EVS image on the basis of the absolute value of the value of the address event signal VC. In this case, for example, the absolute value of the address event signal VC is multiplied by 1000 and added with 0. As a result, for example, in the pixel values of the EVS image, the pixel value of the region where the address event has occurred is 1000, and the pixel value of the region where the address event has not occurred is 0. In addition, the display unit 170 displays a display form indicating an EVS image in the area A18. Similarly, the display unit 170 displays a display form indicating a gradation image in the area A20. As a result, the observer can more accurately determine the type of the display image.

As illustrated in FIG. 18B, the second signal processing unit 214 arranges the edge event signal EVC as a pixel signal in a two-dimensional lattice pattern to generate an EVS difference image. In this case, for example, the value of the edge event signal EVC is multiplied by 1000 and added by 1000. As a result, for example, in the values of the EVS difference image, the pixel value of the region where the edge-on event has occurred is 2000, the pixel value of the region where the edge-off event has occurred is 0, and the pixel value of the region where the edge event has not occurred is 1000. The display unit 170 displays, for example, the gradation image and the EVS difference image side by side.

The second signal processing unit 214 may generate the EVS difference image on the basis of the absolute value of the value of the edge event signal EVC. In this case, for example, the absolute value of the edge event signal EVC is multiplied by 1000 and added with 0. As a result, for example, in the pixel values of the EVS difference image, the pixel value of the region where the edge event has occurred is 1000, and the pixel value of the region where the edge event has not occurred is 0. In addition, the display unit 170 displays a display form indicating the EVS difference image in the area A18. Similarly, the display unit 170 displays a display form indicating a gradation image in the area A20. As a result, the observer can more accurately determine the type of the display image.

As described above, according to the present embodiment, the EVS AFE 314 switches whether to generate the time series change of the signal based on the photoelectric conversion element 311 on the basis of the output signal of the same EVS pixel 309a or on the basis of the output signals of two corresponding neighboring EVS pixels 309a and b. As a result, the second signal processing unit 214 can generate at least one of the EVS image or the EVS difference image using at least one of the address event signal VC or the edge event signal EVC as a pixel signal. Therefore, in a case where there is movement of the imaging target, an image including edge information of the imaging target can be generated as the EVS image, and even in a case where there is no movement of the imaging target, an image including edge information of the imaging target can be generated as the EVS difference image.

(First Modification of First Embodiment)

The EVS AFEs 314a and 314b of the electronic device 100 according to the first embodiment constitute the switching circuit 328ab between the EVS pixels 309a and b and the logarithmic conversion buffer circuits 330a and b, but the EVS AFE 314a of the electronic device 100 according to a first modification of the first embodiment is different in that the switching circuit 328ab is constituted between the logarithmic conversion buffer circuits 330a and b and the difference circuits 333a and b. Hereinafter, differences from the electronic device 100 according to the first embodiment will be described.

FIG. 19 is a diagram illustrating a configuration example of EVS AFEs 314a and 314b according to the first modification of the first embodiment. As illustrated in FIG. 19, the switching circuit 328ab is configured between the logarithmic conversion buffer circuits 330a and b and the difference circuits 333a and b. By the logarithmic conversion buffer circuits 330a and b, the signal can be switched by the switching circuit 328ab after the voltage conversion, and the output signals of the EVS pixel 309a and the EVS pixel 309b can be simultaneously detected.

For example, the switching element Φaa and the switching element Φab can be brought into a connected state, the switching element Φba and the fourth switching element switching element Φbb can be brought into a disconnected state, the threshold value of the difference circuit 333a can be set to the first threshold value, and the threshold value of the difference circuit 333b can be set to the second threshold value different from the first threshold value. As a result, different edge information can be obtained between two corresponding pixels.

(Second Modification of First Embodiment)

The EVS AFE 314 of the electronic device 100 according to a second modification of the first embodiment is different from the EVS AFE 314 of the electronic device 100 according to the first modification of the first embodiment in that the switching circuit 328ab includes three switching elements. Hereinafter, differences from the electronic device 100 according to the first modification of the first embodiment will be described.

Figure 20:
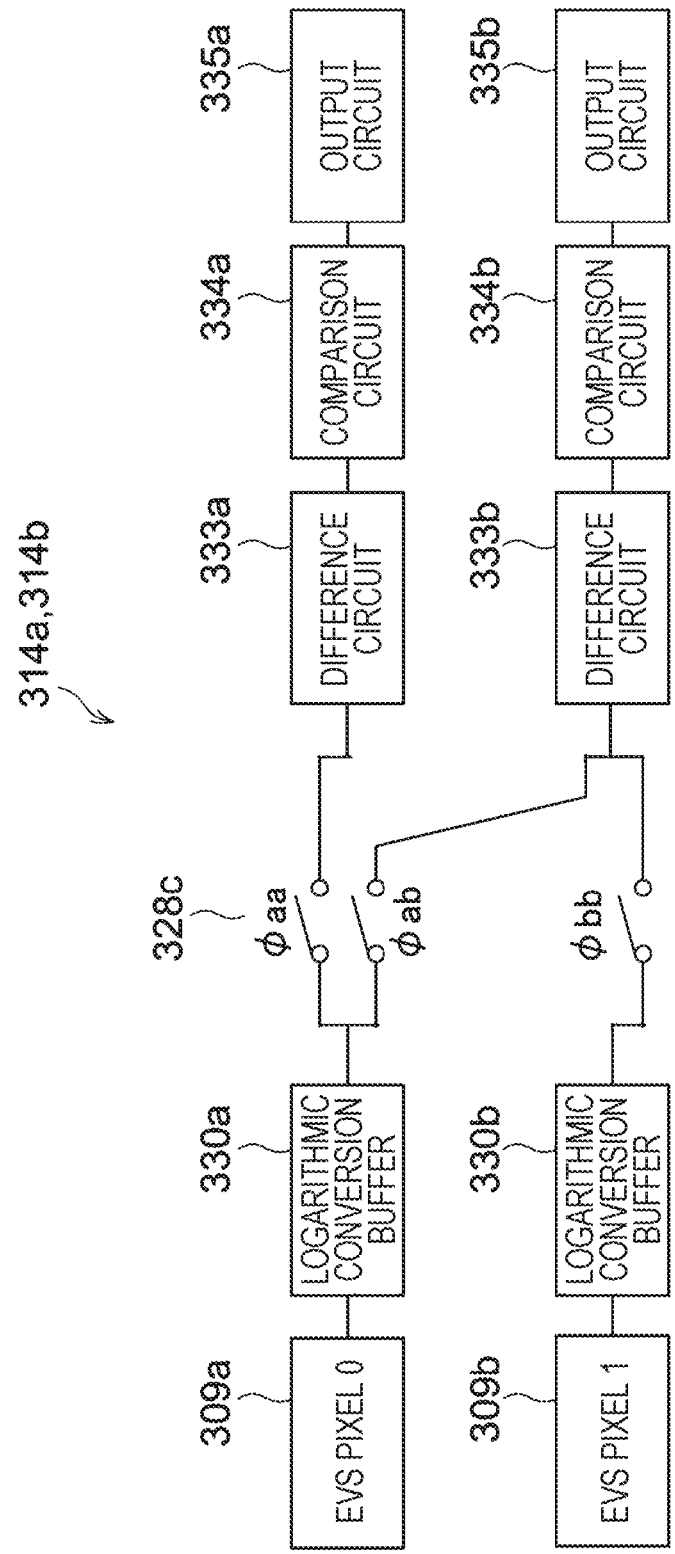
FIG. 20 is a diagram illustrating a configuration example of an EVS AFE according to a second modification of the first embodiment.

FIG. 20 is a diagram illustrating a configuration example of EVS AFEs 314a and 314b according to the second modification of the first embodiment. As illustrated in FIG. 20, the switching circuit 328ab includes the switching elements Φaa, Φab, and Φbb. As a result, the area of the switching circuit 328ab can be further reduced.

(Third Modification of First Embodiment)

The EVS AFEs 314a, 314b, 314c, and 314d of the electronic device 100 according to a third modification of the first embodiment are different from the EVS AFE 314 of the electronic device 100 according to the first modification of the first embodiment in that switching timings of the plurality of switching circuits 328ab and 328cd are different. Hereinafter, differences from the electronic device 100 according to the first modification of the first embodiment will be described.

Figure 21:
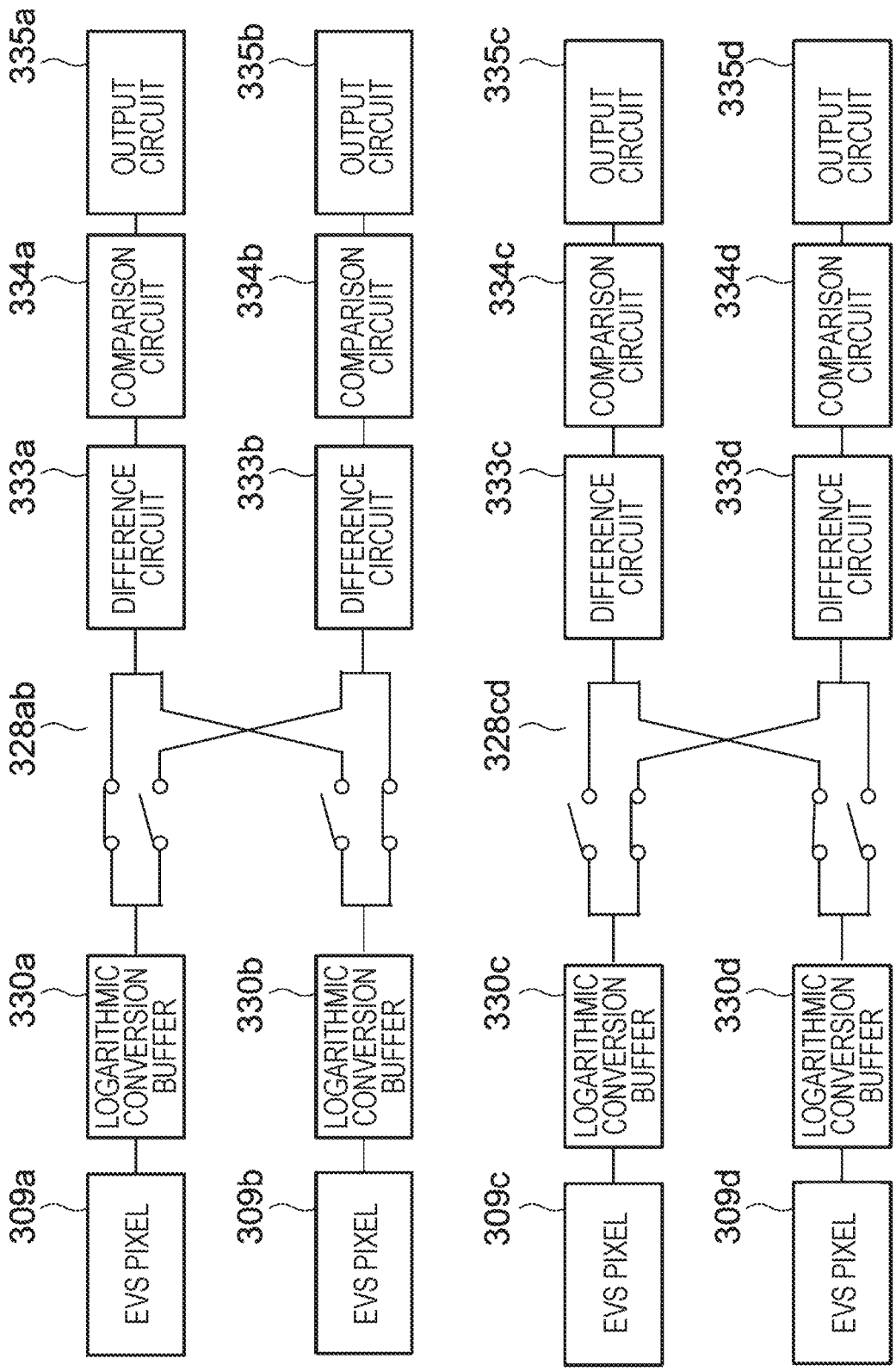
FIG. 21 is a diagram illustrating a configuration example of an EVS AFE according to a third modification of the first embodiment.

FIG. 21 is a diagram illustrating a configuration example of an EVS AFE 314 according to the third modification of the first embodiment. As illustrated in FIG. 21, the plurality of switching circuits 328ab and 328cd is driven differently. For example, the switching circuit 328ab performs EVS driving, and the switching circuit 328cd performs neighboring pixel difference driving. As a result, it is possible to generate a signal for the EVS image and a signal for the EVS difference image for each pixel block 30a (see FIG. 6).

(Fourth Modification of First Embodiment)

The EVS AFEs 314a, 314b, 314c, and 314d of the electronic device 100 according to a fourth modification of the first embodiment are different from the EVS AFEs 314a and 314b of the electronic device 100 according to the first modification of the first embodiment in that the switching circuit 328q is configured to be able to generate a difference between signals based on outputs between four EVS pixels. Hereinafter, differences from the electronic device 100 according to the first modification of the first embodiment will be described.

Figure 22:
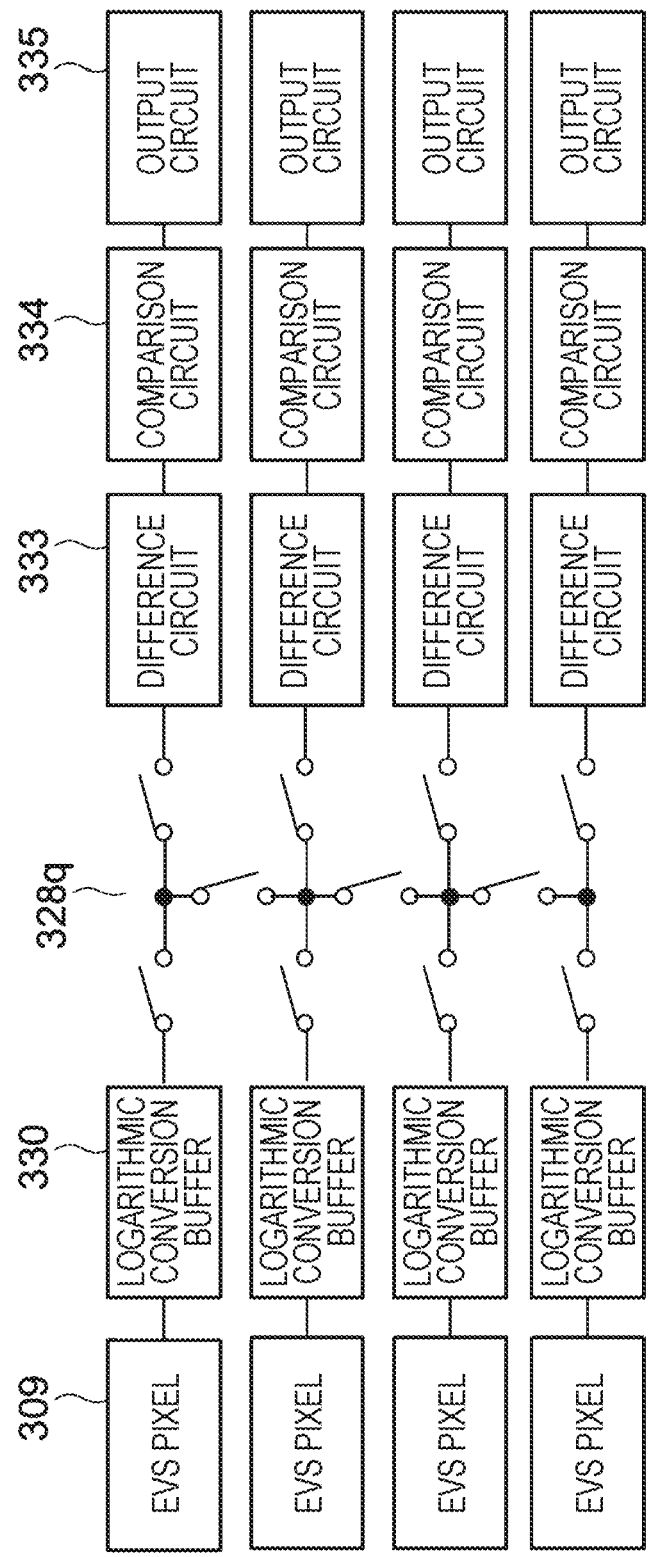
FIG. 22 is a diagram illustrating a configuration example of an EVS AFE according to a fourth modification of the first embodiment.

FIG. 22 is a diagram illustrating a configuration example of EVS AFEs 314a, 314b, 314c, and 314d according to the fourth modification of the first embodiment. As illustrated in FIG. 22, the switching circuit 328q is configured to be able to generate a difference between signals based on outputs between the four EVS pixels 309. As a result, for example, an EVS difference image between four adjacent EVS pixels can be generated.

(Fifth Modification of First Embodiment)

The EVS AFEs 314a and 314b of the electronic device 100 according to a fifth modification of the first embodiment are different from the electronic device 100 according to the first modification of the first embodiment in that the outputs of the difference circuits 333a and 333b are configured to be output to the comparison circuit 334 by a multiplexer 336. Hereinafter, differences from the electronic device 100 according to the first modification of the first embodiment will be described.

Figure 23:
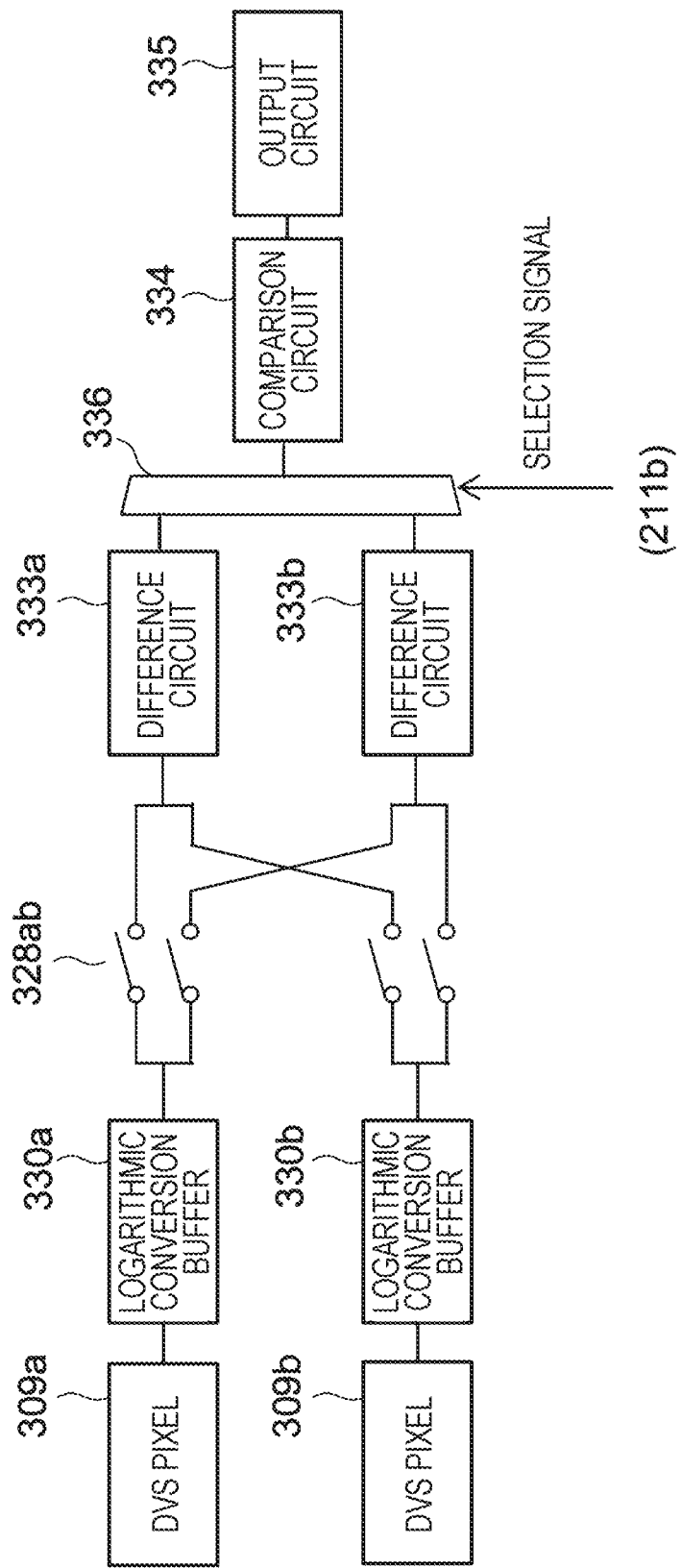
FIG. 23 is a diagram illustrating a configuration example of an EVS AFE according to a fifth modification of the first embodiment.

FIG. 23 is a diagram illustrating a configuration example of EVS AFEs 314a and 314b according to the fifth modification of the first embodiment. As illustrated in FIG. 23, the present embodiment is different from the EVS AFEs 314a and 314b according to the first modification of the first embodiment in that a multiplexer 336 is included. The multiplexer 336 selects outputs of the difference circuits 333a and 333b under the control of the second access control circuit 211b. As a result, the EVS AFEs 314a and 314b can share the output circuit 335 with the comparison circuit 334, and the EVS AFEs 314a and 314b can be further downsized.

(Sixth Modification of First Embodiment)

The EVS AFEs 314a and 314b of the electronic device 100 according to the second modification of the first embodiment are different from the EVS AFEs 314a and 314b of the electronic device 100 according to the first modification of the first embodiment in that the switching circuit 328d includes two switching elements. Hereinafter, differences from the electronic device 100 according to the first modification of the first embodiment will be described.

Figure 24:
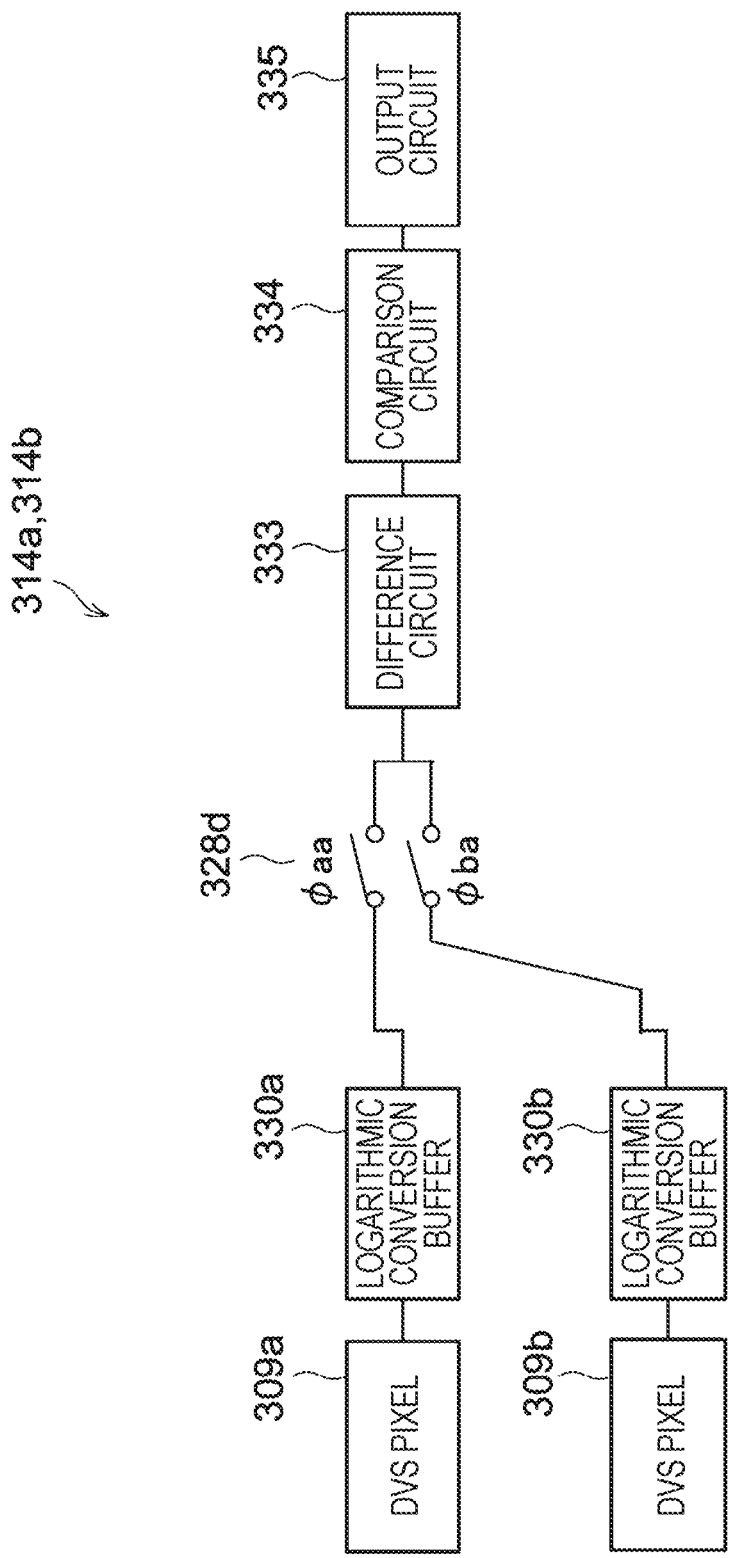
FIG. 24 is a diagram illustrating a configuration example of an EVS AFE according to a sixth modification of the first embodiment.

FIG. 24 is a diagram illustrating a configuration example of an EVS AFE 314 according to a sixth modification of the first embodiment. As illustrated in FIG. 24, the switching circuit 328ab includes switching elements Φaa and Φba. As a result, the area of the switching circuit 328ab can be further reduced. In addition, the difference circuit 333, the comparison circuit 334, and the output circuit 335 can be shared, and the EVS AFEs 314a and 314b can be further downsized.

(Seventh Modification of First Embodiment)

The EVS AFEs 314a, 314b, 314c, and 314d of the electronic device 100 according to a seventh modification of the first embodiment are different from the EVS AFEs 314a and 314b of the electronic device 100 according to the first embodiment in that the switching circuit 328q is configured to be able to generate a difference between signals based on outputs between four EVS pixels. Hereinafter, differences from the electronic device 100 according to the first embodiment will be described.

Figure 25:
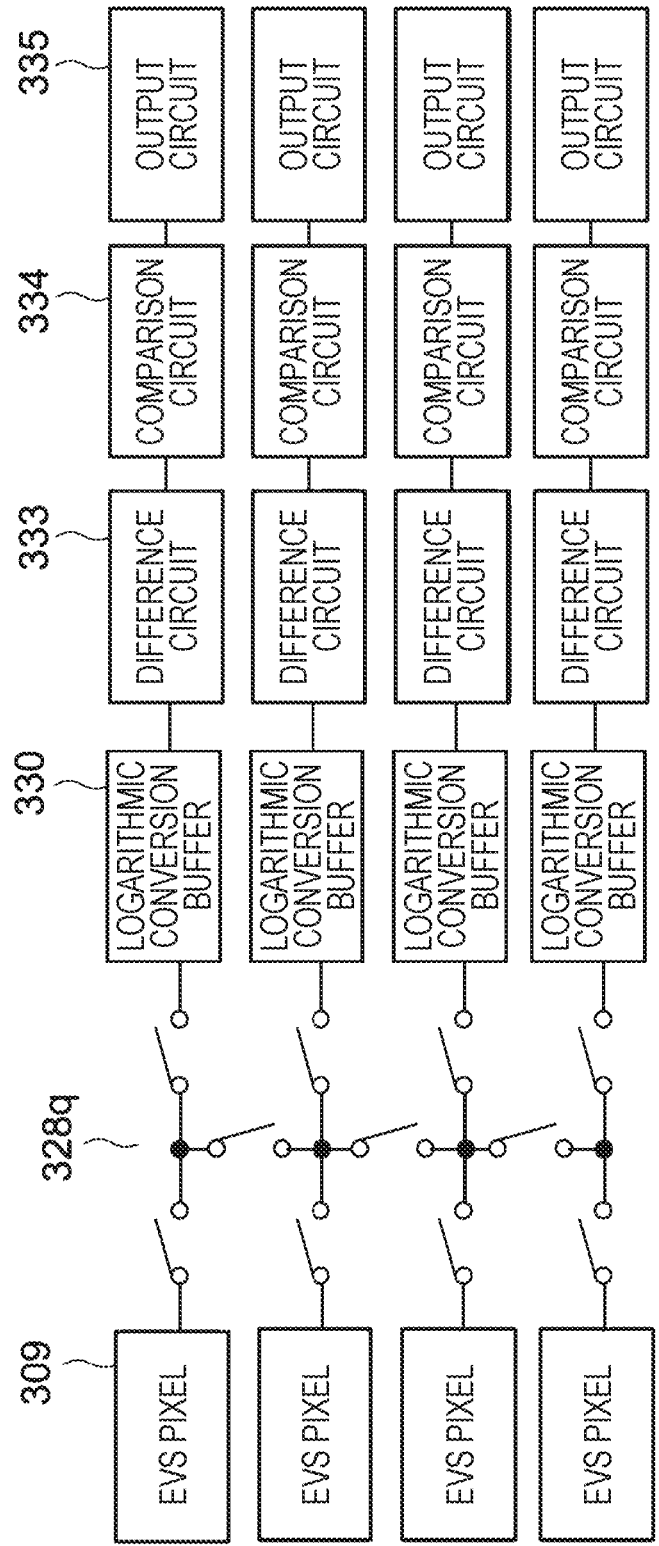
FIG. 25 is a diagram illustrating a configuration example of an EVS AFE according to a seventh modification of the first embodiment.

FIG. 25 is a diagram illustrating a configuration example of EVS AFEs 314a, 314b, 314c, and 314d according to the seventh modification of the first embodiment. As illustrated in FIG. 25, the switching circuit 328q is configured between four EVS pixels 309 and four logarithmic conversion buffer circuits 331. As a result, for example, it is possible to generate an EVS difference image between four adjacent EVS pixels 309 in a state where the variation in offset between the four logarithmic conversion buffer circuits 309 is reduced.

(Eight Modification of First Embodiment)

A solid-state imaging element 200 according to a second embodiment according to an eight modification of the first embodiment is different from the imaging device 100 according to the first embodiment in that a luminance signal is read from between EVS pixels 309 using an arbiter circuit 218. The differences from the imaging device 100 according to the first embodiment will be described below.

Figure 26:
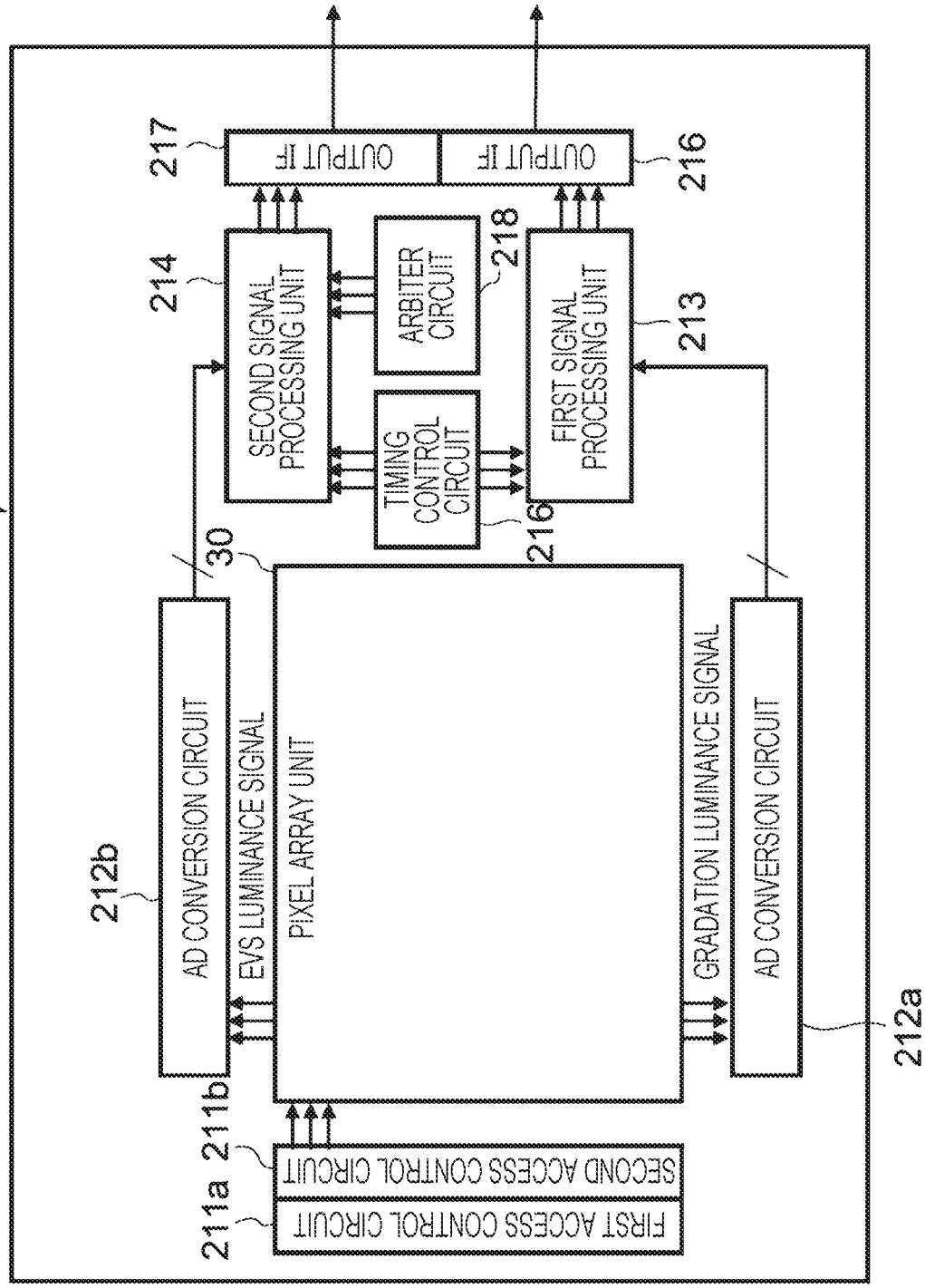
FIG. 26 is a block diagram illustrating a configuration example of a solid-state imaging element according to an eight modification of the first embodiment.

FIG. 26 is a block diagram illustrating a configuration example of the solid-state imaging element 200 according to the eight modification of the first embodiment. As illustrated in FIG. 26, the solid-state imaging element 200 according to the present disclosure includes an arbiter circuit 218.

As illustrated in FIG. 26, the EVS AFE 314 according to the eight modification of the first embodiment outputs a request to the arbiter circuit 218 when an address event or an edge event occurs.

The arbiter circuit 218 arbitrates a request from each of the plurality of EVS EFEs 314 and transmits a response based on the arbitration result to the EVS AFE 314. Upon receiving the response from the arbiter circuit 218, the EVS AFE 314 supplies the address event detection signal V or the edge event detection signal E to the second signal processing unit 214.

In the case of the first mode and the second mode, the second signal processing unit 214 further outputs a signal including information indicating the position of the EVS AFE 314 where the address event or the edge event has occurred to the second access control circuit 211b and the timing control circuit 215. The second access control circuit 211b controls the switching element 312 of the EVS pixel 309 whose position is indicated, and causes the AD conversion circuit 212b to output the EVS luminance signal.

As described above, according to the present embodiment, since the arbiter circuit 218 arbitrates and outputs the information only from the EVS AFE 314 in which the address event or the edge event has occurred, the speed can be further increased.

(Ninth Modification of First Embodiment)

A solid-state imaging element 200 according to a ninth modification of the first embodiment is different from the solid-state imaging element 200 according to the eight modification of the first embodiment in that all the pixels included in the pixel array unit are constituted by EVS pixels 309, and an AD conversion circuit 212a, a first signal processing unit 213, and a timing control circuit 215 are not included. Hereinafter, differences from the solid-state imaging element 200 according to the eight modification of the first embodiment will be described.

Figure 27:
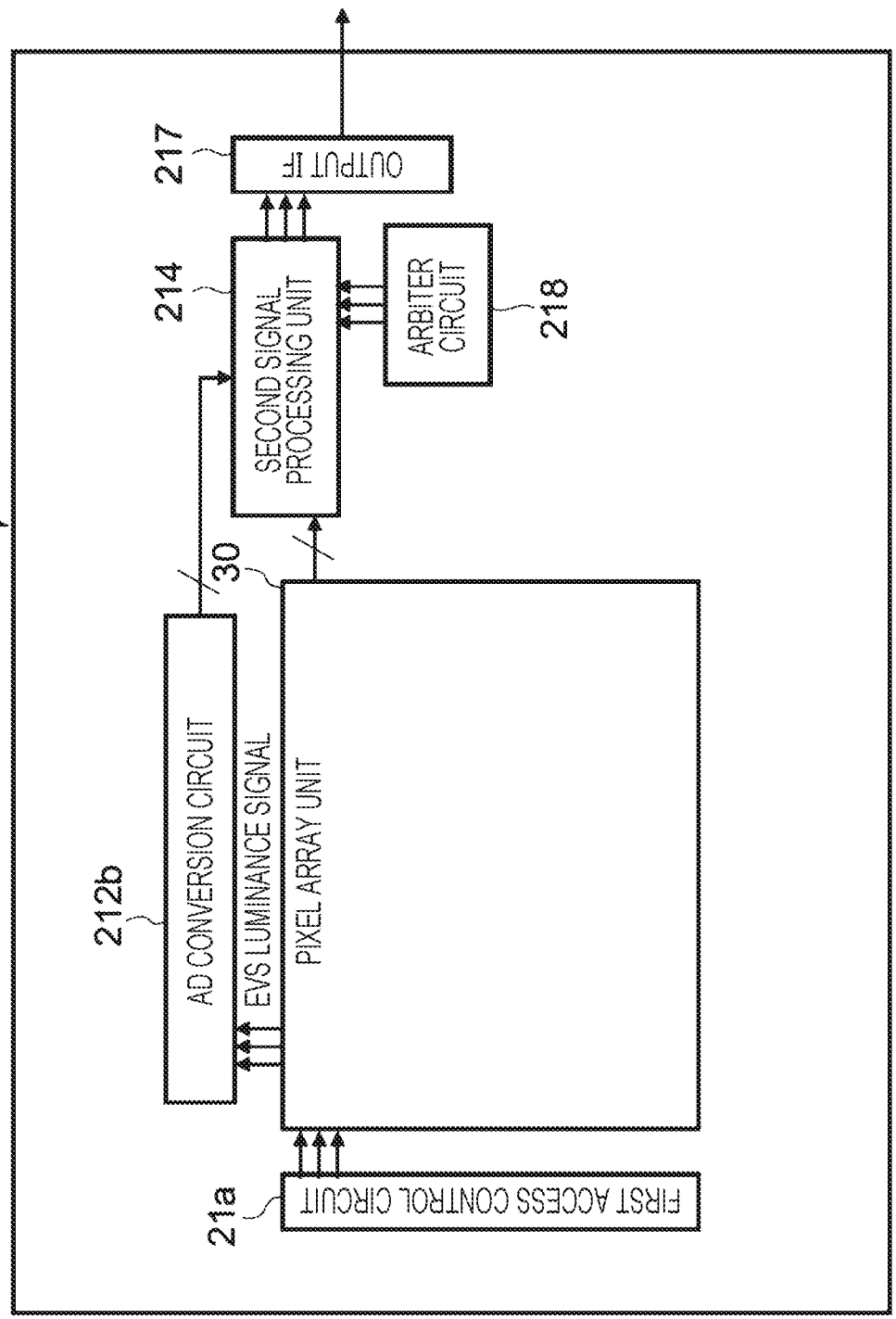
FIG. 27 is a block diagram illustrating a configuration example of a solid-state imaging element according to a ninth modification of the first embodiment.

FIG. 27 is a block diagram illustrating a configuration example of the solid-state imaging element 200 according to the ninth modification of the first embodiment. As illustrated in FIG. 27, in the solid-state imaging element 200 according to the present disclosure, all the pixels included in the pixel array unit are configured by EVS pixels 309. Therefore, the solid-state imaging element 200 according to the present disclosure includes a pixel array unit 30, a second access control circuit 211b, an AD conversion circuit 212b, a second signal processing unit 214, an output interface 217, and an arbiter circuit 218.

As described above, according to the present embodiment, since the solid-state imaging element 200 includes the pixel array unit 30, the second access control circuit 211b, the AD conversion circuit 212b, the second signal processing unit 214, the output interface 217, and the arbiter circuit 218, the solid-state imaging element can be further downsized.

(10th Modification of First Embodiment)

A solid-state imaging element 200 according to a 10th modification of the first embodiment is different from the solid-state imaging element 200 according to the first embodiment in that all the pixels included in the pixel array unit are constituted by EVS pixels 309, and an AD conversion circuit 212a, a first signal processing unit 213, and a timing control circuit 215 are not included. Hereinafter, differences from the solid-state imaging element 200 according to the first embodiment will be described.

Figure 28:
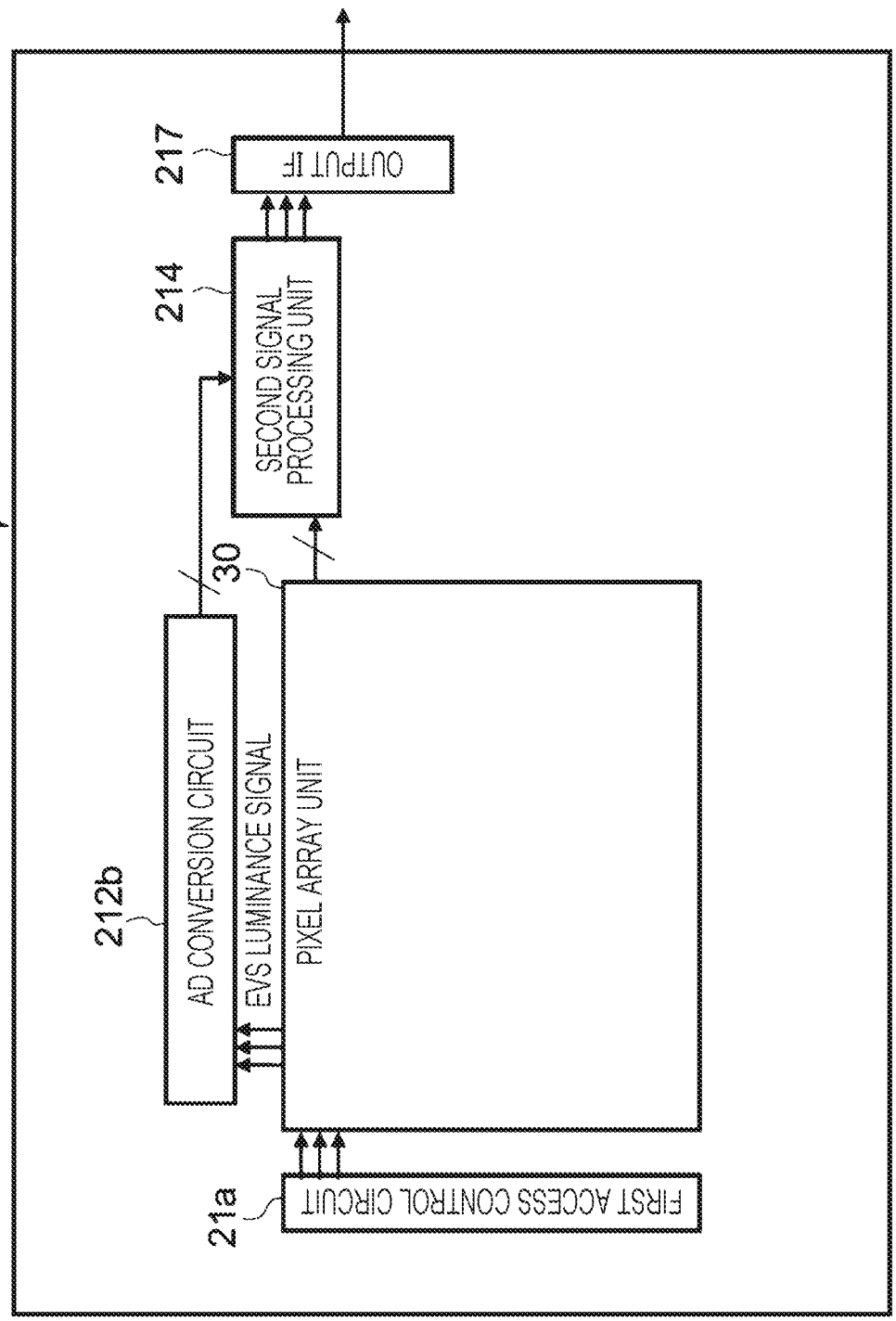
FIG. 28 is a block diagram illustrating a configuration example of a solid-state imaging element according to a 10th modification of the first embodiment.

FIG. 28 is a block diagram illustrating a configuration example of the solid-state imaging element 200 according to the 10th modification of the first embodiment. As illustrated in FIG. 28, in the solid-state imaging element 200 according to the present disclosure, all the pixels included in the pixel array unit are configured by EVS pixels 309. In addition, reading of signals from the EVS pixels 309 is also sequentially performed for each row. Therefore, the solid-state imaging element 200 according to the present disclosure may not include the AD conversion circuit 212a, the first signal processing unit 213, the timing control circuit 215, and the arbiter circuit 218.

As described above, according to the present embodiment, all the pixels included in the pixel array unit are configured by the EVS pixels 309, and reading of signals from the EVS pixels 309 is also sequentially performed for each row. As a result, a configuration without the AD conversion circuit 212a, the first signal processing unit 213, the timing control circuit 215, and the arbiter circuit 218 becomes possible, and the solid-state imaging element 200 can be downsized.

Second Embodiment

The electronic device 100 according to a second embodiment is different from the electronic device 100 according to the first embodiment and the first to 10th Modifications of the first embodiment in further mounting a function switchable according to the imaging state from the EVS driving to the neighboring pixel difference detection driving. Hereinafter, differences from the electronic device 100 according to the first embodiment and the first to 10th Modifications of the first embodiment will be described.

Figure 29:
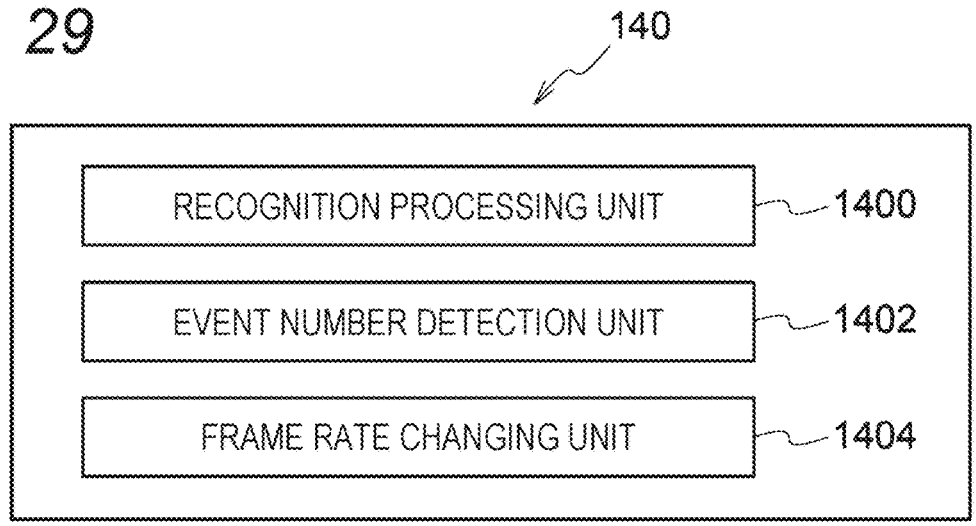
FIG. 29 is a block diagram illustrating a configuration example of an analysis unit.

FIG. 29 is a block diagram illustrating a configuration example of the analysis unit 140. As illustrated in FIG. 29, the analysis unit 140 includes a recognition processing unit 1400, an event number detection unit 1402, and a frame rate changing unit 1404. The analysis unit 140 includes, for example, a central processing unit (CPU). For example, the recording unit 120 (see FIG. 1) also stores various programs for executing processing in the analysis unit 140. As a result, the analysis unit 140 configures each unit, for example, by executing a program stored in the recording unit 120.

The recognition processing unit 1400 recognizes the category of the imaging target using, for example, the edge information of the EVS image, the EVS difference image, and the EVS mixed image. As the recognition algorithm in the recognition processing unit 1400, a general algorithm can be used.

At the time of EVS driving, the event number detection unit 1402 counts the number of address event detection signals output from the EVS AFE 314 in the solid-state imaging element 200 per unit time as the number of address events.

Figure 30:
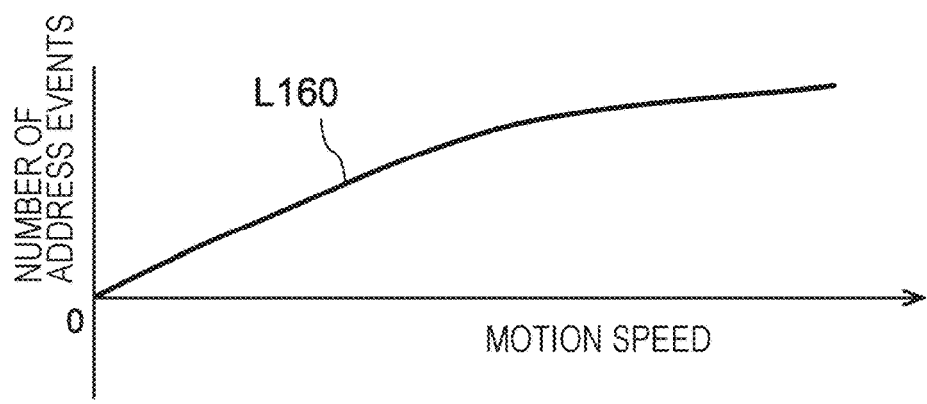
FIG. 30 is a diagram illustrating an example of a relationship between a motion speed of an imaging target and the number of address events.

FIG. 30 is a diagram illustrating an example of a relationship between the motion speed of the imaging target and the number of address events detected by the event number detection unit 1402. The vertical axis indicates the number of address events detected by all the EVS AFEs 314 per unit time, and the horizontal axis indicates the speed of the imaging target. A line L160 indicates an example of a relationship between the speed of the imaging target and the number of address events. As illustrated in the line L160, the number of address events is 0 in a case where the imaging target is stationary. Conversely, the number of address events increases from 0 as the speed of the imaging target of the imaging target increases.

The frame rate changing unit 1404 changes the frame rate of the EVS AFE 314 for which the second access control circuit 211b performs frame reading control according to the number of address events output by the event number detection unit 1402. That is, the second access control circuit 211b changes the frame rate at which the address event is read from the pixel array unit 30 per unit time according to the number of address events. Furthermore, in a case where the number of address events becomes equal to or smaller than a predetermined threshold value, the frame rate changing unit 1404 changes the drive control performed by the second access control circuit 211b on the EVS AFE 314 from the EVS driving to the neighboring pixel difference driving. In addition, the frame rate changing unit 1404 sets the frame rate to a predetermined value in the neighboring pixel difference driving.

Figure 31:
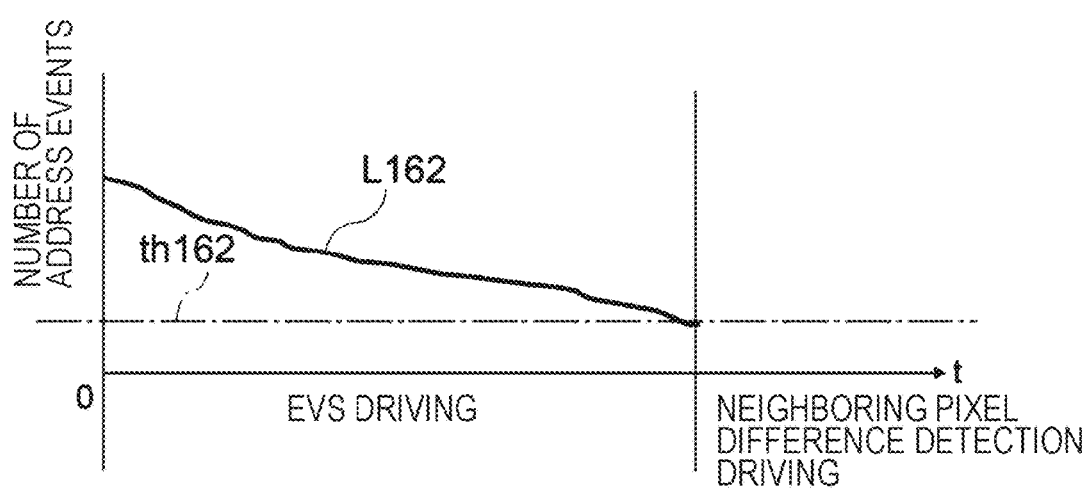
FIG. 31 is a diagram illustrating an example of drive control of a second access control circuit by a frame rate changing unit.

FIG. 31 is a diagram illustrating an example of drive control of the second access control circuit 211b by the frame rate changing unit 1404. The vertical axis indicates the number of address events, and the horizontal axis indicates the elapsed time. A line L162 indicates an example of a relationship between the number of address events of the imaging target and the elapsed time. As illustrated by the line L162, here, an example is illustrated in which the motion speed of the imaging target decreases with time. When the frame rate reaches the threshold value th162, the frame rate changing unit 1404 changes the drive control performed by the second access control circuit 211b on the EVS AFE 314 from the EVS driving to the neighboring pixel difference driving with the frame rate set to a predetermined value. In this way, by changing the frame rate according to the number of address events, the amount of edge information in the EVS image and the EVS difference image is leveled. As a result, the recognition processing unit 1400 can perform recognition processing on any of the EVS image, the EVS difference image, and the EVS mixed image by the same recognition algorithm. As described above, the recognition processing unit 1400 suppresses a decrease in recognition accuracy for any of the EVS image, the EVS difference image, and the EVS mixed image.

Figure 32:
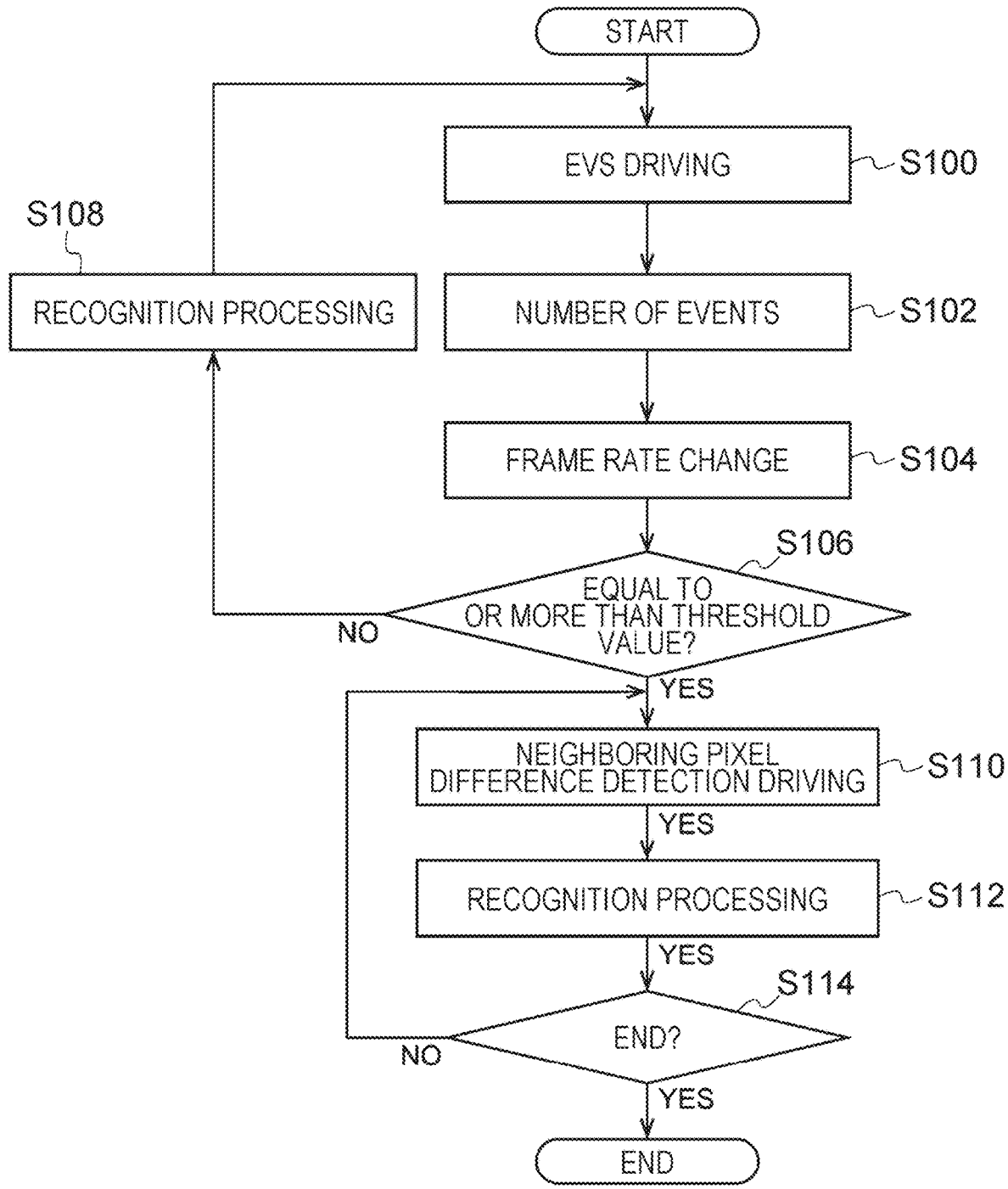
FIG. 32 is a flowchart illustrating a processing example of an electronic device according to a second embodiment.

FIG. 32 is a flowchart illustrating a processing example of the electronic device 100 according to the second embodiment. As illustrated in FIG. 32, the second access control circuit 211b drives the EVS AFE 314 by EVS driving according to the output signal of the frame rate changing unit 1404 (step S100). Subsequently, at the time of EVS driving, the event number detection unit 1402 counts the number of address event detection signals output by the EVS AFE 314 in the solid-state imaging element 200 per unit time as the number of address events (step S102).

Next, the frame rate changing unit 1404 changes the frame rate read and controlled by the second access control circuit 211b according to the number of address events output by the event number detection unit 1402 (step S104). Subsequently, the frame rate changing unit 1404 determines whether or not the number of address events is less than a predetermined threshold value th162 (step S106). In a case where it is determined that the elapsed time is not less than the predetermined threshold value th162 (N in step S106), the frame rate changing unit 1404 maintains the EVS driving, and the recognition processing unit 1400 executes the recognition processing on the EVS image (step S108).

On the other hand, in a case where the frame rate changing unit 1404 determines that the number of address events is less than the predetermined threshold value th (Y in step S106), the second access control circuit 211*b* changes the EVS AFE 314 to the neighboring pixel difference driving according to the output signal of the frame rate changing unit 1404 (step S110). Subsequently, the recognition processing unit 1400 executes recognition processing on the EVS difference image (step S112). The frame rate changing unit 1404 determines whether or not to end the neighboring pixel difference driving (step S114), and in a case of not (N in step S114), repeats the processing of step S110. On the other hand, in a case where it is determined to end the processing (Y in step S114), the overall processing ends.

As described above, according to the present embodiment, the frame rate changing unit 1404 changes the frame rate of the second access control circuit 211*b* according to the number of address events output by the event number detection unit 1402. As a result, the amount of edge information can be leveled, and a decrease in the recognition rate of the recognition processing unit 1400 can be suppressed regardless of the moving speed of the imaging target. Therefore, the recognition processing unit 1400 can recognize the recognition target in a wider speed range including stop.

Third Embodiment

The electronic device 100 according to a third embodiment is different from the electronic device 100 according to the second embodiment in further mounting a function switchable according to a state from the neighboring pixel difference detection driving to the EVS driving. Hereinafter, differences from the electronic device 100 according to the second embodiment will be described.

Figure 33:
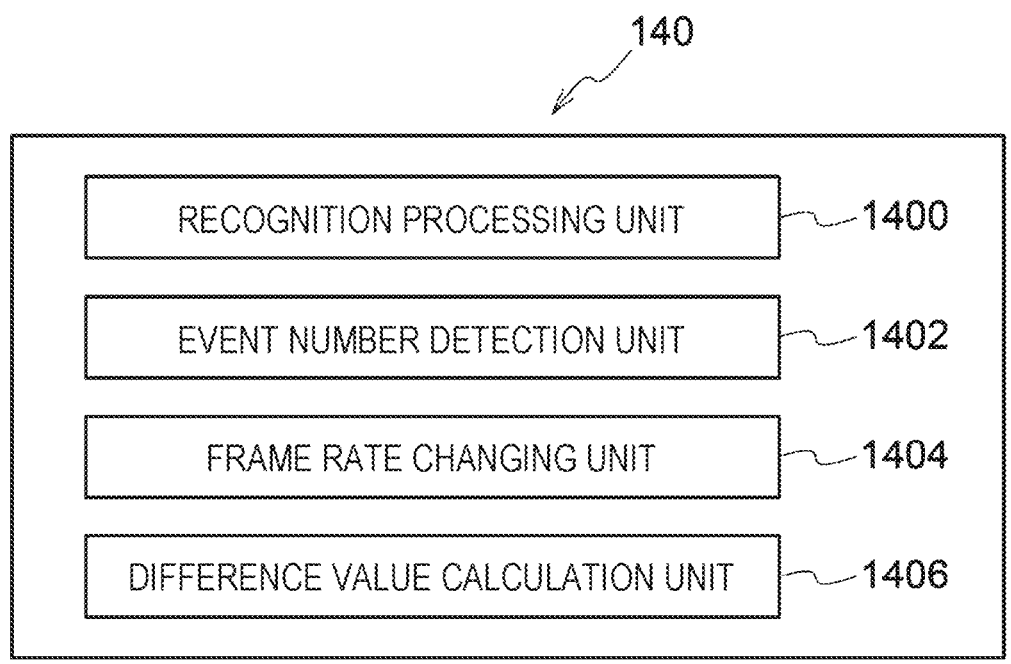
FIG. 33 is a block diagram illustrating a configuration example of an analysis unit according to a third embodiment.

FIG. 33 is a block diagram illustrating a configuration example of the analysis unit 140 according to the third embodiment. As illustrated in FIG. 33, the analysis unit 140 further includes a difference value calculation unit 1406.

The difference value calculation unit 1406 performs difference calculation processing between the EVS difference images generated in time series at the time of the neighboring pixel difference driving. The difference value calculation unit 1406 performs difference calculation processing between the EVS difference images recorded in time series in the recording unit 120 (see FIG. 1), and supplies a calculation result to the frame rate changing unit 1404. The difference value between the EVS difference images calculated by the difference value calculation unit 1406 is 0, for example, in a case where the imaging target is completely stopped, and increases when the imaging target starts to move.

The frame rate changing unit 1404 changes the drive control of the second access control circuit 211*b* from the neighboring pixel difference driving to the EVS driving in a case where the difference value calculated by the difference value calculation unit 1406 becomes equal to or larger than a predetermined threshold value. Further, after changing to the EVS driving, the frame rate changing unit 1404 changes the frame rate read and controlled by the second access control circuit 211*b* according to the number of address events output by the event number detection unit 1402.

Figure 34:
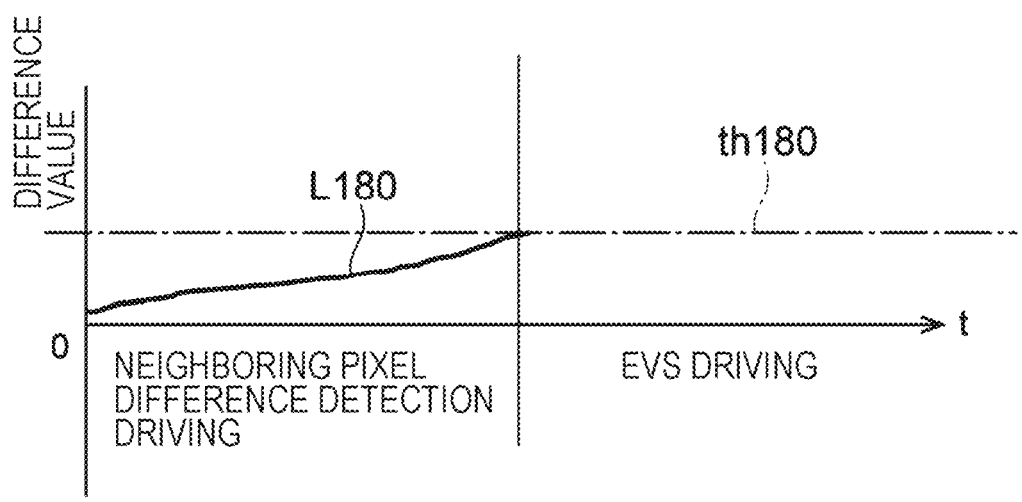
FIG. 34 is a diagram illustrating an example of drive control of a second access control circuit according to the third embodiment.

FIG. 34 is a diagram illustrating an example of drive control of the second access control circuit 211*b* by the frame rate changing unit 1404 according to the third embodiment. The vertical axis indicates the difference value between the EVS difference images, and the horizontal axis indicates the elapsed time. A line L180 illustrates an example of the relationship between the difference value and the elapsed time between the EVS difference images. Here, as indicated by the line L180, an example is illustrated in which the difference value increases with time.

When the difference value calculated by the difference value calculation unit 1406 reaches the threshold value th180, the frame rate changing unit 1404 changes the drive control by the second access control circuit 211*b* from the neighboring pixel difference driving to the EVS driving. In this manner, it is possible to change from the neighboring pixel difference driving to the EVS driving according to the difference value calculated by the difference value calculation unit 1406.

Figure 35:
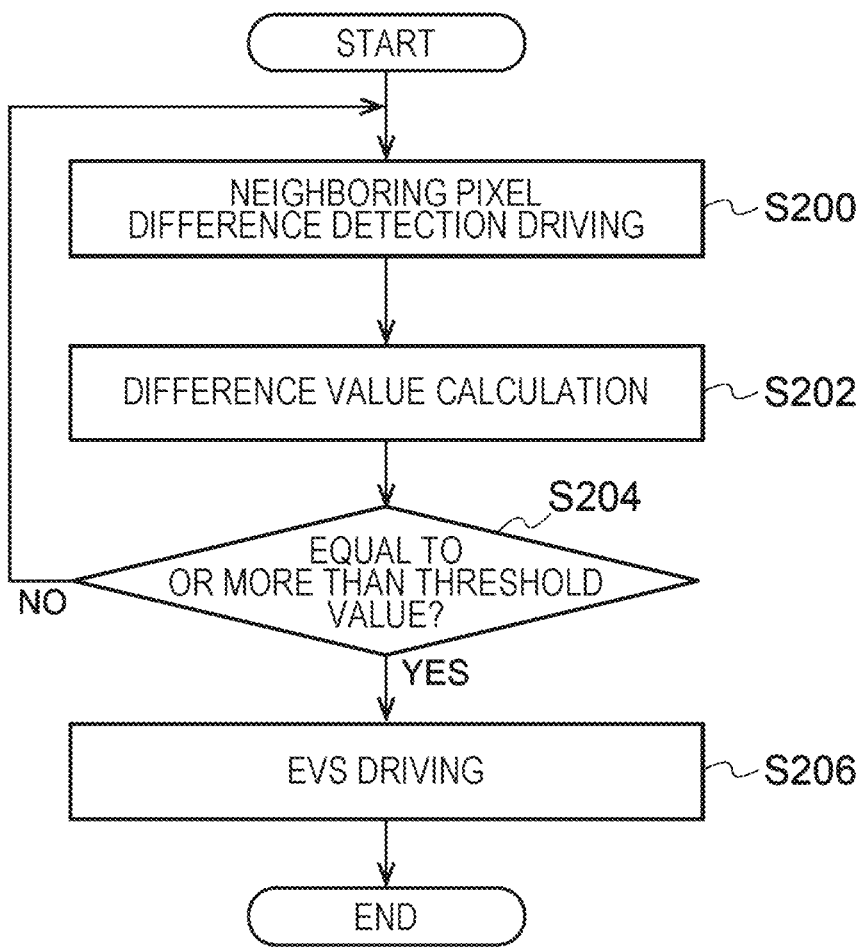
FIG. 35 is a flowchart illustrating a processing example of an electronic device according to the third embodiment.

FIG. 35 is a flowchart illustrating a processing example of the electronic device 100 according to the third embodiment. As illustrated in FIG. 32, the second access control circuit 211*b* drives the EVS AFE 314 by the neighboring pixel difference driving according to the output signal of the frame rate changing unit 1404 (step S200). Subsequently, the difference value calculation unit 1406 executes difference calculation processing between the EVS difference images recorded in time series in the recording unit 120 in the neighboring pixel difference driving (step S202).

Next, the frame rate changing unit 1404 determines whether or not the difference value calculated by the difference value calculation unit 1406 is greater than or equal to a predetermined threshold value th180 (step S204). In a case of determining that the value is less than the predetermined threshold value (N in step S204), the frame rate changing unit 1404 maintains the neighboring pixel difference driving and repeats the processing from step S200.

On the other hand, in a case where the frame rate changing unit 1404 determines that the difference value calculated by the difference value calculation unit 1406 is greater than or equal to the threshold value th180 (Y in step S204), the second access control circuit 211*b* changes the EVS AFE 314 to the EVS driving according to the output signal of the frame rate changing unit 1404 (step S110).

As described above, according to the present embodiment, the frame rate changing unit 1404 changes the driving of the EVS AFE 314 from the neighboring pixel difference driving to the EVS driving when the difference value calculated by the difference value calculation unit 1406 becomes equal to or larger than the predetermined threshold value th180. As a result, it is possible to change the neighboring pixel difference driving to the EVS driving in accordance with the timing at which the imaging target starts the motion. Therefore, the amount of edge information in the EVS difference image and the EVS image can be leveled, and a decrease in the recognition rate of the recognition processing unit 1400 can be suppressed regardless of the moving speed of the imaging target.

Fourth Embodiment

The electronic device 100 according to a fourth embodiment is different from the electronic device 100 according to the third embodiment in that the second access control circuit 211*b* changes the driving method for the EVS AFE 314 for each region of the pixel array unit 30. Hereinafter, differences from the electronic device 100 according to the third embodiment will be described.

Figure 36:
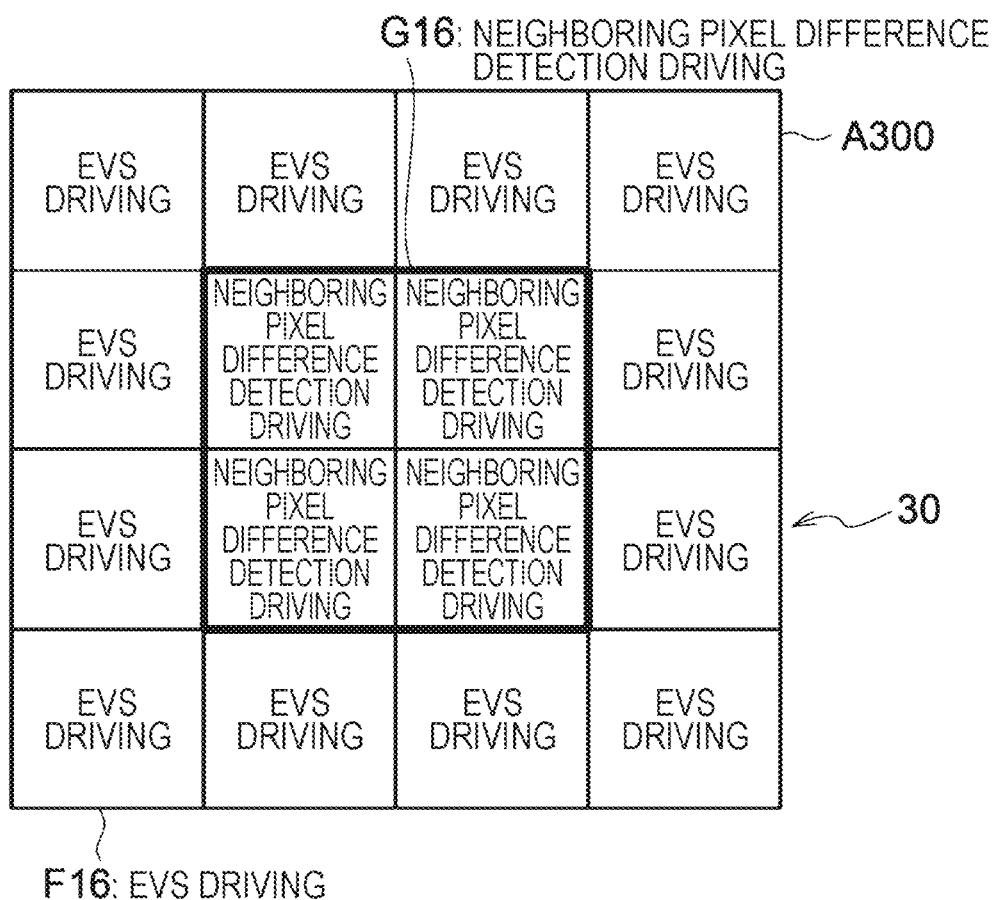
FIG. 36 is a diagram illustrating an example of a region of a pixel array unit.

FIG. 36 is a diagram illustrating an example of a region of the pixel array unit 30. As illustrated in FIG. 36, in the electronic device 100 according to the fourth embodiment, the region of the pixel array unit 30 is divided into a plurality of regions A300, and the driving method for the EVS AFE 314 can be changed for each region A300. In FIG. 36, the neighboring pixel difference driving is executed for the region A300 included in the center region G16, and the EVS driving is executed for the peripheral region F16.

More specifically, the second access control circuit 211b (see FIG. 5) executes either the EVS driving or the neighboring pixel difference driving for each of the plurality of regions A300. In this case, the second signal processing unit 214 (see FIG. 5) generates an EVS mixed image. For example, the second access control circuit 211b (see FIG. 5) sets the driving method for each region A300 according to the setting mode by the user.

FIG. 37 is a diagram illustrating a trajectory of the imaging target. This is, for example, an example of a trajectory in a case where a hand or the like as an imaging target is imaged, such as in zesher recognition. In such zesher recognition, there is a case where the imaging target moves in the peripheral region F16 but stops in the center region G16. In this case, since the EVS driving is executed in the peripheral region F16, it is possible to acquire the edge information of the moving imaging target, and since the neighboring pixel difference driving is executed in the center region G16, it is possible to acquire the edge information of the stationary imaging target.

As described above, according to the present embodiment, the region of the pixel array unit 30 is divided into the plurality of regions A300, and the method for driving the EVS AFE 314 is changed for each region A300. As a result, the edge information of the moving imaging target and the stationary imaging target can be acquired for each region A300. Therefore, the edge information of the imaging target that moves or stands still for each region A300 can be acquired without switching the driving method.

Fifth Embodiment

The electronic device 100 according to a fifth embodiment is different from the electronic device 100 according to the fourth embodiment in that the frame rate changing unit 1404 changes the driving of the EVS AFE 314 in each region of the pixel array unit 30 via the second access control circuit 211. Hereinafter, differences from the electronic device 100 according to the fourth embodiment will be described.

FIG. 38 is a diagram illustrating a method for driving the EVS AFE 314 for each region A300 in the frame F5, and FIG. 39 is a diagram illustrating a method for driving the EVS AFE 314 for each region A300 in the frame F6.

As illustrated in FIGS. 38 and 39, in the electronic device 100 according to the fifth embodiment, the region of the pixel array unit 30 is divided into a plurality of regions A300, and the driving method for the EVS AFE 314 can be changed for each frame in time series for each region A300.

More specifically, the event number detection unit 1402 (see FIG. 33) detects the number of address events for each region A300 in which the EVS driving is executed. Furthermore, the difference value calculation unit 1406 (see FIG. 33) calculates a difference value for each region A300 in which the neighboring pixel difference driving is executed. Then, the frame rate changing unit 1404 causes the second access control circuit 211b (see FIG. 5) to change the driving method for each region A300 by using one of the number of address events for each region A300 and the difference value.

FIG. 40 is a diagram schematically illustrating an optical image projected on the pixel array unit 30. This is an example in which the electronic device 100 is implemented as a monitoring camera. The person at the left end in FIG. 40 is walking, and the other persons are stopped.

In such a case, the frame rate changing unit 1404 sets the driving in the regions A300 corresponding to the inside of the dotted frame R400 surrounding the person at the left end as the EVS driving, and sets the driving in the other regions A300 as the neighboring pixel difference driving.

As described above, according to the present embodiment, the region of the pixel array unit 30 is divided into the plurality of regions A300, and the method for driving the EVS AFE 314 is changed according to the number of address events for each region A300 and the difference value. As a result, even in a case where a plurality of imaging targets moves or stops independently as time passes, the edge information of the imaging target can be acquired. Therefore, the recognition processing unit 1400 can recognize a plurality of imaging targets that moves or stops independently.

Sixth Embodiment

The electronic device 100 according to a sixth embodiment is different from the electronic device according to the fifth embodiment in that the electronic device 100 according to the sixth embodiment further has a function of changing a threshold value of the comparison circuit 334 according to the imaging situation. Hereinafter, differences from the electronic device 100 according to the fifth embodiment will be described.

Figure 41:
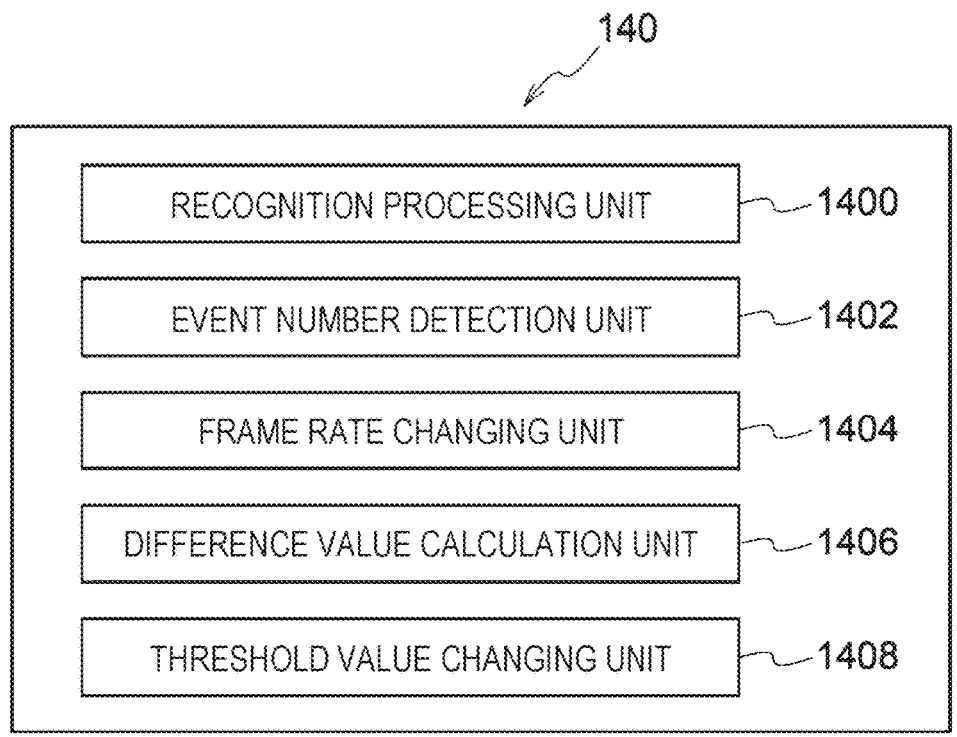
FIG. 41 is a block diagram illustrating a configuration example of an analysis unit according to a sixth embodiment.

FIG. 41 is a block diagram illustrating a configuration example of the analysis unit 140 according to the sixth embodiment. As illustrated in FIG. 41, the analysis unit 140 further includes a threshold value changing unit 1408.

Figure 42:
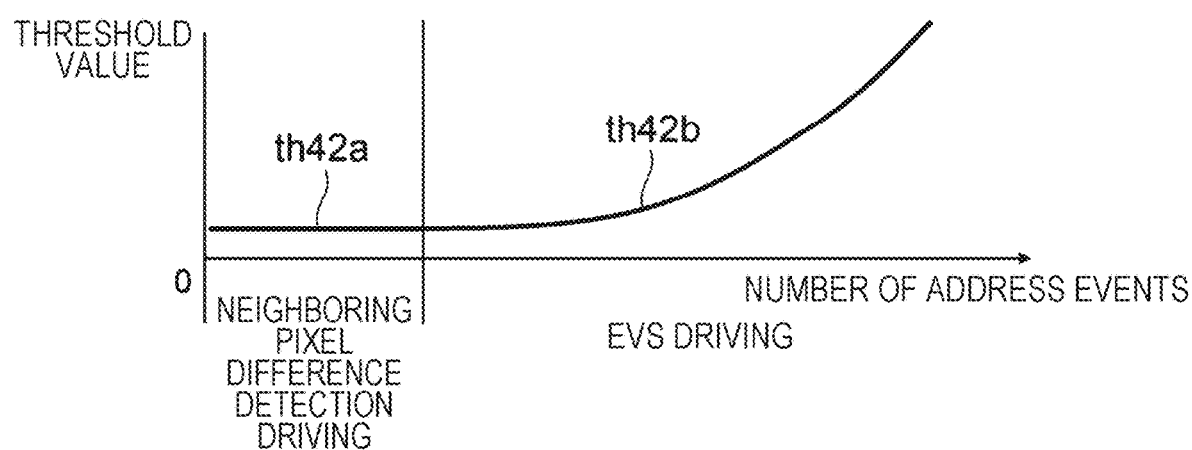
FIG. 42 is a diagram illustrating an example of changing a threshold value of a threshold value changing unit.

FIG. 42 is a diagram illustrating an example of changing the threshold value of the threshold value changing unit 1408. The vertical axis represents the threshold value of the comparison circuit 334 (see FIG. 12), and the horizontal axis represents the number of address events for each region A300 (see FIG. 39).

As illustrated in FIG. 42, the threshold value changing unit 1408 changes the threshold value of the comparison circuit 334 for each region A300 on the basis of the driving state for each region A300 and the number of address events detected by the event number detection unit 1402. For example, in a case where the EVS AFE 314 in the region A300 performs the neighboring pixel difference driving, a predetermined threshold value th42a is set. On the other hand, in a case where the EVS AFE 314 in the region A300 performs the EVS driving, the threshold value th42b based on the number of address events is set.

Figure 43:
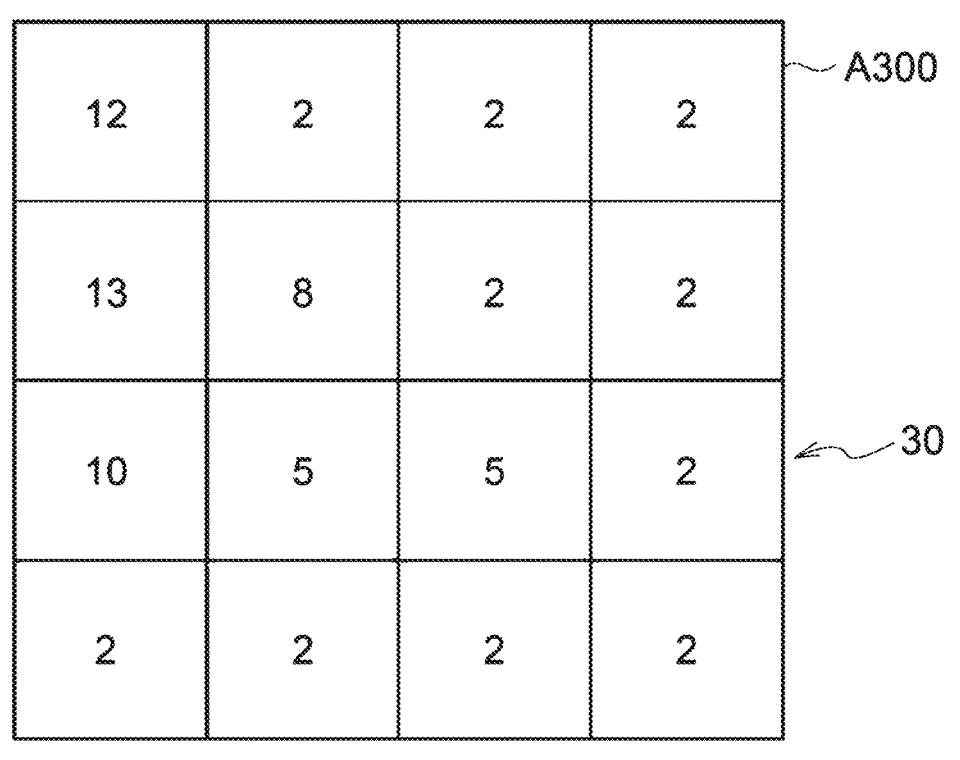

FIG. 43 is a diagram schematically illustrating a threshold value set for each region A300 (see FIG. 39). In this manner, the threshold values th42a and th42b for each region A300 can be set according to the imaging situation. As a result, since the threshold value th42b increases in a region where the number of address events is large, the number of address events decreases sequentially. As a result, the number of address events for each region A300 gradually converges to a predetermined number. Therefore, therefore, the amount of edge information in the EVS difference image and the EVS image can be leveled, and a decrease in the recognition rate of the recognition processing unit 1400 can be suppressed regardless of the moving speed of the imaging target.

As described above, according to the present embodiment, the region of the pixel array unit 30 is divided into the plurality of regions A300, and the threshold values th42a and th42b of the comparison circuit 334 in each region A300 are changed according to the driving method for each region A300 and the number of address events. As a result, even in a case where a plurality of imaging targets moves or stops independently as time passes, the edge information of the imaging target can be acquired. Therefore, the amount of edge information in the EVS difference image and the EVS image can be leveled, and a decrease in the recognition rate of the recognition processing unit 1400 can be suppressed regardless of the moving speed of the imaging target.

Note that the present technology can have the following configurations.

(1) A solid-state imaging element including:
a plurality of photoelectric conversion elements that performs photoelectric conversion to generate a photoelectric conversion signal; and
a generation unit that generates a first signal in a case where an amount of change of a photoelectric conversion signal output from a single photoelectric conversion element among the plurality of photoelectric conversion elements exceeds a predetermined value, and generates a second signal in a case where a difference value between photoelectric conversion signals output from two photoelectric conversion elements among the plurality of photoelectric conversion elements exceeds a predetermined value.

(2) The solid-state imaging element according to (1),
in which the generation unit includes: a first difference circuit that generates a difference value between two signals; and
a switching circuit that switches between a first photoelectric signal based on a first photoelectric conversion signal output from one first photoelectric conversion element of two photoelectric conversion elements and a second photoelectric signal based on a second photoelectric conversion signal output from another second photoelectric conversion element to output to the first difference circuit, and
one of the first signal and the second signal is generated on the basis of the difference value.

(3) The solid-state imaging element according to (2), in which the second signal is generated in a case where the switching circuit inputs the second photoelectric signal to the first difference circuit after inputting the first photoelectric signal to the first difference circuit.

(4) The solid-state imaging element according to (2) or (3),
in which the generation unit further includes a first logarithmic conversion circuit that logarithmically converts the first photoelectric conversion signal or the second photoelectric conversion signal, and
the switching circuit outputs the first photoelectric signal or the second photoelectric signal to the first difference circuit via the first logarithmic conversion circuit.

(5) The solid-state imaging element according to (2) or (3),
in which the generation unit further includes:
a first logarithmic conversion circuit that logarithmically converts the first photoelectric conversion signal;
a first holding circuit that holds the first photoelectric signal output from the first logarithmic conversion circuit;
a second logarithmic conversion circuit that logarithmically converts the second photoelectric conversion signal; and
a second holding circuit that holds the second photoelectric signal output from the second logarithmic conversion circuit, and
the switching circuit switches between the first photoelectric signal output from the first holding circuit and the second photoelectric signal output from the second holding circuit to output to the first difference circuit.

(6) The solid-state imaging element according to (5),
in which the generation unit further includes
a second difference circuit that generates a difference value between two signals, and
the switching circuit includes: a first switching element connected between the first holding circuit and the first difference circuit; a second switching element connected between the first holding circuit and the second difference circuit; a third switching element connected between the second holding circuit and the second difference circuit; and a fourth switching element connected between the second holding circuit and the first difference circuit.

(7) The solid-state imaging element according to (6),
in which the generation unit further includes:
a first comparison circuit that compares an output signal of the first difference circuit with a predetermined first threshold value and generates one of the first signal and the second signal; and
a second comparison circuit that compares an output signal of the second difference circuit with a predetermined second threshold value and generates one of the first signal and the second signal.

(8) The solid-state imaging element according to (7), in which the first switching element and the second switching element are brought into a connected state, the third switching element and the fourth switching element are brought into a disconnected state, and the first threshold value and the second threshold value are made different from each other.

(9) The solid-state imaging element according to (6), further including:
a selection circuit that selects an output signal of the first difference circuit and an output signal of the second difference circuit; and
a comparison circuit that compares a signal output from the selection circuit with a predetermined threshold value and generates one of the first signal and the second signal.

(10) The solid-state imaging element according to (1),
in which the generation unit includes: a first difference circuit that generates a difference value between two signals; and
a switching circuit that switches photoelectric conversion signals output from three or more photoelectric conversion elements to output to the first difference circuit, and
one of the first signal and the second signal is generated on the basis of the difference value.

(11) The solid-state imaging element according to (1), in which a gradation image is formed on the basis of a photoelectric conversion signal output from at least one of the plurality of photoelectric conversion elements.

(12) An electronic device including:
a light receiving unit (light receiving chip) in which a plurality of photoelectric conversion elements is arranged in a two-dimensional lattice pattern;
a detection unit (detection chip) including a plurality of generation units that generates one of a first signal and a second signal for each of combinations of corresponding two photoelectric conversion elements in the plurality of photoelectric conversion elements, the detection unit generating the first signal in a case where an amount of change of a photoelectric conversion signal output from a single photoelectric conversion element in the two photoelectric conversion elements exceeds a predetermined value, and generating the second signal in a case where a difference value between photoelectric conversion signals output from the two photoelectric conversion elements exceeds a predetermined value; and a control circuit that causes the plurality of generation units to generate either the first signal or the second signal.

(13) The electronic device according to (12), in which the control circuit performs frame reading control to cause a generation unit of the plurality of generation units corresponding to the plurality of photoelectric conversion elements arranged for each row of the light receiving unit to sequentially output the first signal or the second signal in association with the row.

(14) The electronic device according to (13), further including an analysis unit that counts the number of the plurality of generation units that outputs the first signal per unit time,
in which the control circuit changes a speed of frame reading control according to the number of counts.

(15) The electronic device according to (14), in which the control circuit performs control to cause the generation unit to output the second signal in a case where the number of counts becomes equal to or less than a predetermined value.

(16) The electronic device according to (15), further including:
a signal processing unit that generates at least one of a first image based on the first signal, a second image based on the second signal, or a third image based on the first signal and the second signal; and
an analysis unit that recognizes an imaging target using any one of the first image based on the first signal, the second image based on the second signal, and the third image based on the first signal and the second signal.

(17) The electronic device according to (16),
in which the analysis unit generates a difference value between the second images generated in time series, and
the control circuit performs control to cause the generation unit to output the first signal in a case where the difference value is greater than or equal to a predetermined value.

(18) The electronic device according to (17),
in which the light receiving unit is divided into a plurality of regions, and
the control circuit performs control to cause the generation unit corresponding to each of the plurality of regions to generate one of the first signal and the second signal.

(19) The electronic device according to (18),
in which the analysis unit generates the difference value or the number of counts for each of the plurality of regions, and the control circuit performs control to cause the generation unit corresponding to each of the plurality of regions to generate one of the first signal and the second signal according to the difference value or the number of counts for each of the plurality of regions.

(20) The electronic device according to (19),
in which each of the plurality of generation units includes:
a difference circuit that generates a difference value between two signals based on a photoelectric conversion signal output from each of combinations of the two photoelectric conversion elements; and
a comparison circuit that compares a difference value output from the difference circuit with a predetermined threshold value, and
the control circuit changes a threshold value according to the number of counts.

(21) The electronic device according to (12), further including:
an imaging lens that condenses incident light and guides the incident light to the light receiving unit;
a recording unit that records data from the detection unit; and
a control unit that controls the detection unit to capture an image.

(22) An imaging method including:
generating a first signal in a case where an amount of change of a photoelectric conversion signal output from a single photoelectric conversion element among a plurality of photoelectric conversion elements exceeds a predetermined value; and
generating a second signal in a case where a difference value between photoelectric conversion signals output from two photoelectric conversion elements among the plurality of photoelectric conversion elements exceeds a predetermined value.

Aspects of the present disclosure are not limited to the above-described individual embodiments, but include various modifications that can be conceived by those skilled in the art, and the effects of the present disclosure are not limited to the above-described contents. That is, various additions, modifications, and partial deletions can be made without departing from the conceptual idea and spirit of the present disclosure derived from the contents defined in the claims and equivalents thereof.

REFERENCE SIGNS LIST

100 Electronic device
110 Imaging lens
120 Recording unit
130 Control unit
140 Analysis unit
200 Solid-state imaging element
201 Light receiving chip (light receiving unit)
202 Detection chip (detection unit)
211b Second access control circuit (control circuit)
214 Second signal processing unit (signal processing unit)
311 Photoelectric conversion element
314 EVS AFE (generation unit)
328ab Switching circuit
331 Logarithmic conversion circuit
332 Buffer (holding circuit)
333 Difference circuit
334 Comparison circuit

The invention claimed is:
1. A solid-state imaging element comprising:
a plurality of photoelectric conversion elements respectively configured to perform photoelectric conversion to generate photoelectric conversion signals; and
a generation circuit that generates a first signal in a case where an amount of change of a single photoelectric conversion signal output from a single photoelectric conversion element among the plurality of photoelectric conversion elements exceeds a predetermined value, and generates a second signal in a case where a difference value between two photoelectric conversion signals output from two photoelectric conversion elements among the plurality of photoelectric conversion elements exceeds a predetermined value, wherein the generation circuit includes:

a first difference circuit that generates a difference value between two signals;

a switching circuit that switches between a first photoelectric signal based on a first photoelectric conversion signal output from one first photoelectric conversion element of two photoelectric conversion elements and a second photoelectric signal based on a second photoelectric conversion signal output from another second photoelectric conversion element to output to the first difference circuit; and a first logarithmic conversion circuit that logarithmically converts the first photoelectric conversion signal or the second photoelectric conversion signal, wherein the switching circuit outputs the first photoelectric signal or the second photoelectric signal to the first difference circuit via the first logarithmic conversion circuit.

2. The solid-state imaging element according to claim 1, wherein the second signal is generated in a case where the switching circuit inputs the second photoelectric signal to the first difference circuit after inputting the first photoelectric signal to the first difference circuit.

3. The solid-state imaging element according to claim 1, wherein the generation circuit includes:

a first difference circuit that generates a difference value between two signals; and a switching circuit that switches photoelectric conversion signals output from three or more photoelectric conversion elements to output to the first difference circuit, and one of the first signal and the second signal is generated on a basis of the difference value.

4. The solid-state imaging element according to claim 1, wherein a gradation image is formed on a basis of a photoelectric conversion signal output from at least one of the plurality of photoelectric conversion elements.

5. A solid-state imaging element according to claim 2, wherein the generation unit further includes comprising:

a plurality of photoelectric conversion elements respectively configured to perform photoelectric conversion to generate photoelectric conversion signals; and a generation circuit that generates a first signal in a case where an amount of change of a single photoelectric conversion signal output from a single photoelectric conversion element among the plurality of photoelectric conversion elements exceeds a predetermined value, and generates a second signal in a case where a difference value between two photoelectric conversion signals output from two photoelectric conversion elements among the plurality of photoelectric conversion elements exceeds a predetermined value, wherein the generation circuit includes:

a first difference circuit that generates a difference value between two signals;

a switching circuit that switches between a first photoelectric signal based on a first photoelectric conversion signal output from one first photoelectric conversion element of two photoelectric conversion elements and a second photoelectric signal based on a second photoelectric conversion signal output from another second photoelectric conversion element to output to the first difference circuit;

a first logarithmic conversion circuit that logarithmically converts the first photoelectric conversion signal;

a first holding circuit that holds the first photoelectric signal output from the first logarithmic conversion circuit;

a second logarithmic conversion circuit that logarithmically converts the second photoelectric conversion signal; and a second holding circuit that holds the second photoelectric signal output from the second logarithmic conversion circuit, wherein the switching circuit switches between the first photoelectric signal output from the first holding circuit and the second photoelectric signal output from the second holding circuit to output to the first difference circuit.

6. The solid-state imaging element according to claim 5, wherein the generation circuit further includes a second difference circuit that generates a difference value between two signals, and the switching circuit includes:

a first switching element connected between the first holding circuit and the first difference circuit;

a second switching element connected between the first holding circuit and the second difference circuit;

a third switching element connected between the second holding circuit and the second difference circuit; and a fourth switching element connected between the second holding circuit and the first difference circuit.

7. The solid-state imaging element according to claim 6, wherein the generation circuit further includes:

a first comparison circuit that compares an output signal of the first difference circuit with a predetermined first threshold value and generates one of the first signal and the second signal; and a second comparison circuit that compares an output signal of the second difference circuit with a predetermined second threshold value and generates one of the first signal and the second signal.

8. The solid-state imaging element according to claim 7, wherein the first switching element and the second switching element are brought into a connected state, the third switching element and the fourth switching element are brought into a disconnected state, and the first threshold value and the second threshold value are made different from each other.

9. The solid-state imaging element according to claim 6, further comprising:

a selection circuit that selects an output signal of the first difference circuit and an output signal of the second difference circuit; and a comparison circuit that compares a signal output from the selection circuit with a predetermined threshold value and generates one of the first signal and the second signal.

10. An electronic device comprising:

a pixel array including a plurality of photoelectric conversion elements-is arranged in a two-dimensional lattice pattern;

a detection circuit including a plurality of generation circuits that generates one of a first signal and a second signal for each of combinations of corresponding two photoelectric conversion elements in the plurality of photoelectric conversion elements, the detection circuit generating the first signal in a case where an amount of change of a photoelectric conversion signal output from a single photoelectric conversion element in the two photoelectric conversion elements exceeds a predetermined value, and generating the second signal in a case where a difference value between photoelectric conversion signals output from the two photoelectric conversion elements exceeds a predetermined value;

a control circuit that causes the plurality of generation circuits to generate either the first signal or the second signal, wherein the control circuit performs frame reading control to cause a generation circuit of the plurality of generation circuits corresponding to the plurality of photoelectric conversion elements arranged for each row of the pixel array to sequentially output the first signal or the second signal in association with the row; and an analysis processor that counts a number of the plurality of generation circuits that outputs the first signal per unit time, wherein the control circuit changes a speed of frame reading control according to the number of counts.

11. The electronic device according to claim 10, further comprising:
an imaging lens that condenses incident light and guides the incident light to the pixel array;
a memory that records data from the detection circuit; and
a controller that controls the detection circuit to capture an image.

12. The electronic device according to claim 10, wherein the control circuit performs control to cause the generation unitcircuit to output the second signal in a case where the number of counts becomes equal to or less than a predetermined value.

13. The electronic device according to claim 12, further comprising:
a signal processing circuit that generates at least one of a first image based on the first signal, a second image based on the second signal, or a third image based on the first signal and the second signal; and
an analysis processor that recognizes an imaging target using any one of the first image based on the first signal, the second image based on the second signal, and the third image based on the first signal and the second signal.

14. The electronic device according to claim 13, wherein the analysis unitanalysis processor generates a difference value between the second images generated in time series, and the control circuit performs control to cause the generation circuit to output the first signal in a case where the difference value is greater than or equal to a predetermined value.

15. The electronic device according to claim 14, wherein the pixel array is divided into a plurality of regions, and the control circuit performs control to cause the generation circuit corresponding to each of the plurality of regions to generate one of the first signal and the second signal.

16. The electronic device according to claim 15, wherein the analysis processor generates the difference value or the number of counts for each of the plurality of regions, and the control circuit performs control to cause the generation circuit corresponding to each of the plurality of regions to generate one of the first signal and the second signal according to the difference value or the number of counts for each of the plurality of regions.

17. The electronic device according to claim 16, wherein each of the plurality of generation circuits includes:
a difference circuit that generates a difference value between two signals based on a photoelectric conversion signal output from each of combinations of the two photoelectric conversion elements; and
a comparison circuit that compares a difference value output from the difference circuit with a predetermined threshold value, and
the control circuit changes a threshold value according to the number of counts.

\* \* \* \* \*